US008900054B2

(12) United States Patent
Patel

(10) Patent No.: US 8,900,054 B2
(45) Date of Patent: Dec. 2, 2014

(54) DOWNLOAD AND CONFIGURATION CAPABLE GAMING MACHINE OPERATING SYSTEM, GAMING MACHINE AND METHOD

(75) Inventor: Pravinkumar Patel, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1825 days.

(21) Appl. No.: 11/938,249

(22) Filed: Nov. 9, 2007

(65) Prior Publication Data

US 2008/0064501 A1 Mar. 13, 2008

Related U.S. Application Data

(63) Continuation of application No. 11/278,937, filed on Apr. 6, 2006, now abandoned, which is a continuation of application No. 11/470,606, filed on Sep. 6, 2006, now Pat. No. 8,678,902.

(60) Provisional application No. 60/676,429, filed on Apr. 28, 2005, provisional application No. 60/714,754, filed on Sep. 7, 2005, provisional application No. 60/865,332, filed on Nov. 10, 2006, provisional application No. 60/865,396, filed on Nov. 10, 2006.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |

(52) U.S. Cl.
USPC .......... 463/29; 463/43

(58) Field of Classification Search
CPC .......... G06F 21/57; G07F 17/3241
USPC .......... 463/29, 43
See application file for complete search history.

(56) References Cited

U.S. PATENT DOCUMENTS

| | | | | |
|---|---|---|---|---|
| 5,337,275 | A * | 8/1994 | Garner | 365/189.16 |
| 5,963,982 | A * | 10/1999 | Goldman | 711/170 |
| 6,092,168 | A * | 7/2000 | Voigt | 711/170 |
| 2002/0091904 | A1 * | 7/2002 | Haggar et al. | 711/170 |
| 2003/0069074 | A1 * | 4/2003 | Jackson | 463/43 |
| 2003/0073497 | A1 * | 4/2003 | Nelson | 463/42 |
| 2003/0130032 | A1 * | 7/2003 | Martinek et al. | 463/29 |
| 2004/0198496 | A1 * | 10/2004 | Gatto et al. | 463/42 |
| 2005/0132179 | A1 * | 6/2005 | Glaum et al. | 713/1 |
| 2005/0192086 | A1 * | 9/2005 | Walker et al. | 463/20 |
| 2006/0100010 | A1 * | 5/2006 | Gatto et al. | 463/29 |

* cited by examiner

*Primary Examiner* — William M. Brewster
(74) *Attorney, Agent, or Firm* — Brooke Quist; Marvin Hein

(57) ABSTRACT

A gaming machine operating system is disclosed that includes download and configuration modules enabling the conducting of external communications and internal operations to receive downloads of game and game machine content and features and to modify game and game machines accordingly. Gaming machines and methods are also described which implement the download and configuration capable gaming machine operating system.

5 Claims, 38 Drawing Sheets

DOWNLOAD AND CONFIGURATION CAPABLE GAMING MACHINE OPERATING SYSTEM, GAMING MACHINE AND METHOD

CROSS-REFERENCE TO RELATED APPLICATIONS

This application is a continuation of U.S. patent application Ser. No. 11/278,937 filed Apr. 6, 2006 now abandoned, entitled LOGIC INTERFACE ENGINE SYSTEM AND METHOD, which claims the benefit of U.S. Provisional Patent Application No. 60/676,429, filed Apr. 28, 2005, entitled LOGIC INTERFACE ENGINE SYSTEM AND METHOD, both of which are hereby incorporated by reference in their entirety; this application is also a continuation of U.S. patent application Ser. No. 11/470,606 filed Sep. 6, 2006 now U.S. Pat. No. 8,678,902 entitled SYSTEM GAMING, which claims the benefit of U.S. Provisional Patent Application No. 60/714,754, filed Sep. 7, 2005, entitled SYSTEM GAMING APPARATUS AND METHOD, both of which are hereby incorporated by reference in their entirety; this application also claims the benefit of U.S. Provisional Patent Application No. 60/865,332, filed Nov. 10, 2006, entitled DOWNLOAD AND CONFIGURATION SERVER-BASED SYSTEM AND METHOD, which is hereby incorporated by reference in its entirety; this application also claims the benefit of U.S. Provisional Patent Application No. 60/865,396, filed Nov. 10, 2006, entitled DOWNLOAD AND CONFIGURATION CAPABLE GAMING MACHINE OPERATING SYSTEM, GAMING MACHINE, AND METHOD, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention pertains generally to gaming machine systems and methods. More particularly, the present invention relates to a gaming machine operating systems, gaming machines, and methods that include downloadable and/or configurable capabilities.

DESCRIPTION OF RELATED ART

Various networked gaming systems have been developed over the years beginning at least in the 1980's. With acceptance and utilization, users such as casino operators have found it desirable to increase the computer management of their facilities and expand features available on networked gaming systems. For instance, there are various areas in the management of casinos that is very labor intensive, such as reconfiguring gaming machines, changing games on the gaming machines, and performing cash transactions for customers.

SUMMARY OF THE INVENTION

In one aspect of the invention, a gaming machine operating system includes download and configuration modules enabling the conducting of external communications and internal operations to receive downloads of games, game machine content and features, and to modify game and game machines accordingly. Gaming machines and methods are also described which implement the download and configuration capable gaming machine operating system.

Further aspects, features and advantages of various embodiments of the invention will be apparent from the following detailed disclosure, taken in conjunction with the accompanying sheets of drawings.

DETAILED DESCRIPTION OF THE PREFERRED EMBODIMENTS

Disclosure herein are several embodiments of a gaming machine operating system that includes download and configuration modules which enable the conducting of external communications, as well as enabling internal operations to receive downloads of game and game machine content and features and to modify game and game machines accordingly. Gaming machines and methods are also described which implement the download and configuration capable gaming machine operating system.

Figure 1:
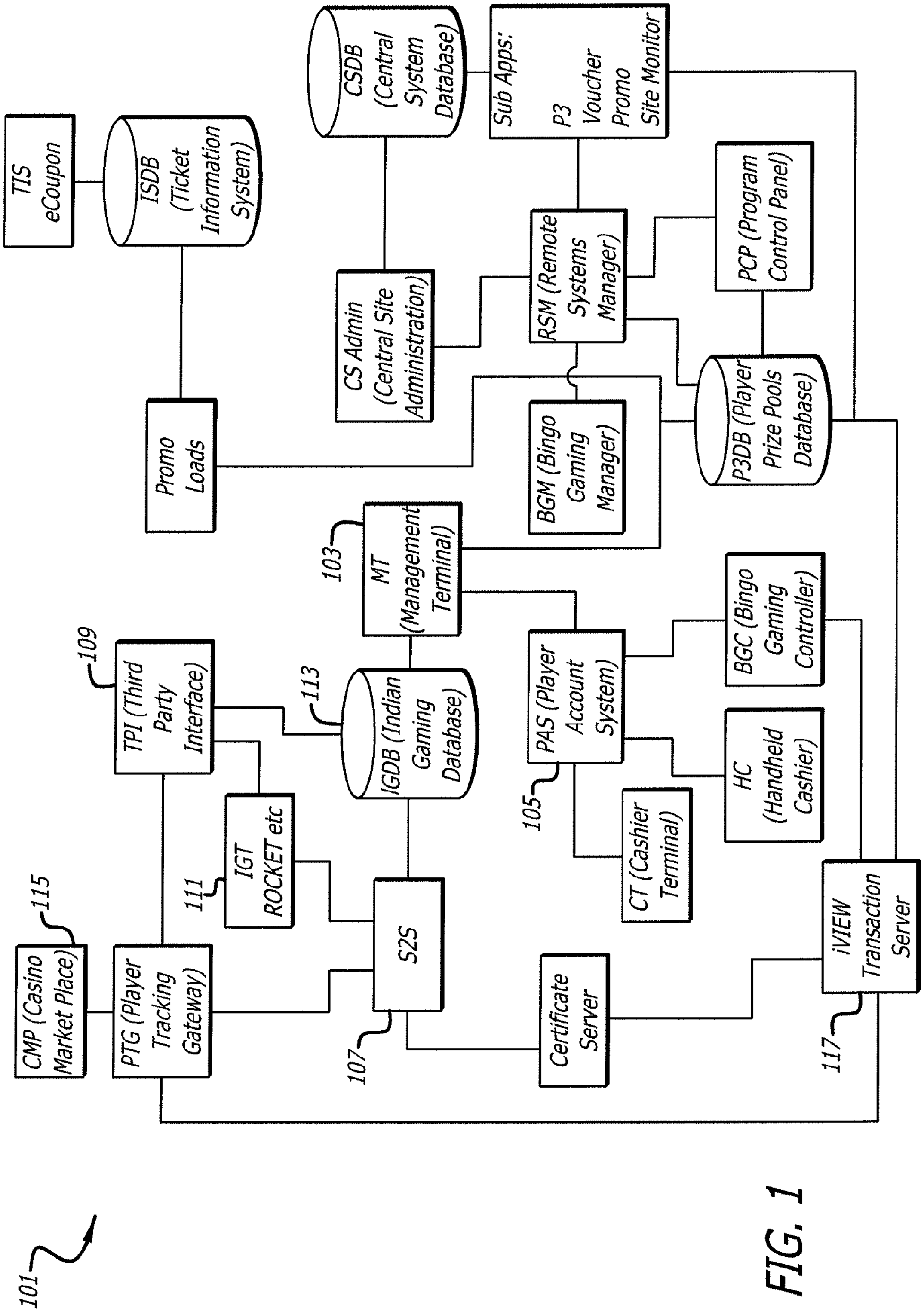
FIG. 1 is a block diagram of a gaming management system.

Referring now to the drawings, wherein like reference numerals denote like or corresponding parts throughout the drawings and, more particularly to FIGS. 2, 2A, 2B, 2C, and 2D, there is shown one embodiment of a network gaming environment that utilizes download and configuration capable gaming machine operating systems of the disclosed embodiments. Additionally, referring back to FIG. 1, an example slot management system is shown. One conventional gaming machine management system is the XYZ One System, which is designed to provide essential functionality for Class II facilities. The present example embodiment provides for a unified gaming machine management system that offers the full feature sets, which are desirable for a Class III casino floor with a rich gaming environment and providing the flexibility to mix Class II and Class III machines on the same gaming floor. To accommodate this unification, many features and functions are needed to provide a robust functional capability. In the example embodiment, an architectural framework is provided that enables the addition of modules and functionality. Slot management system 101 uses standards-based communications protocols, such as HTTP, XML, SOAP, SSL. Slot management system 101 is a scaleable system which includes off-the-shelf components, such as conventional servers and storage devices.

Slot management system 101 utilizes standard user interfaces for all system front ends, such as a display, keyboard, mouse, and conventional windows software. An example front-end may be a management terminal (server) 103 from which an operator can utilize a user interface to communicate with the player account system server 105 and review and/or modify player information contained in a player database managed by a player account system server 105. The Slot management system 101 uses standardized authentication, authorization and verification protocols, which is implemented and/or controlled by the S2S (server-to-server) server 107, which enables the secure communication of data and information between the respective servers within the system.

The third party interface 109 further provides for the incorporation of third-party servers and storage devices, such as IGT Rocket server 111 and Indian Gaming Database 113, using the standardized authentication, authorization and verification protocols. The Slot management system 101 supports a wide range of promotional tools to enable various promotional and marketing programs, which may be used in conjunction with casino market place server 115, such as a CMP, or another system gaming subsystem. Slot management system 101 includes transaction server 117, for example a XYZ iView transaction server, which communicates with XYZ iView apparatuses, which are incorporated with gaming machines connected to the network, where iView apparatuses include a secondary display connected to a motherboard including a microprocessor or controller, memory, and selected communication, player, and/or gaming software, such as a conventional video wagering game or multi-media presentations, which may be enabled by a player, the gaming machine, or the slot management system.

It may be appreciated that transaction server 117 can be designed to drive and communicate with other network connected apparatuses having a display and user interface. In the contemplated embodiments, the networked apparatuses, such as the iView apparatuses, are incorporated with slot management system 101 to multi-task as both a presentation engine and a game management unit (GMU). To provide flexibility, slot management system 101 utilizes open standard GSA (Gaming Standards Association) protocols for ease of integrating various manufacturer's devices and a windows-based system for ease of operators (users) in programming and obtaining data from, and adding data to the system.

Figures 1, 2A:
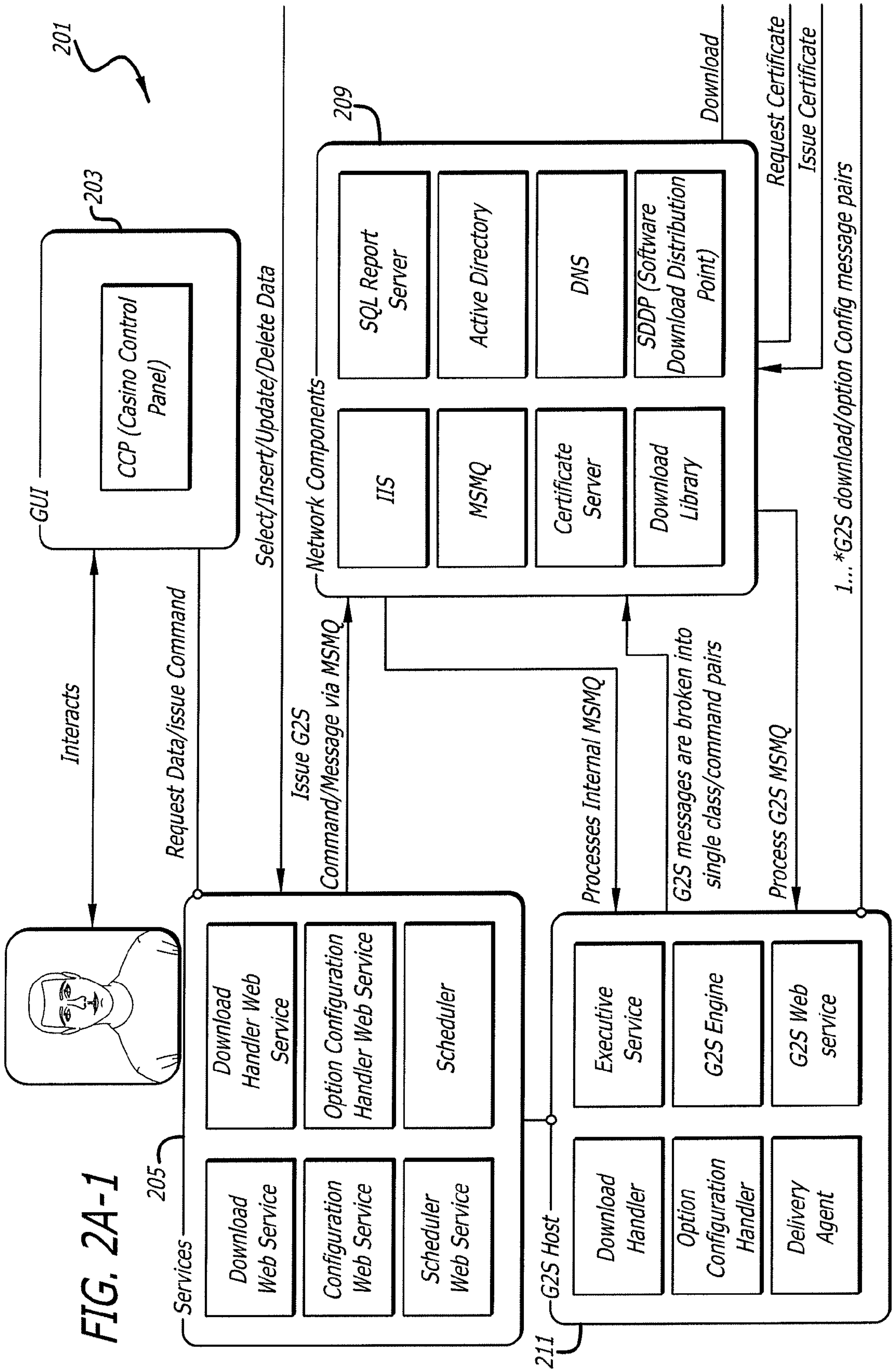
FIG. 2A is a logic flow diagram for download and configuration communications between a gaming server and a gaming machine.
Figures 2, 2A:
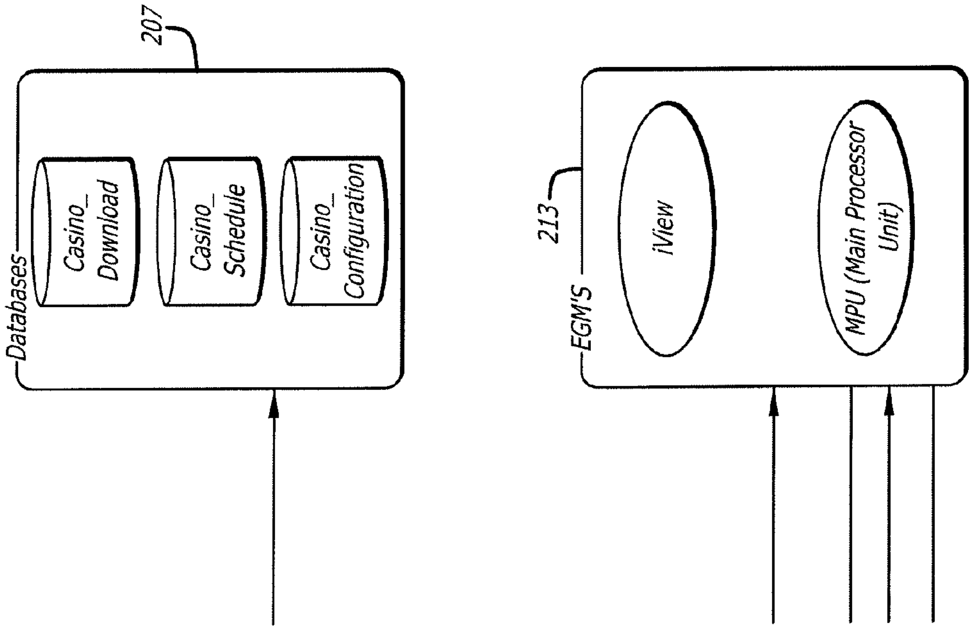
FIG. 2 is a logic flow diagram for download and configuration communications between a gaming server and a gaming machine.

Referring now to FIGS. 2 and 2A, an example context diagram of download and configuration server system 201 is shown including control station 203 (for example, a Control Station with a display and a user interface), download and configuration services block 205 (including, for example, a download server or WWW accessible service, a download handler server or WWW accessible service, a configuration server or WWW accessible service, an option configuration server or WWW accessible service, a scheduler server or WWW accessible service, and a scheduler server or WWW accessible service), download and configuration database block 207 (including, for example, conventional storage depositories such as containing a download database, a schedule database, and a configuration database), network components block 209 (for example, conventional hardware and software to support IIS, MSMQ, and DNS, a SQL report server, an active directory, a certificate server, a download library, and an SDDP (Software Download Distribution Port), G2S (Game-to-Server) host block 211 (including, for example, a download handler, an executive service, an option configuration handler, a G2S engine, a delivery agent, and a G2S WWW accessible service), and an electronic gaming machine (hereinafter "EGM") block 213 (including, for example, a facility floor of network connected gaming machines and tables which may each include an iView or similar product features and/or a gaming management processor unit, which are individually identifiable and addressable over the network.

Download and configuration server system 201 enables the transmission of software files, packages or modules to one or more clients, such as gaming machines or tables, via, for example, a casino network using the Gaming Standard Association's (GSA's) Game to System (G2S) message protocols. The configuration portion of server system 201 enables the selecting of specific settings and options on one or more clients using GSA's G2S message protocols, such as to modify the Alpha operating system on conventionally available gaming machines, third party gaming machines or table operating systems. The respective subsystems of server system 201 connect to control station 203 which includes a common user interface application, such as a Control Panel (BCP) software application, so that a user can request data and issue commands for the processing of download and configuration operations throughout the network.

Download and configuration server system 201 may provide features such as the following G2S download class features: (1) The G2S download class provides a standardized protocol to manage the downloaded content on all G2S compliant gaming machines or tables (EGMs) from all G2S compliant host systems; (2) The G2S download class enables installation of downloaded packages; (3) The G2S download class enables the removal of software (uninstall); (4) The G2S download class enables scheduling of installation and/or removal of software including enabling scheduling options that relate to a specific time, EGM state, or interaction with a host server or technician; (5) The G2S message class supports reading an inventory of downloaded packages and installed modules. This provides the capability to effectively manage the content on the EGM; (6) The G2S message class enables recording transaction logs for packages and scripts on a transaction database accessible through control station 203. This feature provides an audit capability or transaction tracer for determining how content came to be on an EGM; (7) Download and configuration server system also may provide the following G2S option configuration (optionConfig) class features, which allows for the selection of various configuration options; (8) The optionConfig class provides a convenient and efficient mechanism to remotely configure EGMs; (9) The G2S optionConfig class provides for downloading options available from within an EGM.

The Download and Configuration server system 201 implemented G2S classes (optionConfig, download, and scheduler) is also integratable through secondary displays, such as the iView, by incorporating, for example, an iView transaction server. Thus, download, configuration, and configuration options may be implemented at selected EGMs 213 through their respective MPU (Main Processor Unit) or iViews. In the case of using the XYZ iViews for network communications, a separate processor board is provided along with display and user interfaces. Communication channels are connectable between the iViews and the MPU to enable the download, configuration, and configuration option processes. Some definitions of terms and components follow:

Databases—The databases return information based on the results of a stored procedure call. By example, the following databases, which are descriptively named, may be utilized: Core; Configuration; Download; Activity; and Schedule.

BCP (Control Panel)—As an example, the control panel application, such as a Control Panel application, can be a smart client implemented on control station 203 encapsulating all the functionality to support the command and control portions of the download and configuration features of a facility or facilities. Downloads and configuration options can be remotely scheduled or deployed immediately by a user through control station 203. Notifications, approvals, searches, and reports produced through server system 201 can be viewed by a user through a display or through hardcopy provided by a connected printer to control station 203.

Control station 203 can be utilized for remote downloading and configuration of games and game operating systems of connected EGMs 213. Also, control station 203 can be utilized to download content to or to configure the iView (or similar components) and second game displays or monitors (for instance, in cases in which an EGM 213 has two or more major displays) (which may also include an additional processor unit such as, for example, in the case of multiple games operable on a single EGM 213 on separate displays), as well as peripheral software for components in the games, such as bill validators and ticket printers.

Database Web Services—These are world-wide web (WWW) services that are conventionally available to be reused by other user interfaces and service applications connected to slot management system 101.

Handlers—These are the logic libraries that are responsible for executing the business logic of the system.

Network Components—The following list of network components, or portions thereof, may be implemented and/or required by server system 201: IIS; MSMQ; Certificate Server; SQL Report Server; Active Directory; DNS; DHCP G2S Engine—This service will receive G2S messages directly from EGMs 213 and dispatch them to the respective subsystem of server system 201 based on the message component type.

EGMs—Electronic Gaming Machines, which may include tables with processor and/or display components.

iView—For example, a conventional apparatus providing a player user interface and display at EGMs 213 connected to the network including the player tracking server and enabling a player to request and receive information, to receive award notifications, to transfer credits, and to conduct such activities through the apparatus as is enabled on slot management system 101. One usage of an iView-type apparatus may be to display marketing and player tracking information and various shows on the occurrence of an award or win by a player. Such apparatuses may also be utilized as vessels for gaming, such as with server-based games or even independent games stored on their respective processor boards. Thus, separate games may be implemented through the iView-type device, apart from the main game of EGM 213 controlled by the MPU. In turn, the content of the iView may be separately modified as through downloads or configurations or configuration options.

Control station 203 is able to retrieve from the database and view all login attempts to the server both successful and failed. A user may be locked out of access to the control panel application at control station 203 after too many failed login attempts. The recorded transaction log may include the login ID, data, time of login and duration.

The web services may support functionality between control station 203 and database block 207. The web services may also support unsolicited messages between the G2S handlers and control station 203.

Server system 201 may maintain a record or transaction log of login attempts to the server both successful and failed. The log may include the login ID, data, time of login and duration.

Server system 201 may also maintain a transaction record or log of all events and activity occurring on server system 201. The log may include a record of the login session in which the event occurred.

The Server system 201 may also maintain a log of communication events with any EGM 213. Server system 201 may also maintain the status of each EGM 213, including: Game history data; Download status (available, requested, downloading, applied, rejected); Package information (available for install, requested, being downloaded, downloaded, installed); Hardware information; Software Module Information; and/or Error conditions.

The Server system 201 may dynamically build packages to be downloaded based on EGM 213 inventory and available updates, fixes and new data for EGMs 213. Server system 201 may verify requests from EGM 213, including whether or not EGM 213 is valid, and that it is in a state to make the request. All requests will be logged and contain EGM 213's identification number, time and date, specific request, and EGM status. Server system 201 may communicate with Software Distribution Point servers (SDDP) to maintain a list of packages that are available for supported EGMs 213. Server system 201 may supply the location of the SDDP when instructing EGM 213 to add a package. Server system 201 may verify that all required hardware and software for a package to be sent to an EGM exists before instructing EGM 213 to retrieve the package. Server system 201 may support multiple EGMs 213 in multiple sites and/or facilities and EGMs 213 produced by multiple manufacturers. Server system 201 may verify, using the information in the package header and the information stored about the selection of EGM 213, that a software package can be installed on a selected EGM 213 before instructing EGM 213 to add a package. Server system 201 may be able to track which packages are installed on any given EGM 213 and verify the data by requesting a selected EGM 213 to send package install information. Server system 201 may report bad images and errors and log them when failed package installation information is received from an EGM 213. Server system 201 and SDDP may be used to control all network pacing, bandwidth, error recovery, and monitoring. Server system 201 may be utilized for maintaining the location of all SDDP and the packages available on each.

The Software Download Distribution Point (SDDP) server may be utilized to maintain all downloaded software packages in a secure library with the required number of secure backups defined by a jurisdiction. The SDDP server may be used to restrict access to the library that stores all software download packages to only authorized personnel. The access may limit access, such as to only allow write access to those authorized to add, delete, and update packages and read access for all others authorized to access the library. The SDDP server may provide secure software level firewalls to restrict access to everything saved on the server. The SDDP server may maintain a log of login attempts to the server both successful and failed. The log may include the login ID of a user, data, time of login and duration. The SDDP server may maintain a log of all events and activity occurring on server system 201. The log may include the login session in which an event occurred.

Software packages added to the software library may be verified from the package data using an MD5 or SHA-1 or some other verification tool. The verification string may be added to a package header and used to re-verify the package after it is downloaded to the EGM 213. All verification failures and related errors may be logged, and the log entry may contain the date and time, the ID of the person running the process at the time, and the specific type of error that occurred. The verification features may also be displayed on the correct display area.

The SDDP server may be utilized to provide selected EGMs 213 with the communications port location and IP address used for sending software package data to the EGM 213. All data within a download package may be compressed using conventional compression techniques and transmitted in compressed format. On receipt, EGM 213 may decompress the downloaded software package.

Figure 2B:
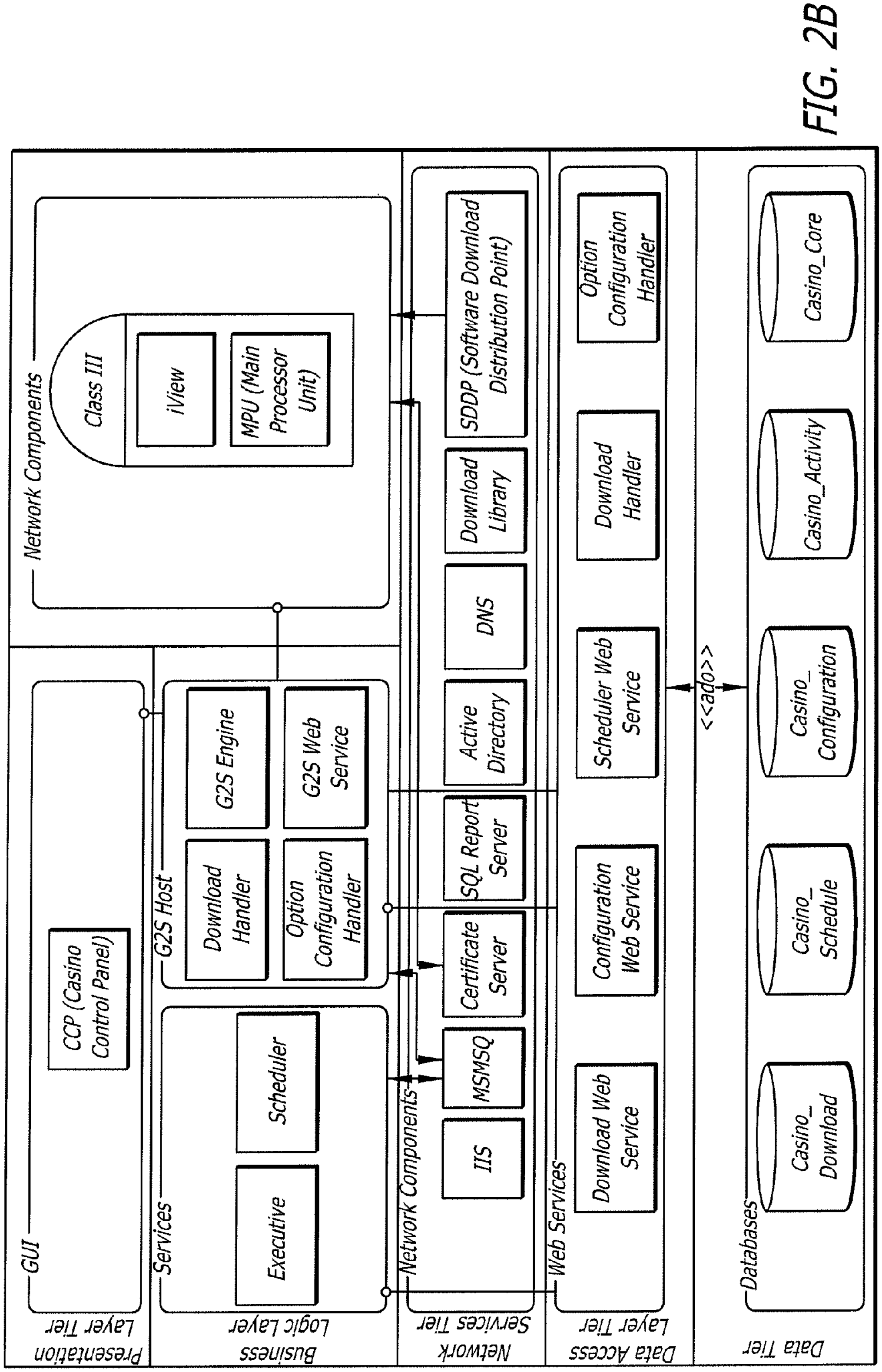
FIG. 2B is a block diagram of a system for download and configuration communications between a gaming server and a gaming machine.

Referring to FIG. 2B, a tiered block diagram of a download and configuration system architecture is shown.

The Presentation Tier may include the Control Panel application. The Control Panel application is loaded on control station 203 which provides a user interface and display through which the Download and Configuration portion of the slot management system 101 is managed.

The Business Logic Layer may include the G2S Host, which is comprised of the G2S engine components. The G2S Host may be used to send and receive the G2S protocol messages to and from EGMs 213 and other configurable devices. The G2S Host may also be used for the packaging and unpackaging of the internal system messages and the G2S protocol messages. The Business Logic Layer may further be comprised of the Download and Configuration logic libraries, the Executive Service, and the Scheduler Service which are responsible for implementing the Business Logic of the system.

The Data Access Layer Tier may be comprised of Web Services which may be used to enable methods and/or processes for interacting with the Data Tier.

The Data Tier may comprise Download, Configuration, Schedule, Activity, and Core databases and may be utilized for storing Download and Configuration system data.

The EGM Tier may comprise EGMs 213 and other configurable components like iViews and Game Controllers.

Figure 2C:
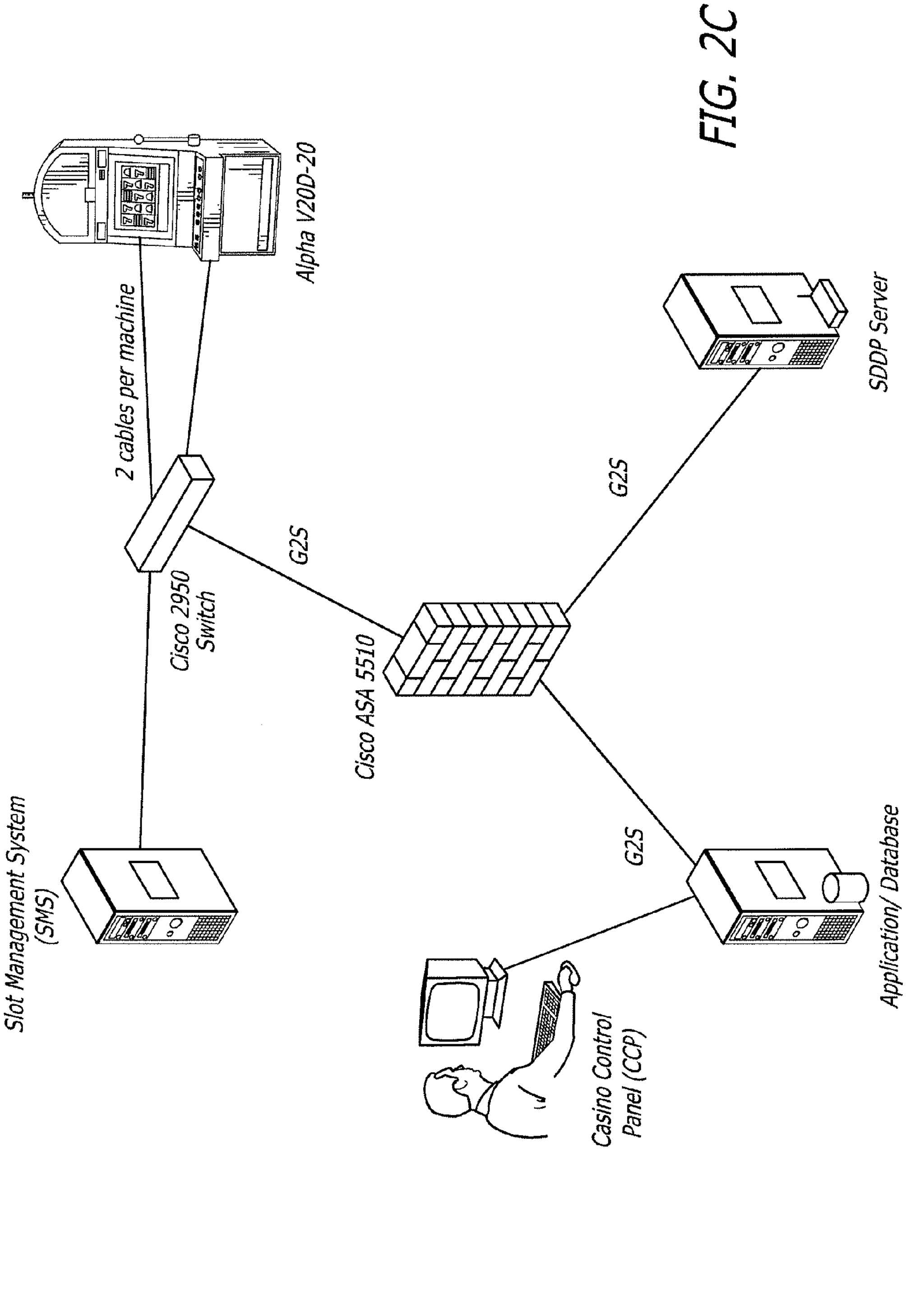
FIG. 2C is a block diagram of a system for download and configuration communications between a gaming server and a gaming machine.
Figure 2D:
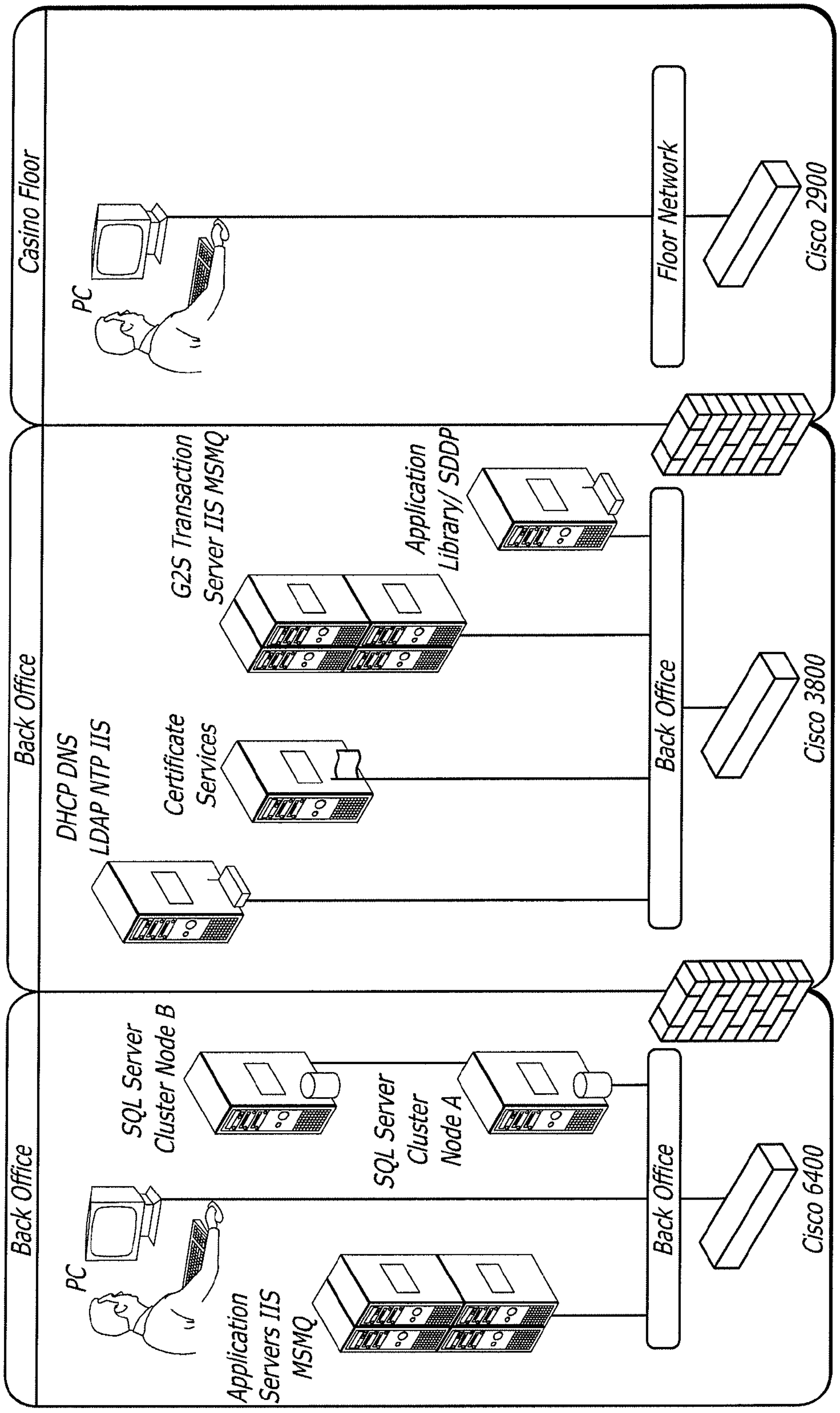
FIG. 2D is a block diagram of a system for download and configuration communications between a gaming server and a gaming machine.

Referring to FIG. 2C-D, a representative embodiment of a download and configuration server network 201 is shown. The Download and configuration server network 201 is a portion of the slot management system 101 which provides a suite of subsystems designed to provide customizable solutions by allowing users to select products within the suite to meet their needs for particular facilities, such as a casino manager, seeking to manage a single or multiple properties. Download and Configuration (Download and Config) are two of the subsystems offered in the suite that provides a user, such as the Slot Operations staff, an efficient mechanism to remotely configure the electronic gaming machine (EGM).

The Download and Config Software utilized together with the apparatuses as shown in the figures, may be used to enable a casino Slot Operations staff to schedule and change a game(s) on the casino floor from a keyboard.

Using the Control Panel (BCP) interface, the staff may be able to schedule, configure, download and activate changes to games on the floor, without touching an EGM on the floor. The Download and Config software application may be loaded on control station 203 to enable the sending of information over the casino network using G2S' & HTTPS' standardized message protocols that manage the downloaded content. From control station 203, a user, such as the casino staff, can change the cabinet or game options, or games in EGMs. There are numerous selections that the staff can schedule to configure or make a minor change. Some examples of the types of software that may be downloaded or options which may be re-configured are:

| Cabinet Options | Game Options | Download Options |
|---|---|---|
| Sound<br>Reel spin speed<br>Background color<br>Attract mode | Game/Theme<br>Paytable<br>Denomination | Change a game, theme, &/or paytable<br>Change the game operating system |

In order to implement the download and configuration features, one approach is to install the slot management system 101 at a facility, such as the XYZ_Live slot management system. The implementation of the download and configuration features further contemplates the implementation of server hardware and related equipment as shown in the figures, and particularly FIG. 2A-E, including software to perform the needed functions for communicating relevant data and instructions, the implementation of download ready EGMs, such as EGMs with an Alpha operating system with remote download and configuration capability. An example system for implementing the download and configuration network 201 may be an XYZ One System together with the XYZ Live Floor program. Another example implementation of the Download and Configuration server network may be in conjunction with other slot management systems incorporating the XYZ Live Core program.

An example process for using the Download and Config server network is as follows: a casino operator decides to change game themes on the Alpha V20D-20 EGMs. The software game themes are located on the SDDP Server. The Download management tools are located on the Application/Database Server System. One or more servers separate from the SDDP Server contain the game theme software, such as for security or redundancy purposes. The Alpha EGMs are identified on the casino floor using the BCP. A Download management tool, such as the BCP scheduler may be used through a menu to identify: the date and time to download the game packages; the game packages to send to the specific EGMs; and the date and time to automatically activate the games on the EGMs after the download. At the selected date and time, the EGM may open communication with the Download Database. The EGM requests software from the SDDP server.

The SDDP server downloads the specified game information to the EGM using https transmission protocol. The download to the EGM may occur in the background operation of the Alpha OS, so that gameplay is not interfered with. The EGM may de-activate game operation in a pre-determined amount of time subsequent to the last play on the EGM, such as five minutes, and issue a message on one of its display panels that it is temporarily offline, at which point the EGM can initiate installation of the downloaded software. A record of the transmissions and corresponding activity of the EGM is relayed to a retrievable storage on the network, such that a privileged user may operate the BCP to run the reports identifying the old and new games, date changed, and by whom. User privileges may be restricted as discussed previously to provide additional levels of security and flexibility within the system and for the casino operator or users of the slot management system 101 and download and configuration server network 201.

Example Download and Config components that are shown in FIGS. 2D and E indicate a system that supports up to 10 EGMs through a single Cisco 2950 switch. As the number of EGMs increase, the type and/or number of servers, switches, firewalls, and pipelines may be changed to accommodate higher traffic volumes and improve or avoid degradation of performance. In an example embodiment, the following apparatuses and software are incorporated:

SDDP Server
Download software Library:
Game server software
Download game software
Application/Database Server
Core Databases:
Core
Meter
Activity
Core Services:
Communication Online
Meter
Activity
Cabinet
Game Play
Download Services:
Web Service
Configuration Web Service
Scheduler Web Service
Download Handler Web Service
Option configuration Handler Web Service
Scheduler
Panel Control (BPC)
G2S:
Certificate, IIS, MSMQ, DNS, DHCP, Active Directory
SQL Report, Web Service, Delivery Agent
Download and Config Databases:
Download
Configuration
Scheduler
ASA (Adaptive Security Appliance):
Creates a firewall between back-end and floor systems
Provides proactive threat defense that stops attacks before they spread through the network, controls network activity and application traffic, and delivers flexible VPN connectivity.

| Example Components | Example Hardware | Example Software |
|---|---|---|
| SDDP Server (SDDP may be placed on its own server to comply with some jurisdiction requirements.) | Pentium IV 2 GB RAM 100 GB SATA 2 NIC cards | OS - Microsoft Windows 2003 Microsoft SQL 2005 |
| Application Library Server | Pentium IV 2 GB RAM 100 GB SATA 2 NIC cards | OS - Microsoft Windows 2003 Microsoft SQL 2005 |
| Databases: Scheduler Download Configuration | Pentium IV 2 GB RAM 100 GB SATA 2 NIC cards | OS - Microsoft Windows 2003 Microsoft SQL 2005 |
| Networking | Cisco 2950 Switch, 24 - port Cisco ASA 5510 (firewall) | |
| Connecting wiring between devices | CAT-5 cables 15 feet long 2 cables per EGM | |

Figure 3A:
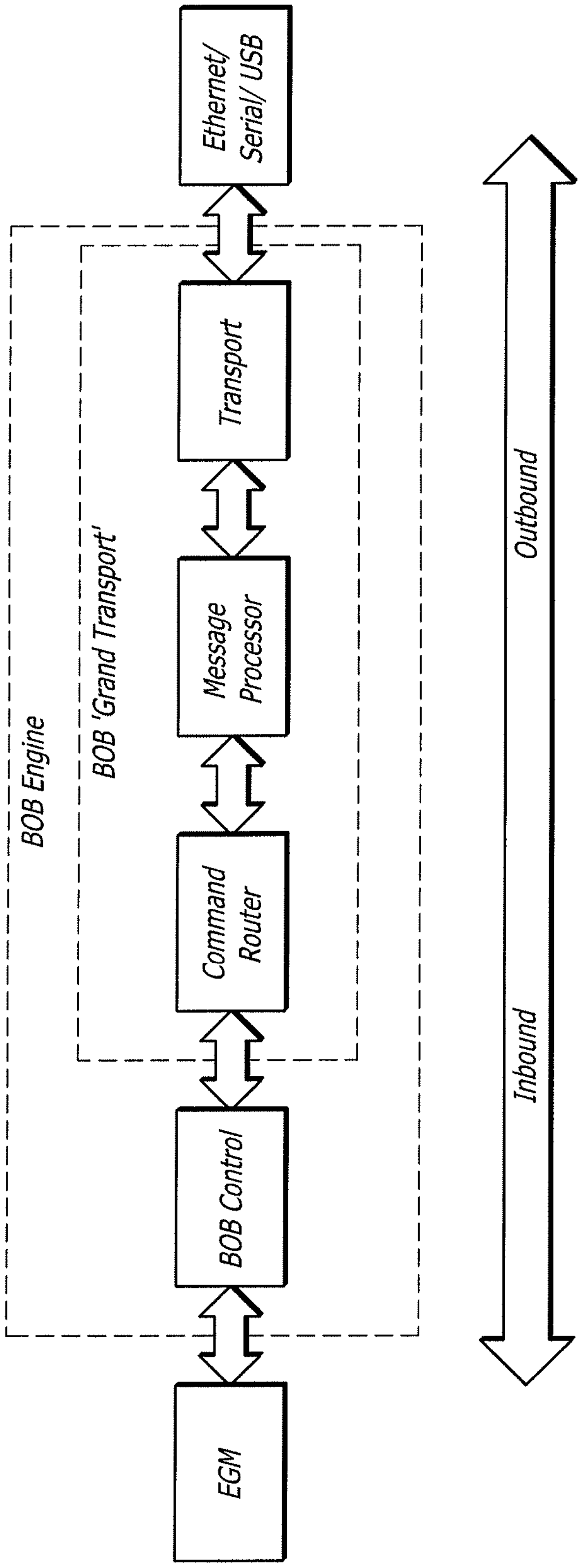
FIG. 3A is a logic flow diagram for a best of breed ("BOB") communications protocol.

Referring to FIG. 3A, an example block diagram of a "best of breed" (BOB) protocol communication engine is shown. The BOB protocol for communication is an example of one of the types of communication protocols that may be used. Another example protocol is the G2S protocol. (Both protocols are hereby incorporated by reference and are published by GSA). In this block diagram, the data flow is illustrated as a bidirectional path through the various components of the BOB Engine. The BOB Engine is defined as the complete interface between the EGM and the logical communication channel, but does not include the communication channel drivers. Persistent memory is only available outside of the "Grand Transport" block. The BOB control logic provides all the BOB command generation and processing. This logic is highly reusable for different manufacturers; however, some customization of a BOB BSP (board support package) may be required depending upon the slot management system with which the EGM is connected. The BOB Control logic contains the EGM BOB classes. The EGM BOB Classes manage their associated transaction logs in persistent memory, and the interaction between the EGM BOB class and the grand transport provides the necessary events for commit, rollback, and/or recovery of complete transactions.

Figure 3B:
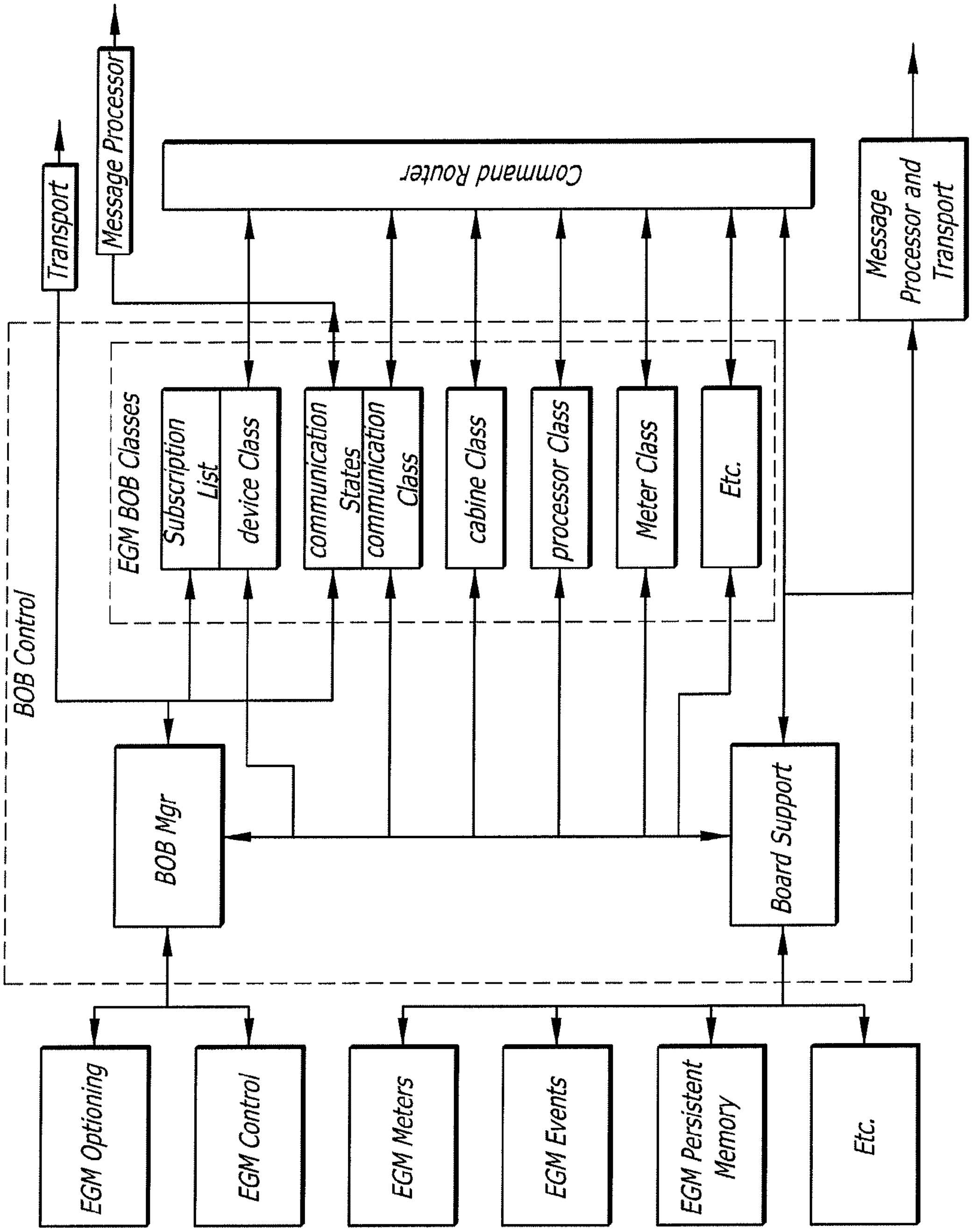
FIG. 3B is a logic flow diagram for core BOB classifications within an electronic gaming machine.

Referring to FIG. 3B, an example block diagram of EGM BOB classes is shown. In this diagram only the "core" EGM BOB Classes are identified along with the general BOB Control logic. This is a simplified diagram. It may be appreciated that the actual implementation may include various EGM BOB classes including multiple instances of the same device. The components to the left are essentially interfaces to the BOB BSP for the EGM BOB Classes, EGM Optioning data, and EGM Control logic. The EGM BOB classes may send and receive fully formed XML commands to and from the Command Router as indicated by the arrows on the right side (purple) of FIG. 3B. The EGM BOB Classes may be responsible for class specific content XML formatting. The EGM BOB Classes may send fully formed XML BOB command content to the Command Router. This may be analogous to marshalling the specific content. Similarly inbound commands may be fully formed XML BOB commands, which the EGM BOB Classes may be capable of ripping down to usable data structures, analogous to de-marshalling the specific content.

The device Class has a special relationship with the Command Router, as indicated by the communication flow lines (orange) connecting the device Class, Subscription List, and Communication States components with the BOB Mgr, Command Router, and externally. These devices are unique in that they have information to control the Command Router. The communication Class has a special relationship with the Message Processor, as indicated by the orange line in the diagram above. These devices are unique in that they may control the Message Processor's Keep Alive period, as well as respond to changes in communication status. Logic internal to BOB Control may instantiate the EGM BOB Classes, which will be registered with the Command Router. Additionally, the default owner host references may be presented to the command router via the EGM BOB device Class. Each instance of an EGM BOB Class may be aware of who its owner host is. This may enable the EGM BOB Classes in determining if a control command should be processed (a control command is any command that only the owner has permission to request). Logic internal to the BOB Mgr may initialize the EGM BOB device Class and subscribe each registered host as an owner to one of the device Class instances. Similar activity may occur with the EGM BOB communication Class and meters Class instances. The BSP interface may be provided to every module within the BOB Engine, including the BOB Control module. The BSP may be utilized for the Grand Transport to access EGM services.

Figure 3C:
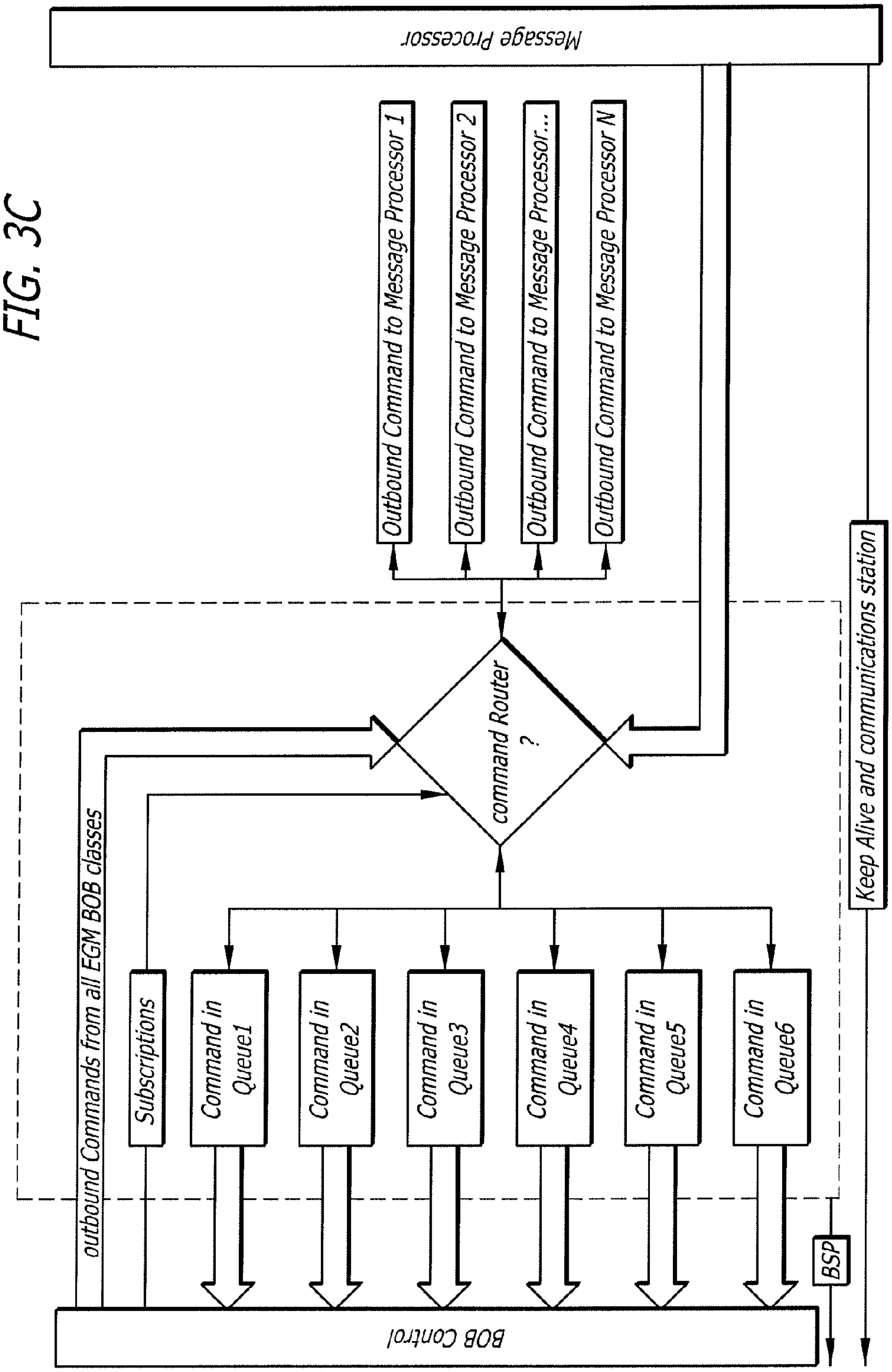
FIG. 3C is a logic flow diagram for BOB communications via a command router.

Referring to FIG. 3C, an example block diagram of a BOB command router is shown. In this diagram, some of the "core" EGM BOB classes are identified. This is only a simplified diagram. An actual implementation may include various EGM BOB classes within the BOB Control block including multiple instances of the same device. The BOB Control logic EGM BOB Classes may send complete BOB commands to the command router. Similarly, the Message Processors may send BOB commands to the router. The communication status information may bypass the router and be delivered directly to the BOB Control logic. The command router may use the device-to-host subscription lists to direct the outbound commands to the appropriate Message Processor. Similarly, the command Router may use the device registration lists to route the inbound command to the appropriate command in Queue.

The router may or may not have control over the subscriptions or registrations. The router may use them to direct the commands to the appropriate destination. The command in Queues may register multiple EGM BOB Classes if the BOB Control logic is so designed. If so, the BOB Control logic may be customized with respect to Queue's and inbound message notification logic. It may be desirable for some EGMs to be able to configure a single command in Queues; in other cases, it may be desirable for some EGMs to be able to configure multiple command in Queues with one for each EGM BOB Class instance, for example; and, in other cases, it may be desirable for some EGMs to be able to configure some combination of commands in Queues. Each case can be customized within a single network of EGMs. The router logic may or may not make logical (or rule-based) assumptions about Owner or Guest hosts when directing inbound commands. The router may pass on a host Id (Identification) to the EGM BOB classes so they can determine if action is required and whom to respond to.

Figure 3D:
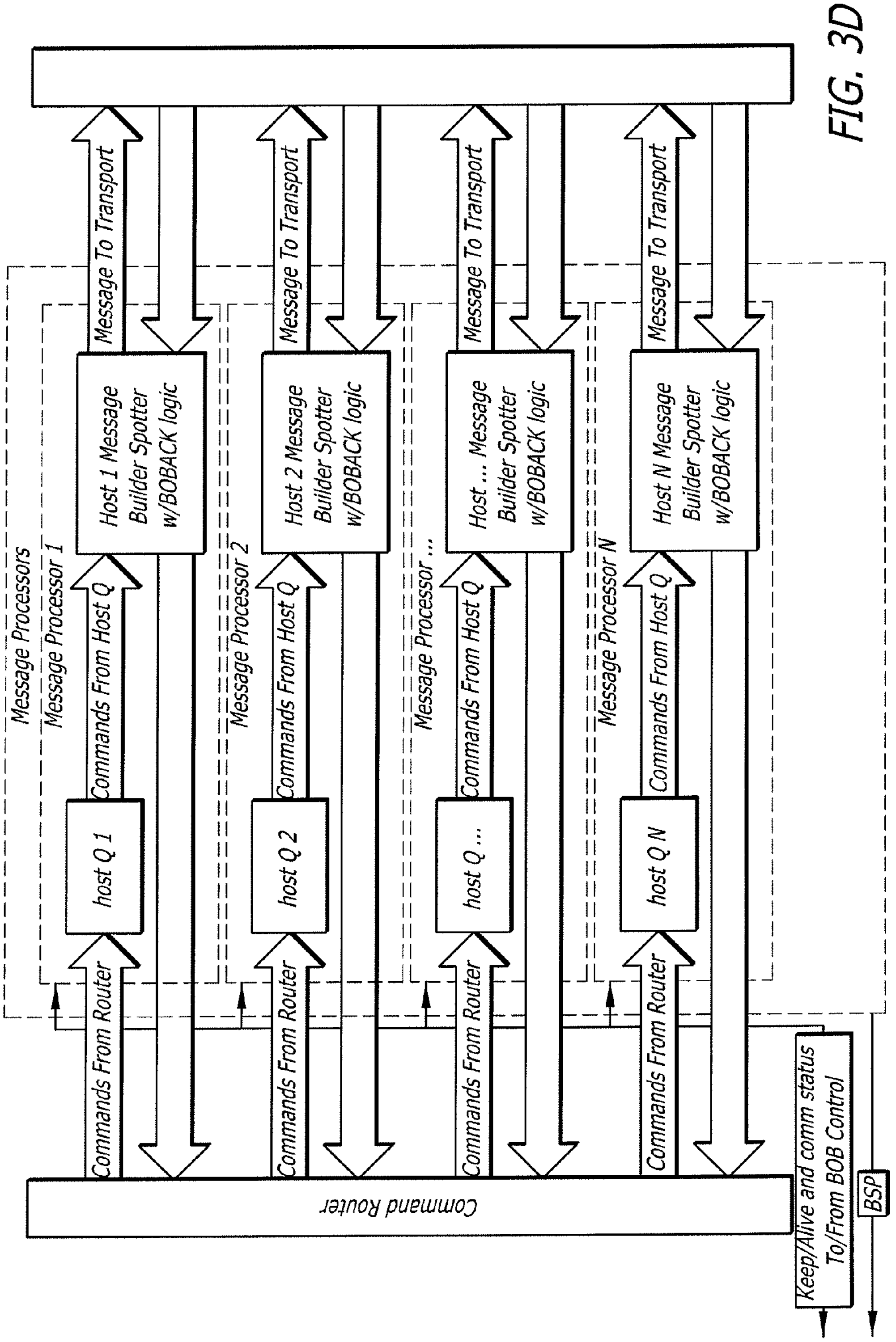
FIG. 3D is a logic flow diagram for BOB communications via message processors.

Referring to FIG. 3D, an example block diagram of a BOB message processor is shown. There may be a Message Processor for each host connection. By using separate Message Processors, a slow host may avoid bogging down communication with other hosts. The Message Processor may be responsible for: (1) combining outbound commands into messages, and proving the BOB message header; (2) processing message acknowledgments; (3) managing message retries; (4) splitting inbound messages into commands, passing the commands to the Command Router, and acknowledging the message; and (5) managing the timeout for the keep alive. For example, when a timeout occurs, a communication status event may be sent to the appropriate communications Class so that a keep Alive command can be generated.

The Message Processor may be aware of the communication status for each host, so the Message Processor may be used as a source of communication of status information. The Message Processor host queues may hold each outbound command until the message that contains the command is acknowledged. Once acknowledged, the command can be removed from the queue. The Message Processor may split inbound messages into commands and provide each command to the Command Router before acknowledging the inbound message.

Figure 3E:
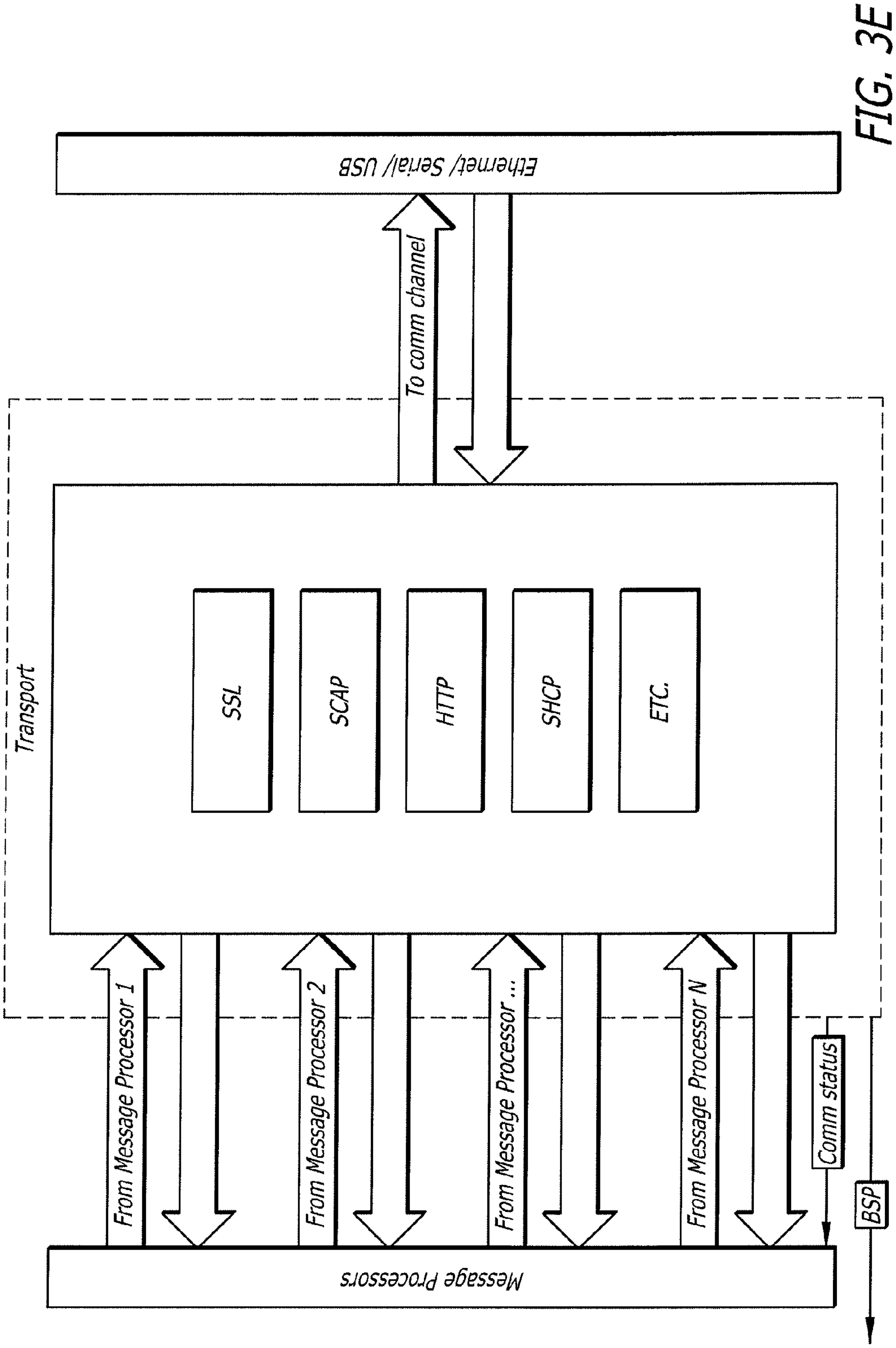
FIG. 3E is a logic flow diagram for BOB communications via a BOB transport.

Referring to FIG. 3E, an example block diagram of a BOB transport is shown. The transport layer may be viewed as a black-box to the outside world. No implicit knowledge of how it does what it does may be required by the message processor or communication channel drivers. There may not be any persistent memory available to the transport layer; in which case, persistence may be handled by the EGM BOB classes through the Message Processor and Command Router. Communication status information may be passed to the EGM BOB classes through the Message Processor and Command Router.

Figure 4A:
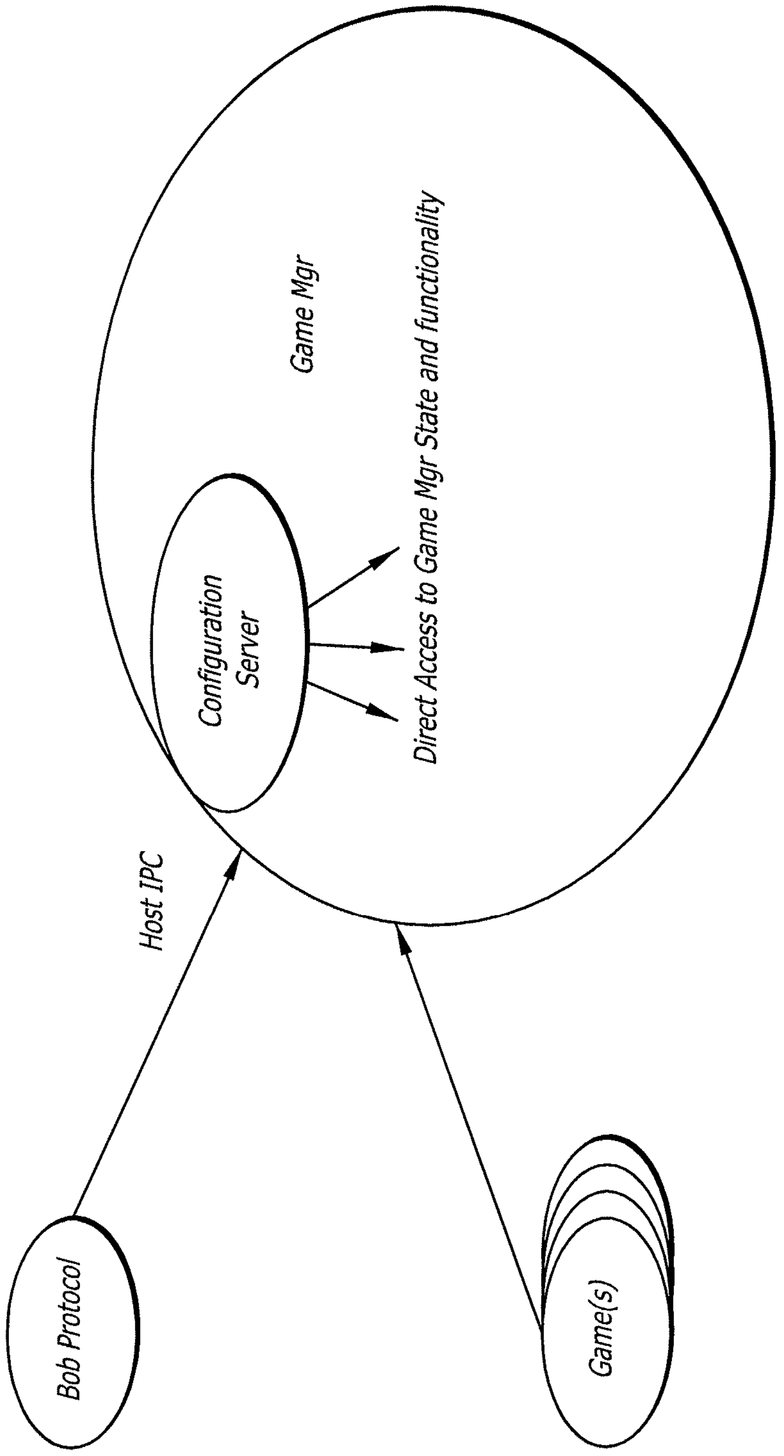
FIG. 4A is a block diagram of a gaming system architecture including a configuration server.
Figure 4B:
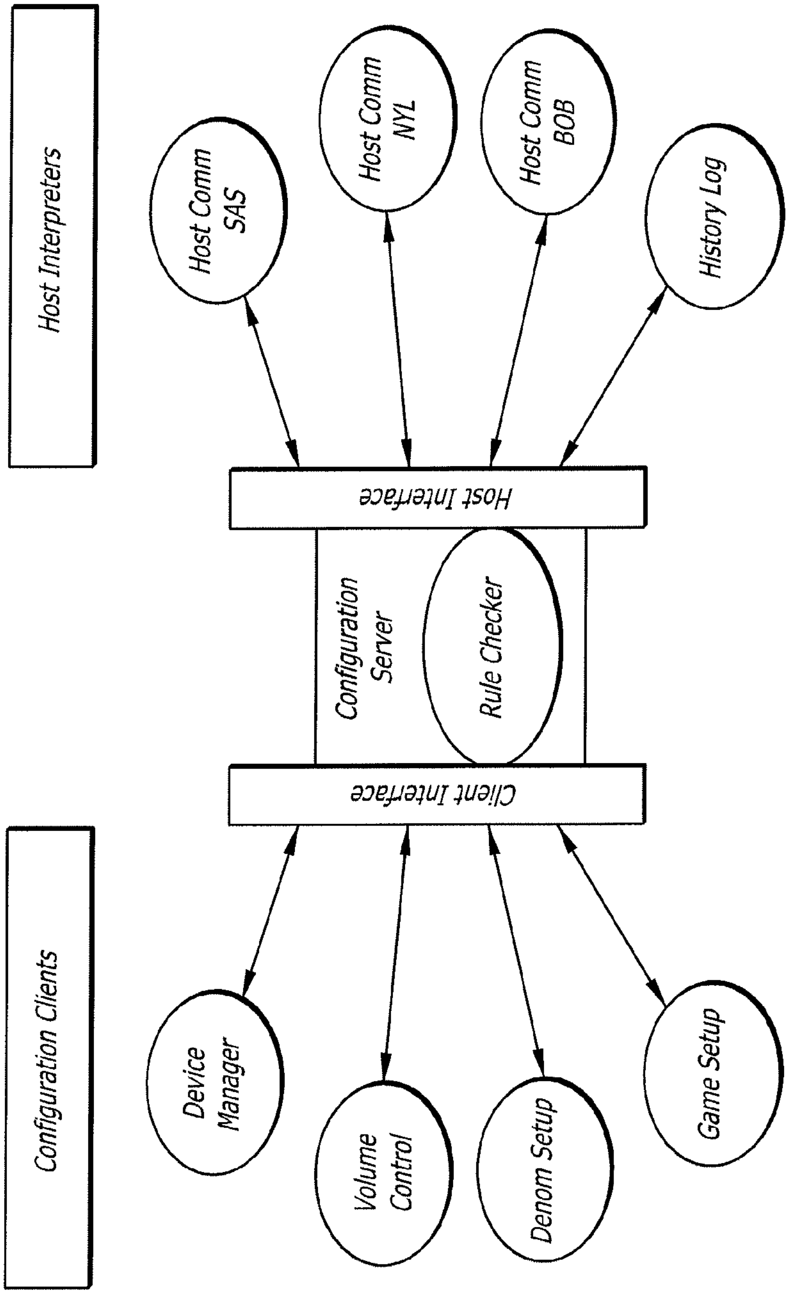
FIG. 4B is a block diagram of a gaming system architecture including a configuration server.

Referring to FIGS. 4A and 4B, an example symbolic architecture of a configuration management system within a gaming machine operating system (EGM OS) is shown, such as for example the XYZ Alpha OS. Various conventional communications protocols may be used within the Alpha OS communication; communications to external devices may use standardized protocols, such as BOB or G2S. Within the context of this description, the term Server and Client refers to the IPC Server/Client interface within the EGM OS environment. Example features that may be integrated with the EGM OS include: the Dynamic uploading of Templates and configuration to a host; and the Tokenized rule checker of Configuration options.

With reference to FIGS. 4A and 4B, IPC connections are established to and from the Configuration Manager. The Configuration Manager may be an IPC server to multiple Configuration clients, as well as multiple Host Interpreters. Embodiments may use one or more Host Interpreters interpreting for the Bob Protocol.

Some example OS Configuration Options may include:

| | |
|---|---|
| Game Speed | |
| Minimum Reel spin Time | Slide Bar - Multiple Choice |
| Maximum Reel spin Time | Slide Bar - Multiple Choice |
| Card Deal Rate | Slide Bar - Multiple Choice |
| Sound Levels | |
| Attract Volume | Slide Bar - 0 to 100 |
| Reel Spin Volume | Slide Bar - 0 to 100 |
| Bonus Sound Volume | Slide Bar - 0 to 100 |
| Button Deck | |
| Autoplay Enable | Boolean |
| Button Deck Selection | DropDown - Multiple choice |
| Game Pay table Slots | |
| Game/Pay table | DropDown - Multiple choice |
| Denomination | DropDown - Multiple choice |
| Number of Lines | Range Limited Integer Value |
| Max Bet Per Line | Range Limited Integer Value |

An example EGM Operating System Design may include the following:

Configuration Server

The Configuration Server may run as a component of game mgr with IPC connections to both clients and host interpreters. Clients may be users that may register configuration options and receive call backs when those options change. Host Interpreters may be users that may register for configuration error and change notifications, and pass the configuration information between the gaming terminal and an external configuration service, and visa versa.

The Configuration Server may act as a central point for a configuration management system. This server may not have specific knowledge of any specific options, but may handle each configuration option dynamically as it is registered and used. The Configuration Server may be responsible for the configuration client registering for a configuration, and, responding to a configuration change.

In an embodiment where the Configuration Server operates as a separate executable within the EGM OS, all other executables may have equal functionality and capabilities of remote configuration. The Configuration Server may be able to simultaneously maintain connections with multiple configuration clients and multiple configuration host interpreters.

Configuration Client

Configuration Client objects function to provide a useful interface to the configuration service. The methods given may not be direct IPC calls, in which case, they may be tools that use IPC calls to communicate with the configuration service. Various such methods may accept vectors of configuration objects to reduce calls and simplify interface, as it may be anticipated that various Configuration Clients may have multiple options to manage.

Configuration objects may be created at any time, but it may be preferable that configuration objects be registered before the "Game Complete" event. This may provide host interpreters with a consistent point of completeness and provide a more consistent interface with the given host system.

Managing Configuration Options with the Same Name

Multiple modules may have configuration options that have the same name. An example of this is volume. The Game may have several "Volumes" and the EGM OS may have its own volume. To manage this problem, a simple name to value pair is not sufficient, because the management server needs to be able to distinguish between the different volumes.

One technique is for each configuration option name to include the path of the configuration file that it was created from. This may reduce the restriction on option names to be unique per configuration file, while allowing multiple "volumes" across the system. This configuration path name may need to be overridden in some specific cases, in which case an IPC call may be supported to do so if and when it is needed. With the path now part of the name, the configuration options when presented to a GUI (user interface, such as a work station connected to the EGM remotely through the casino or slot management system) can be displayed as "Volume" but in the background can now be managed as, for example "cfg/OSSound/Volume" and "game1/theme/volume", keeping them separate and accurate.

Client Methods

The Virtual bool AppendCahnges(const ConfigurationError &append, unsigned int transactionId) appends additional option changes to the change request at the time of the test. Invalidates and closes the current testing transaction, and opens a new transaction with the specified append changes. It should be noted that this method does nothing if the option or options are already in the change or test list. This method is only able to append in a test handler.

The @param append provides the list of options to append to the test.

The @param transactionId provides the id of the transaction.

The @return bool returns true on success and false if not in test, or the options are already in test.

The RegisterConfigurationChangeHandler (ConfigurationChangeHandler handler) may register the given function pointer as the handler function for changes to configuration options registered for by the same client Object. This method may be called with a non-null value before other configuration options are valid.

The RegisterConfigurationOption (vector<ConfigurationOption> options) may register a vector of configuration options. This function will only work if the configuration change handler has already been registered for.

The UnRegisterConfigurationOption (vector<ConfigurationOption> options) may un-register a vector of configuration Options. The configuration service may match the client ID and configuration name when unregistering a configuration option, all other parameters are ignored.

The UpdateConfigurationOption (vector<ConfigurationOption> options) may re-register a vector of configuration option. The new options may be matched by client ID and configuration name, and the new options will replace the previously registered options. The entire operation may fail if any of the configuration options are not found.

The RegisterForChanges(vector<std::string>&options) may register options for changes. When options of the given names change, the configuration changed handler may be called. In one embodiment, this method may also register these options for test. In another embodiment, registering options for test may be done separately. For example, see next method.

The RegisterForTest(vector<std::string>& options) may register options for test. When options of the given names are about to change, the test handler callback will be called.

The PostConfigurationError(SimpleConfigOption& option, string error) may log an error of string error, referencing SimpleConfigOption option. This error may be added to the current error log, and host interpreters may be notified.

The RegisterTestCompleteHandler(TestResultHandler &handler) may register a call back handler for configuration change tests.

The TestOptions(vector<SimpleConfigOption>&option) may test a configuration value change. The configuration service may use the given value and re-evaluate the rules of configuration options registered for by the calling client. The registered TestConfigChange Handler may then be called with the error log of configuration options registered by the calling client. ConfigurationOptions that the client did not register for may not be evaluated. This may prevent errors in other configurations from halting all configuration changes.

The SetOptions(vector<SimpleConfigOption>&options) sets the value of configuration options, without risk of modifying any of the other configuration object parameters. SetOptionValue may trigger a change handler call if the new value is invalid and has to be changed back to the previous value.

Client Configuration Handlers

The ConfigurationChangeHandler(vector<SimpleConfig Option>&options) is called when a configuration change has occurred. When a client receives this call, all of the options that changed in the same set call by a host interpreter will be contained within the vector.

The TestResultHandler(bool valid, vector<pair<SimpleConfigOption, vector<strings>>&errors) is called after a TestSetOptionValue. The Boolean will represent the validity of the new value. The pair consists of a Configuration Option, and the errors it generated, the topmost vector will be the same size as the vector in the request, and each configuration option from the request will be present. The vector of strings will be size 0 for configuration options that did not error.

Configuration Host Interpreter

The configuration host protocol may not be confined to a single protocol. This may enable the configuration service to work in more environments, and not require additional host resources in many cases. To accomplish this, a generic Host Interpreter API may be defined. This may enable host protocol implementations within game manager to translate (or interpret) the configuration interface to match the needs of most protocols. Since configuration options may be controlled by the client object that registered them, the Host interpreter may be able to affect the value of an option but not be able to change other parameters including the allowed list, and the rule sets.

The Configuration Template

One of the requirements of configuration is to be able to upload a configuration template to the host system. A configuration template is a dynamic list of Configuration Options. The Configuration Server will populate this list sorted by category and subcategory. When a XML dump of the configuration options is needed, the host interpreter will concatenate the XML dump of each option into a single buffer. Example Host Interpreter Methods may include: (1) GetConfiguration(vector<ConfigurationOption>&options); and (2) Retrieves all options, sorted by category and sub category.

The GetTestTemplate (vector<Configuration Option>& options) retrieves the test template. The test template is to assist compatibility testing for configuration servers. The template attempts to test all of the control types, and heavily test the rule evaluator. The host can then make a determination of the compatibility of the server side GUI support and rule evaluator. Every control type should be supported by the GUI with the given parameters and values, and every rule should resolve as true and without error.

The RegisterConfigurationErrorHandler(ConfigErrorHandler &handler) registers a function to be called when a configuration error occurs.

The RegisterTestCompleteHandler(TestResultHandler &handler) registers a function to be called when configuration tests have been completed.

The RegisterConfigurationChangeHandler(ConfigChangeHandler &handler) registers a callback to receive notifications when: (1) The value of an option has changed, or (2) The parameters of an option have changed.

When a configuration object has either been added or removed Validate( ) a force check all rules should be performed. Replies with Boolean and triggers are called to registered Error Handler. If the error report is generated due to a validate call, the first string will read: "Validation of configuration rules failed."

The TestConfiguration(vector<SimpleConfig Option>options) sends the list of options to the configuration server to test rules. This call will not cause any change handlers to be called. If this function returns false, an error report will be generated.

The SetConfiguration(vector<SimpleConfig Option>options) sets the configuration values in the vector of options.

An Example Host Interpreter Handlers may include: ConfigErrorHandler(vector<string> errors). This handler will be called when new error strings are made available. This function will NOT be called for errors generated from Test calls, and the configuration server does not keep a log of these calls. The order of the strings is the order that they were discovered by the configuration service, (perhaps based on the order the configuration server tested configuration rules), but they all are considered to have occurred at the same time.

The TestResult Handler(bool valid, vector<pair<SimpleConfig Option, vector<strings>> errors) is called after a TestSetOptionValue. The Boolean will represent the validity of the new value(s). The pair consists of a ConfigurationOption and the errors it generated, the topmost vector will be the same size as the vector in the request, and each configuration option from the request will be present. The vector of strings will be size 0 for the configuration options that did not error.

The ConfigChangeHandler (vector<SimpleConfigOption>&options) is called when configuration values are changed. All host interpreters will receive change notifications when any configuration value changes. Unlike Configuration clients, Host interpreters are automatically registered for all configuration option changes.

The Config Change Handler (vector<ConfigurationOption>NewOptions, vector<ConfigurationOption>RemovedOptions, vector<ConfigurationOption>ModifiedValueOptions, vector<ConfigurationOption>ModifiedParameterOptions) is called whenever configuration changes. All host interpreters are notified via this callback. The Vector of NewOptions is the new options that have been registered. The vector or RemovedOptions are the options that have been unregistered. The vector of ModifiedValueOptions is options whose value have change. The vector of ModifiedParameterOptions is options with new, removed, or modified parameters. If both the value and parameter of an option has changed, it will show up in both the ModifiedValueOptions vector and the ModifiedParameterOptions vector. Most commonly, the ModifiedValueOptions vector will be non-zero and the reset will be zero sized. This function is not generated directly from a call to SetConfigurationValues.

In one example method of managing Configuration Options, configuration options may be grouped in Categories. Groups may be ordered first by their definition of category parents, and next in the order they are registered. Configuration options may be available as both C++ object and as a XML text representation. A configuration template may include an accumulation of configuration options. Every configuration object may be responsible for defining rules that will prevent illegal configurations as a way to avoid possible incomplete configurations and non-recoverability in the case, for example, of one time configurations, interdependencies, and the like.

Changes may occur singularly, or as a whole. Each configuration request may be treated as a single transaction regardless of the size or number of options that change. All rules will be re-evaluated before changes are implemented. Registered clients will receive their option changes at the same time to avoid chicken/egg situations. Configuration clients may have their handlers called in the order that the client registered with the configuration service.

Configuration Categories

Configuration option names need to be protected from conflicting from one another. Configuration clients may wish to implement configuration options with the same simple name, i.e. "volume". The solution is to place configuration names within categories. By using categories, configuration options can now be uniquely identified.

For example, in a multi-game environment, 2 games may wish to have the volume option. But if they are separated into categories like game1/ or game2/ then the full option identification would be unique. "Game1/volume" or "Game2/volume". In such instances, the category may be constructed as a path.

Storing Configuration in NVRAM

Saved in NVRAM will be the category, name, and string value of every configuration object. The categories will be stored in a lookup table to save space, and the value will be stored separately with index references to their category and names. As an example, an initial space of 50 k of NVRAM may be allocated in a single block. Configuration data may be streamed to the block as configuration changes are made.

An NVRAM management algorithm may be used to manage the NVRAM structure. If the 50 k is not managed by a management algorithm or tool, then a change at the beginning of the structure in the length of a string can cause the entire 50 k to be re-streamed to NVRAM, causing unacceptable resource loads. Instead, it is preferable that the data be kept in an allocation table, so that the data can be dynamically rearranged to reduce NVRAM writes on configuration changes. A background timer or thread may then be used to defragment the data over time and to create larger blocks of space for future configuration changes. If a configuration change is made that does not fit into NVRAM, then the change will not occur, and the configuration change will be denied with an error for insufficient space. In such a case, an NVRAM management algorithm could be called in order to add additional space and thereby enable the configuration change. If a change occurs for which there is sufficient NVRAM space, but due to defragmentation there are no continuous blocks large enough to contain the change, then the defragmentation process will be forcefully completed just enough to allow the change to take place. The forced defragmentation will only defragment the entire 50 k of space if it is absolutely required. The goal is to complete the write with as little NVRAM access as possible.

Configuration rules are intended to allow the configuration manager and the host system to pre-check all configuration requests and make accurate predictions on, if a configuration is possible and valid. The host system will be able to also use the rules system to provide immediate feedback to a GUI user if the configuration that is being created is valid. The Rules system is not the last stand against illegal or bad configurations, but it may be used to cover the majority of cases. Additional coded checks within the gaming machine will be made to ensure that an error in a configuration rule does not allow illegal configuration. For every rule, the final result must be true, or the option will be considered invalid. Multiple rules can be applied to any Option. It is better to have multiple rules than a single large rule consisting of a series of ands. This will allow error reporting to be much more specific. Rules may be similar to C style expressions, and can reference other options by their name. To refer to another option by name, the [OptionName:defaultValue] operator may be used. The OptionName is the name of the option being referred to, and the defaultValue is the value that is returned if OptionName is not found.

Example Key Words may include the following:

[THISVALUE] refers to the option being tested in the rule. For example, [THISVALUE]>=[OptionName:O] will ensure that The option being tested is greater than the option referred to by OptionName, or 0 of OptionName is not found.

[FAULT text] will cause a FAULT with the given text. For example, [OptionName:[FAULT text]] will FAULT if OptionName is not found. The text parameter will be displayed in the FAULT. This feature is intended to test compatibility up front, hopefully only to occur within a development environment. It is not recommended to test the existence of options from another process, as this can cause significant backward compatibility problems.

In one embodiment, # may be the error statement keyword. Any text following this symbol will be displayed as the error message if this rule fails.

In another example, there may be two possible rules for Printer Limit.

1—([THISVALUE]>=[BaseDenomination[FAULT BaseDenom Not Found]]) # Printer limit must be greater than Base Denomination; and 2—(([THISVALUE]<=Dackpotumit:01)||JackpotLimit: 0]== 0)) # Printer Limit must be less than Jackpot Limit.

These rules may ensure that the Printer Limit is greater than the Base Denomination. If the Base Denomination is not found, then the machine will fault with the text "BaseDenom Not Found". If the BaseDenomination is found, but fails the >= conditional, than the text "Printer limit must be greater than Base denomination" will be displayed to the operator.

Example Variables, Operator, Constants and Rules

Constants should always be found within quotes. Both Numeric and strings follow this rule. For example, “100” or “XYZ Gaming and Systems” Supported Operators:

Operators with 2 parameters: If either operand is non-integer, the expression is executed as if both operators are string. Binary character by character compares stop at the length of the shortest string. When Boolean options are used with these operators they are considered to be of value “1” or “ ” or “0” (both “ ” and “0” are false).

Two operand Operators:

Addition +

Integers:

Returns the sum of both operators.

Example: “1”+“1”

Return Value: “2”

Strings:

Returns a string of string1 and string2 concatenated.

Example: “String1”+“2”

Return Value: “String12”

Subtraction −

Integers:

Returns the difference.

Example: “2”−“1”

Return Value: “1”

Strings:

Returns string1 with first instance of string2 removed. Also removes leading spaces, and double spaces that are created.

Example: “XYZ Custom XYZ Options”-“XYZ”

Returns: “Custom XYZ Options”

Multiplication *

Integers:

Returns the product.

Example: “2”*“4”

Return Value: “8”

Strings:

Results in an error

“(OPTIONNAME)(CONSTANT) expected to be an integer value”

Division /

Integers:

Returns the quotient

Example: “2”/“4”

Return Value: “0.5”

Strings:

Results in an error

“(OPTIONNAME)(CONSTANT) expected to be an integer value” Modulus %

Integers: Returns the remainder

Example: “4”%“3”

Return Value: “1”

Strings:

Results in an error

“(OPTION NAME)(CONSTANT) expected to be an integer value”

Greater Than >

Integers:

Returns true if integer1 is greater than integer2

Example: “2”>“1”

Returns: “1”

Strings:

Returns true if string1 is alphabetically greater than string 2

Example: “Cool”>“Awesome”

Returns “1”

Example: “1 00CoolOnes”>“2CoolOnes”

Returns “1”

Example: “1 CoolOnes”>“2CoolOnes”

Returns “0” Less Than <

Integers:

Returns true if integer1 is less than integer2

Example: “2”<“1”

Returns: “0” Strings:

Returns true if string1 is alphabetically less than string 2

Example: “Cool”<“Awesome”

Returns “0”

Example: “1 00CoolOnes”<“2CoolOnes”

Returns “0”

Example: “1CoolOne”<“2CoolOnes”

Returns “1”

Greater Than or Equal to >=

Equivalent to ((var1>var2)H(var1==var2))

Less than or equal to <=

Equivalent to ((var1<var2)H(var1==var2))

Open Parentheses (

The Start of another operation. These can be nested.

Close Parentheses)

End of an operation

Equal To ==

Integer:

Returns true if integer1 is equal to integer2

String:

Returns true if string1 is exactly equal to string2 (case sensitive)

And Compare &&

Integers:

Returns true if integer1>0 and integer2>0

Strings:

Returns true if Length(string1)>0 and Length(string2)>0

Or Compare ||:

Integers:

Returns true if integer1>0 or integer2>0

Strings:

Returns true if Length(string1)>0 or Length(string2)>0

Binary And &:

Integers:

Returns result of binary and of integer1 with integer2

Example: “6” & “3”

Returns: “7”

Strings:

Results in an error

“(OPTIONNAME)(CONSTANT) expected to be an integer value”

Binary Or |

Integers:

Returns result of binary or of integer1 with integer2

Strings:

Results in an error

“(OPTIONNAME)(CONSTANT) expected to be an integer value”

Binary Xor ^

Integers:

Returns result of binary Xor of integer1 with integer2

Strings:

Results in an error

“(OPTIONNAME)(CONSTANT) expected to be an integer value”

Example Single Operand Operators

Not !

Integers:

Returns true if integer2 is equal to zero.

Strings:

Returns true if length of string 2 is zero.

Parentheses may be required around this operator, and its operand.

Example Order of Operation:

No order of operation will be supported. Only one operator per pair of parenthesis allowed.

Example Special Functions:

Length(string)

Returns the number of characters of string.

AllowedBy(string, OptionName)

Returns true if the test value is found in the Allowed By list of OptionName. Returns false if OptionName is not found.

GetAllowedValue(integer, OptionName)

Returns the N'th allowed value listed in OptionName. Base 1.

Returns " " if OptionName is not found.

Valid(OptionName)

Returns false if OptionName is not found, or if any of OptionName's rules do not evaluate to true. Valid calls only stack to one level. If a rule is being evaluated due to a call to Valid, all Valid calls made by those rules will return true. This eliminates possibility of endless recursive Valid calls.

Int(integer)

Returns the truncated integer value.

CaseCmp(string], string2)

Equivalent to (string]==string2)

CaselCmp(string], string2)

Similar to CaseCmp except case insensitive.

Concatinate(string1, string2)

Similar to (string]+string2) except that it will not attempt to resolve to integers.

StringSubtract(string1, string2)

Similar to (string]−string2) except that it will not attempt to resolve to integers.

GetHigestFromList(string)

Returns the highest constant from given comma delimited list.

GetLowestFromList(string)

Returns the lowest constant from given comma delimited list.

GetListCount(string)

Returns the number of constants found in given comma delimited list.

IslnList(value, string)

Returns true if value is found in the comma delimited list string

GetListIndex(integer, string)

Returns the N'th constant in the given comma delimited list. Returns " " for out of bounds check.

IsEnabled(string)

Returns true of the option named by string is enabled, otherwise false.

RegExpression("string", "expression")

Returns the result of applying expression to string.

Example: To check the format of a string:

Given [THISVALUE] needs to look like "L1_Blazing7s_SABC".

To check that the format of this string is an L, followed by a single digit number, followed by an underscore, followed by the ThemeID, followed by an underscore, followed by a string of capitalized characters, use the following RegExpression Call:

[THISVALUE]==

RegExpression([THISVALUE], "^L[1-90]_"+ ([ThemeID:" "]+"[A-Z][Z-A]*"))

Example: To check if a Regular Expression is found within a string Given [THISVALUE] needs to contain a lower-case letter followed by a number To check that string contains a lower case letter followed by a numeral digit:

Length(RegExpression([THISVALUE], "[a-z][1-90]"))>0

If Length of the return value from RegExpression is non-zero than the expression was found. RegExpression would have returned a zero length string if it was not.

Referring now to the ConfigurationOption Object, within the development environment, an Option can be viewed at any time as a C++ Object, or as a XML text buffer. The configuration Object may be handled within the context of a standard template library vector. Configuration Hosts and the configuration manager may view configuration options in their whole form, while configuration clients may handle configuration options by their name and value.

Creating an Option Object

An object may be created from a file. The CreateFromFile (vector<Configuration Option>& Options, char*filename) fills the vector Options with all of the Options defined by filename. It will also automatically append the path information as necessary to ensure that each configuration option has a unique name. Alternatively, the Option can be constructed run time, by declaring an Option and filling each parameter. The Caller will then be responsible for ensuring that configuration option names are guaranteed unique. The configuration object may preferably be validated before using.

Example Components of an Option may include

Category

The Name of the Category that this object will reside in.

Name

The Name of the Option.

Value

The Value of the Option. The creator of the Option is responsible for filling this with the "default" value.

Type

The type of the option Value. The supported types are: double, signed long, string, and Boolean.

Minimum

Optional, the minimum value of Value.

Maximum

Optional, the maximum value of Value.

Allowed Values

Optional, if provided, Value must be equal to a value supplied in the allowed value list.

Allowed Value Rules

Optional, for each allowed value, this rule will check if the allowed value will be present.

Control Type

Type of control object to display in GUI to the operator.

Supported Control Types are:

Category: New Category. This will use the Value as the name of the new category. The only other member variables that will affect this option on the GUI end is the Visible flag. Value and AllowedValues and Rules are still available when evaluating Rules.

Single Line Edit Box: Simplest of Control Type. This is a text box that will accept a single line of text.

Multi-Line Edit Box: This is a text box that will allow for new lines.

Slider: This is a drag-able slider bar. To use, provide a min and max. Also supports allowed value list.

CheckBox: Used for Boolean options. May be checked or un-checked by operator.

CheckBoxArray: Used for comma delimited lists with allowed value sets. Each selected checkbox will add a comma delimited string to the Value.

ListBox: Displays Allowed Values to be chosen from by Operator.

ComboBox: Displays Allowed Values list but allows Operator to enter a custom single line of text.

RadioButton: Will list Allowed Values as Radio Button options, and the Operator will be allowed to select one.

Rules: Expressions that must resolve to true or non-zero length string for Value to be considered valid.

ReadOnly: Boolean signifying if this is a modifiable option. It is preferable if the ReadOnly flag be set once to prevent confusion or conflicts when copying one machine's configuration to another.

OneTimeSettable: Boolean signifying if this option can only be set once per ram clear.

IsSet: Boolean signifying if this option has been set at least once since ram clear.

ReadOnlyWithCredits: Read Only With Credits signifies that this Option can only be modified while there are no credits on the machine.

Visible: Boolean signifies if this option can/will be displayed to the operator.

RestrictToAllowedValues: Boolean signifies that the Value must be on the allowed value list. When this flag is not set, Allowed Values are used more as "suggested" values. May not use this option in combination with Control Type Combo Box.

Unique PerMachine: Flag that signifies the option is part of the identity of a gaming machine, and should not be copied to another machine. No 2 machines should have the same value.

CommaDelimitedList: Flag that signifies if this option is intended to be a list of values. Comma delimited lists are intended to have the format "(value)","(value2)","(value3)"

Enabled: This flag signifies if this option is "Enabled". Enabled means that a change in the option can have an affect, while not "Enabled," means that this option value is ignored. For example, in Iowa, there is no printer limit. Accordingly, the printer limit is "Disabled." The printer limit can be given a value, but it will have no effect on the operation of the machine.

If Enabled is not present in the definition of an option, it is assumed to be true. Enabled's primary purpose is for the use in Rules. A rule may check the enabled state of itself, and either require that the value is some fixed number, or allow any value, since it has no effect for example. Rules may also check the enabled state of other rules. For the Iowa example, the tax limit may normally check to ensure that it is greater than printer limit, if the printer limit is enabled, otherwise, ignore the rule. The same rule would then work for jurisdictions that have a printer limit and for jurisdictions that do not.

Enabled should not be used for a dynamic state of enable. Instead this is used as a constant state, part of the template, and should not change in the life of a machine when possible. If a dynamic enable is needed, then another Boolean option should be created, and that other option can contain the enabled state needed.

MemberMethods

Set Methods

SetCategory(string)

Set the Name of the Category where this option will be found.

SetName(string)

Set the Name of this Category

SetValue( . . . )

Set the value of this Category. Multiple parameter types will be supported, including but not limited to: Boolean, string, int, double, float, long, unsigned. Comma delimited lists can be created using SetValue and a parameter of type: vector<type>

SetType(enum)

Set the type of this Option.

SetMininum( . . . , bool enabled)

Enable or Disable the Minimum with given value. All non-vector types of SetValue( ) will be supported in this function SetMaximum Enable or Disable the Maximum with given value. All non-vector types of SetValue( ) will be supported in this function SetControlType(enum)

Set the Control Type.

SetReadOnly(bool)

Set the Read Only flag

SetOneTimeSettable(bool)

Set the One Time Settable flag

SetIsSet(bool)

Set the Is Set flag

SetReadOnlyWithCredits(bool)

Set the Read Only with Credits flag

SetVisible(boot)

Set the Visible flag

SetRestrictToAllowedValues(boot)

Set the Restrict To Allowed Values flag

Example Add Methods

AddAllowedValue (vector<string>)

Adds an Allowed Value and its rules. The first element in the vector is the Allowed value, all subsequent elements are rules.

AddRule(string)

Adds a Rule to the Option.

Example Remove Methods:

RemoveRule(string)

Removes any rule of matching string.

Remove Rules( )

Removes all rules

RemoveAllowedValue(string)

Removes any allowed value of matching string

RemoveAllowedValueRule(string AllowedValue, string rule)

Removes any Allowed value rule of matching AllowedValue and matching rule string.

RemoveAllowedValues( )

Removes all Allowed values

RemoveMinMaxValues( )

Removes the Minimum and Maximum Values.

Example Get Methods:

GetCategory

Returns the Category String

GetName

Returns the Name String

GetValue(type)

Returns the Value in form of type.

GetType

Returns the Type enum.

GetMinimum(type)

Returns the Minimum in form of type.

GetMaximum(type)

Returns the Maximum value in form of type.

GetControlType

Returns the Control Type enum

GetReadOnly

Returns the Read Only Boolean flag

GetOneTimeSettable

Returns the One Time Settablc Boolean flag

GetIsSet

Returns the Is Set Boolean flag

GetReadOnlyWithCredits

Returns the Read Only With Credits Boolean flag

GetVisible

Returns the Visible Boolean flag

GetRestrictToAllowedValues

Returns the Restrict To Allowed Values Boolean flag

GetXML( )

Returns the XML String representing the entire configuration option

GetAllowedValues

Returns the vector of allowed value vectors

GetRules

Returns the vector of rules

SimpleConfigOption

Components of a SimpleConfigOption

Namespace

A string containing the namespace of a configuration option.

The namespace always ends in '/' so that it can be concatenated with the name for NVRAM storage and handling.

Name

A string containing the name of a configuration option. When concatenated with the name space the sum string will be unique in the configuration system.

Value

A string containing the value of the option. The string can be converted to other data types for use, but will be stored as a string.

Example Member Methods:

GetName

GetFullName

GetNamespace

GetValue(type)

Returns the Value in form of type.

SetValue( )

Set the value of this Category. Multiple parameter types will be supported, including but not limited to: Boolean, string, int, double, float, long, unsigned.

Comma delimited lists can be created using SetValue and a parameter of type: vector<type>

Figure 5:
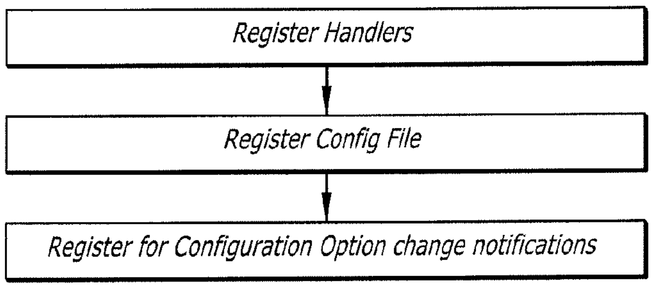
FIG. 5 is a logic flow diagram for initialization of an operating system of a gaming machine.
Figure 6:
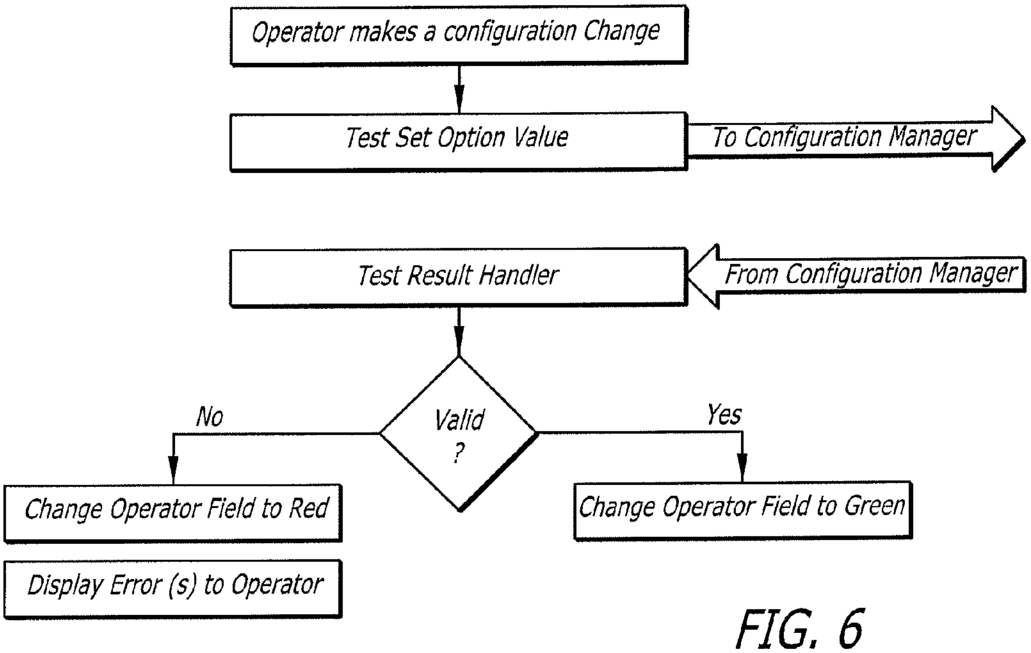
FIG. 6 is a logic flow diagram for configuration of an operating system of a gaming machine.
Figure 7:
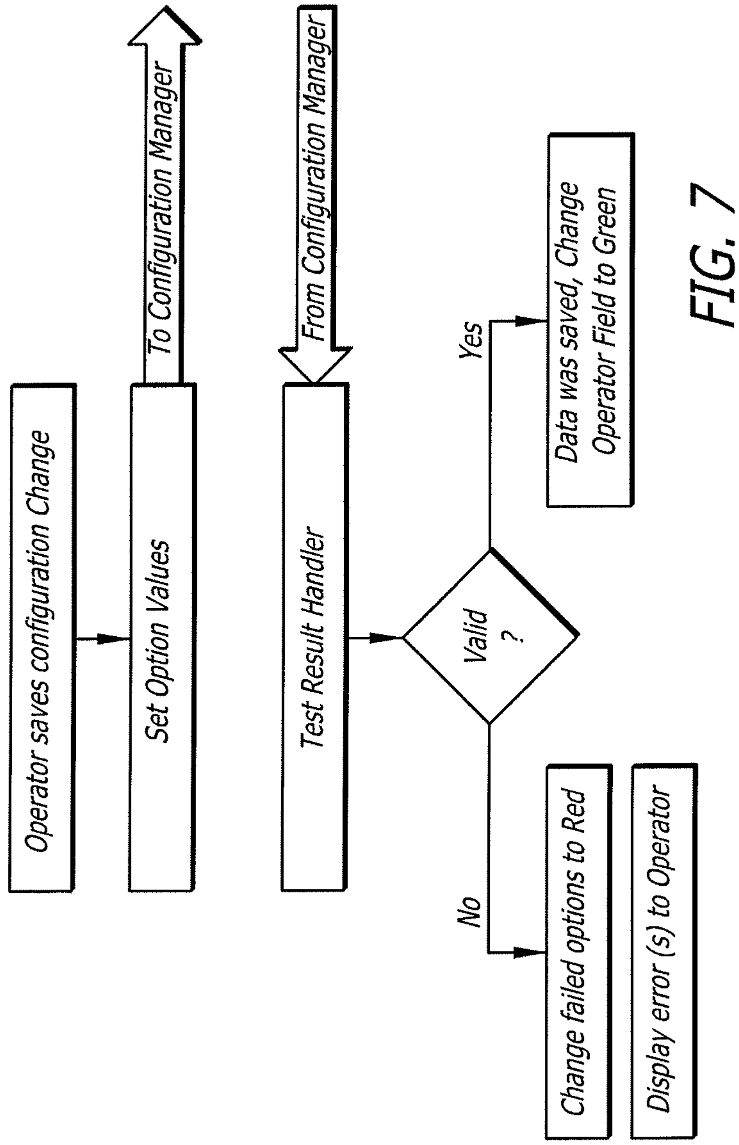
FIG. 7 is a logic flow diagram for saving a configuration of an operating system of a gaming machine.

Referring to FIG. 5-7, example flow diagrams for gaming machine operating system configuration initialization and operator menu configuration change and save are shown.

Figure 8:
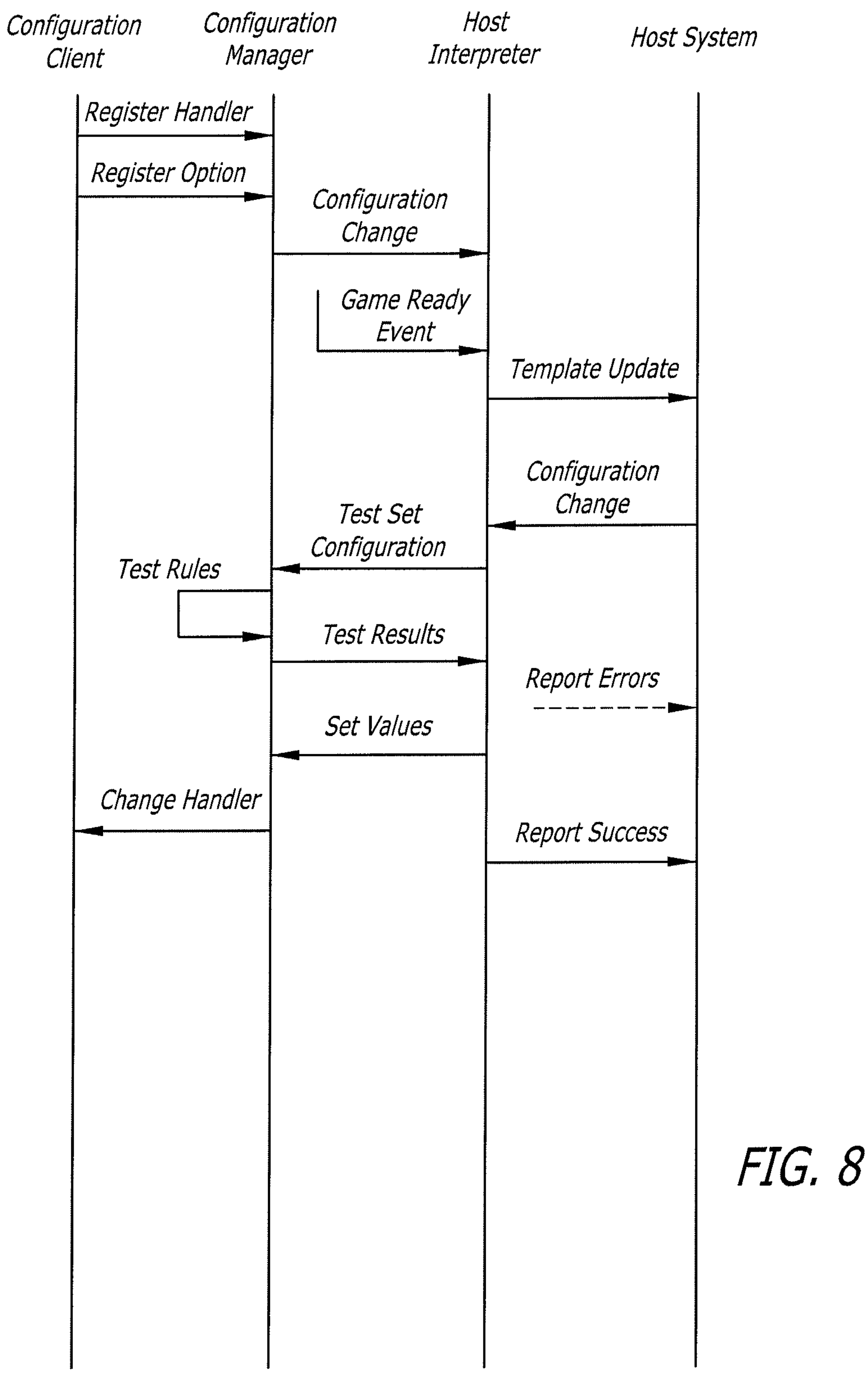
FIG. 8 is a logic flow diagram for configuration of an operating system of a gaming machine.

Referring to FIG. 8, an example sequence diagram for a gaming machine OS configuration operation is shown.

Figure 9:
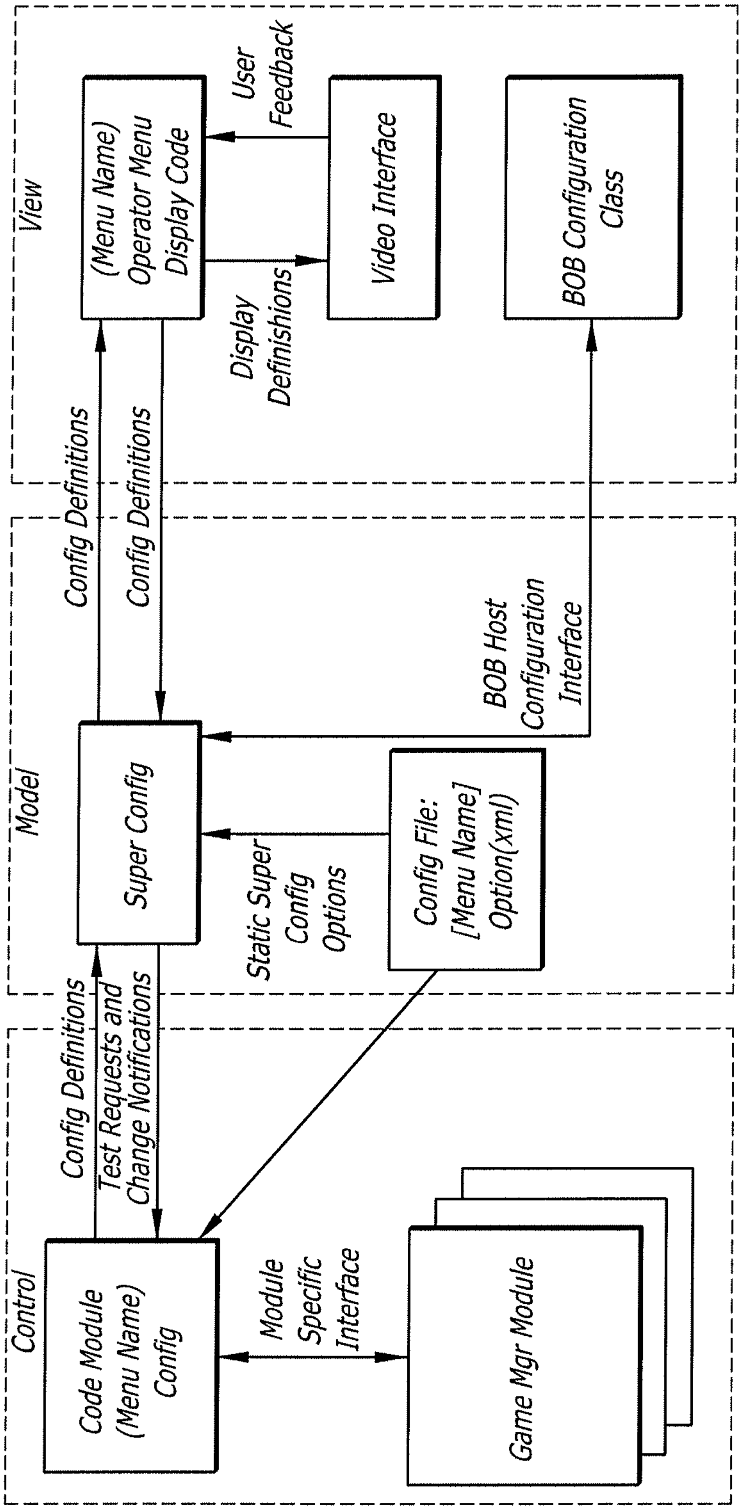
FIG. 9 is a logic flow diagram for reconfiguring gaming machines via a gaming server.

Referring to FIG. 9, an example flow diagram of a SuperConfig (super configuration) operation is shown. SuperConfig provides an option to reconfigure EGMs.

Game Mgr Modules

Game mgr modules may be converted to use SuperConfig for configuration data storage.

Video Interface

The video server and interface used by operator menus at the slot or casino management system level. This interface allows the menu display code to create a user friendly presentation of configuration options, settings and other information.

BoB Configuration Class

By example, user interface menus display SuperConfig as an option which may automatically be sent in the form of an instruction to the BoB Host through this module. Referring to FIG. 9, Bob Config Class uses the Super Config interface as well allowing re-use of code for host configurability.

Config Management Module

Control and verification of configuration options are now the responsibility of this object. All rules, restrictions and checks currently made by the Operator Menu code will be made by this object. This object is independent of options being changed via the operator menu or via the host configurability. Another responsibility of the config management module is to interface with the existing game mgr modules. As configuration values change the Config Management module will ensure that those changes take effect within GameMgr.

Options Config File

Options may be templated in xml based configuration files. These files define the basics for options, and any of their static data such as min/max, allowed values, and option help. These options will be loaded, the dynamic components initialized (default value, jurisdiction min/max, and the like) and registered by the Config Management Module.

Figures 1, 10:
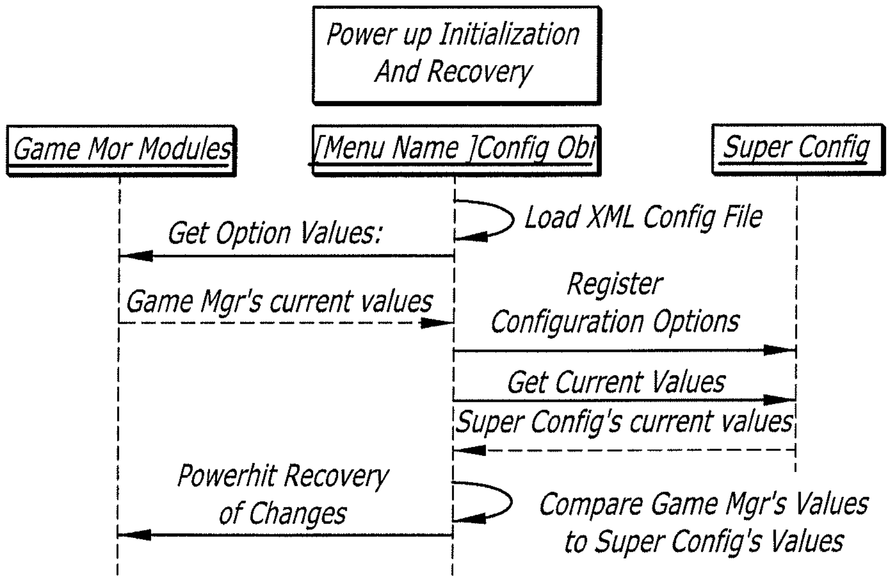
FIG. 10 are logic flow diagrams for configuration of an operating system of a gaming machine.
Figures 2, 10:
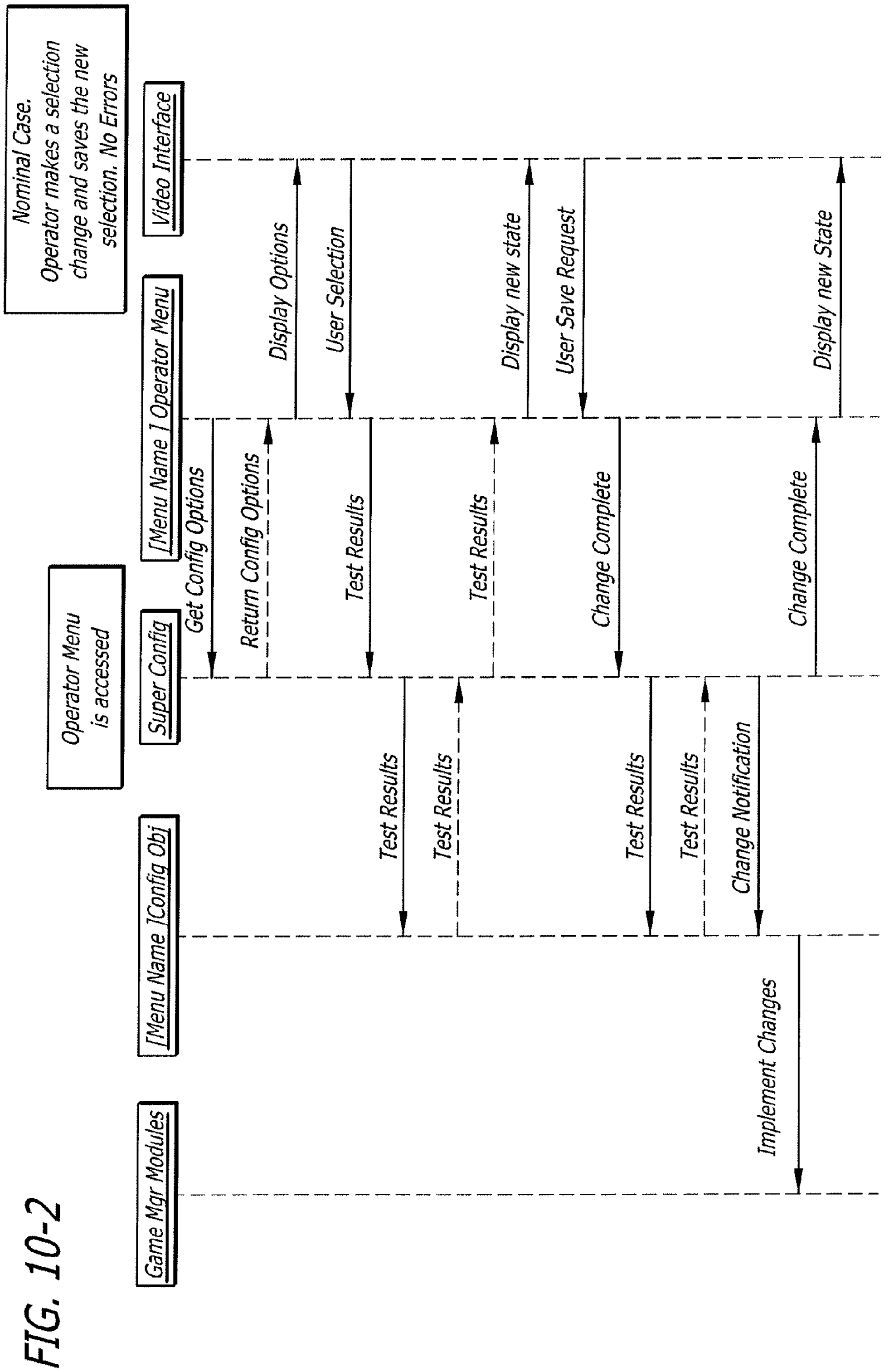

Referring to FIG. 10, two example sequence diagrams are shown. The first sequence diagram is a configuration management object on power up. This is where configuration options get created and registered. The second sequence diagram shows an error free sequence of events when an operator at a workstation, such as the control station using the BCP application, uses a menu that has been converted to use SuperConfig.

Figure 11:
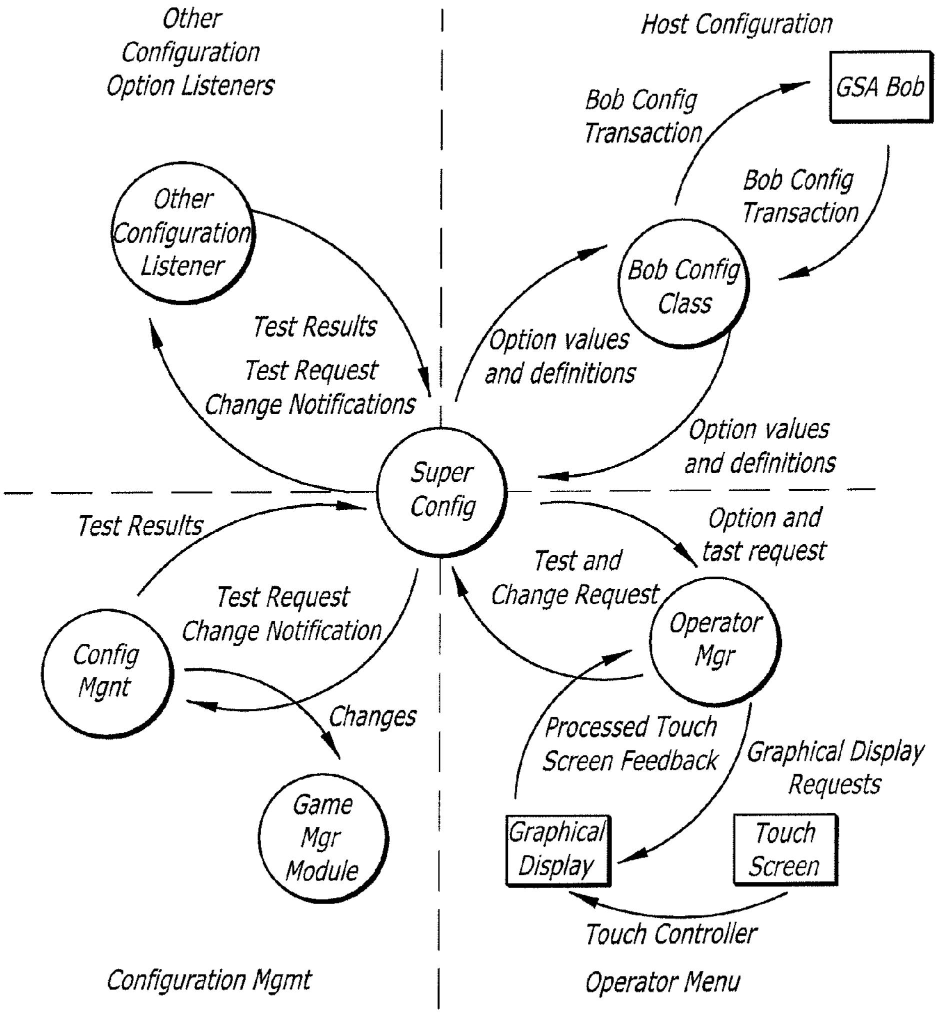
FIG. 11 is a logic flow diagram of communications during a reconfiguration of gaming machines via a gaming server.

Referring to FIG. 11, an example data flow diagram is shown of data and instruction exchange between the modules during a SuperConfig operation.

Architecturally, the SuperConfig operation as shown in FIG. 11 shows a separation between the display of information to an operator at a remote workstation, such as the Control Station with the BCP application, and the control of the information which is used and/or re-used by host driven configurations. The SuperConfig interface may be IPC compatible, which eliminates a need for the remote operator menu to be tied to the same process as the SuperConfig manager.

The SuperConfig manager may be entirely integrated into the GameMgr Modules. If the Super Config is fully integrated into GameMgr (Game Manager), the Game Mgr modules will not need to keep its own NVRAM copy of configuration data.

An example is the Denom Mgr (Denomination Manager). Denom Mgr may have its own internal storage of active and available denominations; however, the information stored by Denom Mgr is duplicated in Super Config. By modifying the Denom Mgr to be integrated with the SuperConfig Mgr, the redundant NVRAM storage space may be eliminated.

Thus, in one embodiment, the SuperConfig Mgr stores all configuration data converted to SuperConfig, and most of the same data is stored within GameMgr modules. In another embodiment, the SuperConfig Mgr is integrated with the GameMgr modules and redundant storage, persistence, and communications are eliminated or significantly reduced.

The following provides an example of Error detection and recovery: Power hit recovery of configuration changes may be handled by the SuperConfig Mgr and Config Mgmt (Configuration Management). The SuperConfig module may ensure all or nothing configuration saves and changes. The Configuration Management object may be responsible for recovering this data and synchronizing the related game mgr modules to match. The following provides an example of EGM Operating System Design:

Configuration Management Module

The Configuration Management Modules are managed by a class called ConfigCenter. ConfigCenter manages the creation, initialization, and recovery of each module. Once created and recovered, ConfigCenter has no tasks other than a container. To be managed by ConfigCenter, each module must inherit from ConfigMgmtObj. ConfigMgmtObj is an abstract class for configuration management modules. As each module is created and added to the system, it must be added to ConfigObjectList.cpp. To do this, add the include file for the module to the top of the file, and add an object declaration to CreateConfigObjso. Each configuration management object has four interface functions: RegisterHandlers, RegisterConfig, TestHandler, and ChangeHandler.

RegisterHandlers

This function will be called when it is time for the module to register its handlers with SuperConfig. The module should register a file scope function for TestHander and Change handler that each then call into the objects member functions for TestHandler and ChangeHandler. If each module registers its handlers in this way, then maintenance of modules will be easier for future developers if needed.

RegisterConfig

This function will be called when it is time to create and register its configuration options with Super Config. This is also the function that is responsible for power hit recovery of changes.

TestHandler

When properly registered by RegisterHandlers function, this will be called by SuperConfig to test configuration changes of registered configuration options.

ChangeHandler

When properly registered by the RegisteredHandlers function, this will be called by SuperConfig to notify the manager that configuration option values have changed.

Operator Menu Display

In one embodiment, the operator menu may get configuration data directly from game manager modules; in another embodiment, the operator menu may get configuration data from SuperConfig. In one embodiment, the operator menu may save configuration data directly to game manager modules; in another embodiment, the operator menu may send it to SuperConfig for saving. In one embodiment, the operator menu may test and verify configuration changes; in another embodiment, the operator menu may send the changes to SuperConfig for SuperConfig to test the changes. SuperConfig may then reply with a TestComplete notification to inform each operator menu if the changes are acceptable, and if not, provide the operator human readable reasons why the configuration change is in error. Ideally, the Operator menu does not need to include any game mgr module interface classes.

In one embodiment, the operator menu display is part of or directly attachable to the EGM and its OS; in another embodiment, the operator menu display is remotely attached to the EGM and its OS through network connections.

Figure 12:
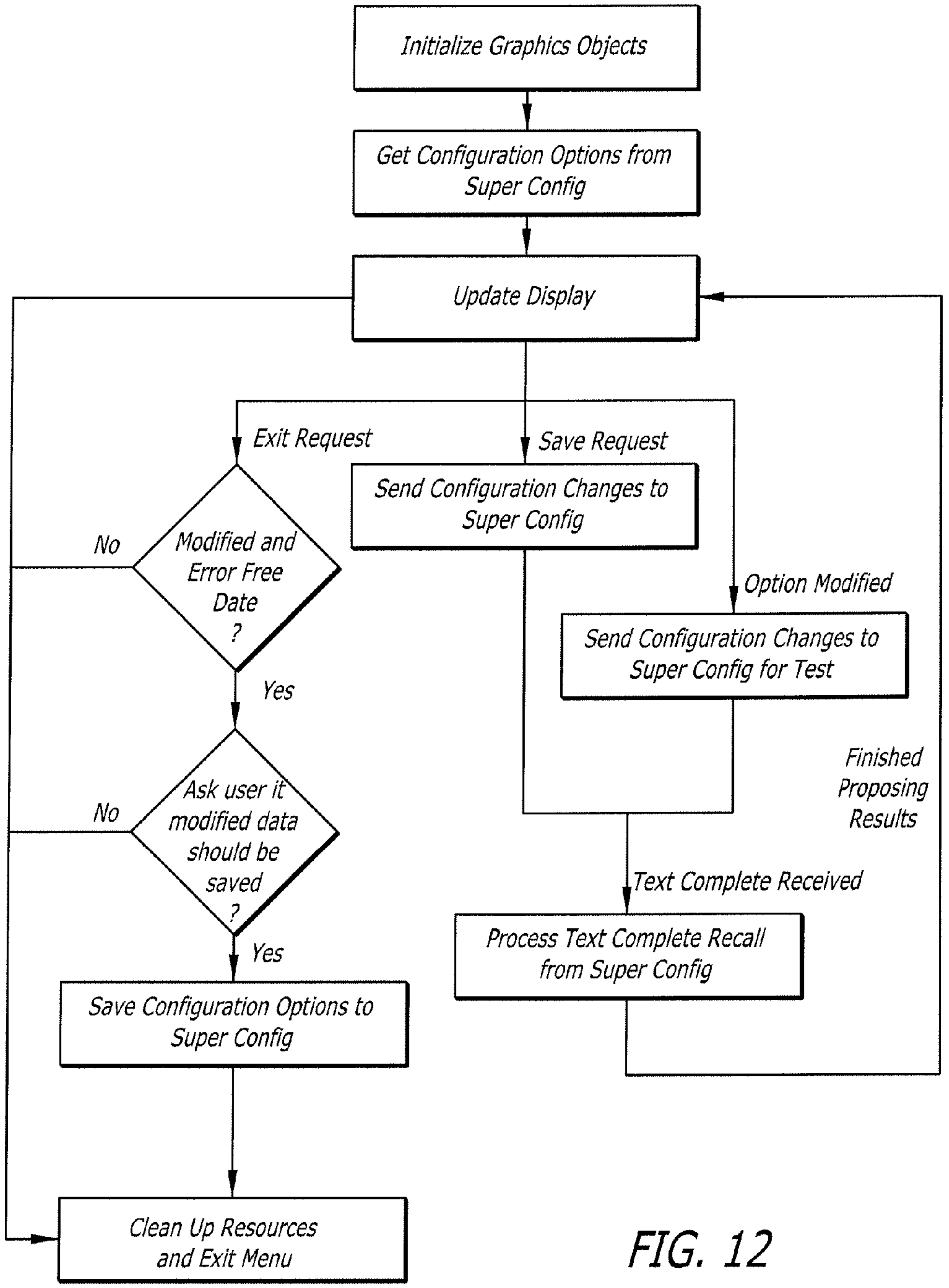
FIG. 12 is a logic flow diagram related to functions available via an operator's menu.

Referring to FIG. 12, a flow diagram for an Operator Menu functionality is shown.

Data Design Configuration Options

Many options are not simple data types. For these more complex types, custom type classes may be created and added to SuperConfig.h. An example is CfgEnumType, which is already defined in SuperConfig.h. One requirement of a Config option data type may be to support the <<and>> stream operators. To meet this requirement, the value must be accurately recreateable from being streamed out to a character stream and streamed back in. The Option Data files may comprise template files for configuration options. The files may contain a simplified xml format.

The following provides an example of a File Format: Each configuration option may start with <struct>, and end with </struct>. Each attribute may be contained in a <field name=""value=""/> tag.

Supported tag names may include the following:

Category

The category of the configuration option, used to organize the options.

Name

The name of the option

Value

The value of the option

Type

The type of the option, supported types:

Boolean, Decimal, Integer, String, or unknown. For custom types, use String.

Minimum

The Minimum Value

Maximum

The Maximum Value

OptionHelp

Help text presented to remote hosts.

Allowed Value

Allowed value for multiple choice options. If RestrictToAllowedValues is true, then super config will enforce that except for the initial value; the value will be forced to be chosen from an allowed value.

You can list multiple allowed value attributes within a single configuration option.

Control Type

The intended presentation of an option to GUI. With the exception of Category, this parameter is currently not used by any existing GUI, but should be defined when applicable for future use. Control types of Category are not saved to NVRAM, and their value fields are not used. Their purpose is to name the category of options.

Example Supported Control Types are:

Category, Single_Line_Edit_Box, Multi_Line_Edit_Blox, Slider, CheckBox, CheckBoxArray, ListBox, ComboBox, RadioButton, or Unknown.

ReadOnly

Enforced by Super Config, Read Only options can not be modified once registered.

LocallySettable

Ignored when ReadOnly is true. This attribute defaults true if not present signifies if an option can be modified by the EGM.

RemotelySettable

Ignored when ReadOnly is true. This attribute defaults true, if not present, and signifies if an option can be modified by the Host Configuration.

OneTimeSettable

This attributed is enforced by SuperConfig. OneTimeSettable configuration options can only be changed once after registration.

IsSet

Applicable with OneTimeSettable. Although rarely used in a config file, when IsSet is true, and an option is one time settable, the option becomes effectively read only.

ReadOnlyWithCredits

Enforced by Super Config, this option can not and will not be modified if there are credits on the machine.

Visible

Defaulting to true if not present, this option is used to hide options from user interfaces. Set to false for options that are for internal use only, or are "helper options" for menu implementations.

RestrictToAllowedValues

Used with AllowedValues, and enforced by Super Config, when true will only allow values listed in AllowedValues. On initial registration of an option this rule is not checked.

Unique PerMachine

Although not yet used by any existing Host interface, this attribute signifies that this option should be unique to this machine, and other machines should not share the same value for this option. An example of this would be the serial number, i.e., no two machines should share the same serial number. If or when a host supports this feature, it will be able to pre-empt problems caused by two machines attempting to use the same identification.

Download

In many disclosed embodiments, there is a fundamental interrelationship between modules and their download packages. A Package can be made up of multiple modules. Modules are made up of one or more files. Within the context of the download environment, transfer of modules between the EGM and the Download Package Server (DPS) are performed via packages. Once a package is installed on an EGM, the Modules become the focal point, and the package may be deleted or saved for future use.

Modules are defined as a collection of one or more files. They will usually provide a basic function or contain a set of basic information as stored on the EGM. Modules can be as broad as the game OS, or as restricted as defining a specific configuration or control file. The design of the module is meant to be flexible enough to support, however, the user wants to control the updating of each individual EGM within the facility or facilities. The idea of the module is to allow the user to easily update his system and identify what is installed on his system and at what level of support. Generally, it is preferable that each module which contains files that are stored on the EGM must have a file validation manifest associated with them. Each module preferably has one Manifest file associated with it. Two or more manifest files preferably do not contain the same file in them.

In one embodiment, an example of a Module Implementation Approach is as follows: Modules are installed via a package. The package may contain one or modules within it. All modules within the same package will be installed at the same time. Individual Modules may be deleted separately. When a module that contains more then one file is deleted, all the files must be defined within a validation manifest file. Only those files that are defined within the manifest will be deleted. No checks are made for any dependencies that may exist on a module to be deleted. If one module depends on files that exist within another module that is to be deleted, it may fail after the other module is deleted. Each module ID must be unique and restricted to 32 characters in length. Different versions of the same module must have different module IDs, if they are to exist on the EGM at the same time. Even if one of the modules is inactive, it must have a unique ID. As soon as a module is installed, it is marked as active.

Various other module implementation approaches may utilize some of the above-listed examples, may utilize other types of rules and criteria, or may utilize of combination of some or all of the above-listed examples and additional rules and criteria as well.

An Example Data Design

The elements of the module context as stored on the EGM are as follows:

| Element | Description |
|---|---|
| modID | Unique identifier for the module. How the module is addressed within the EGM and by G2S commands and requests. |
| Release | A 32-character string to identify the release information for the module. This may include release number, version, build number, and the like . . . |
| description | A 64-character description of the module. |
| type | Identifies the type of module it is. The types include OS, game, firmware, data, file, configuration, and the like. Refer to the G2S specifications for details. |
| state | The current state of the module. This indicates if the module is active, inactive or has some error condition associated with it. |
| exception | This contains the specific error status associated with the module. |
| Storage | The amount of storage the files associated with the module use. |
| manifest | This is the name of the manifest file associated with the module. If the module type is some type of a file, then this will be the name of the file. The name must include the fully qualified path information. |

Figure 13:
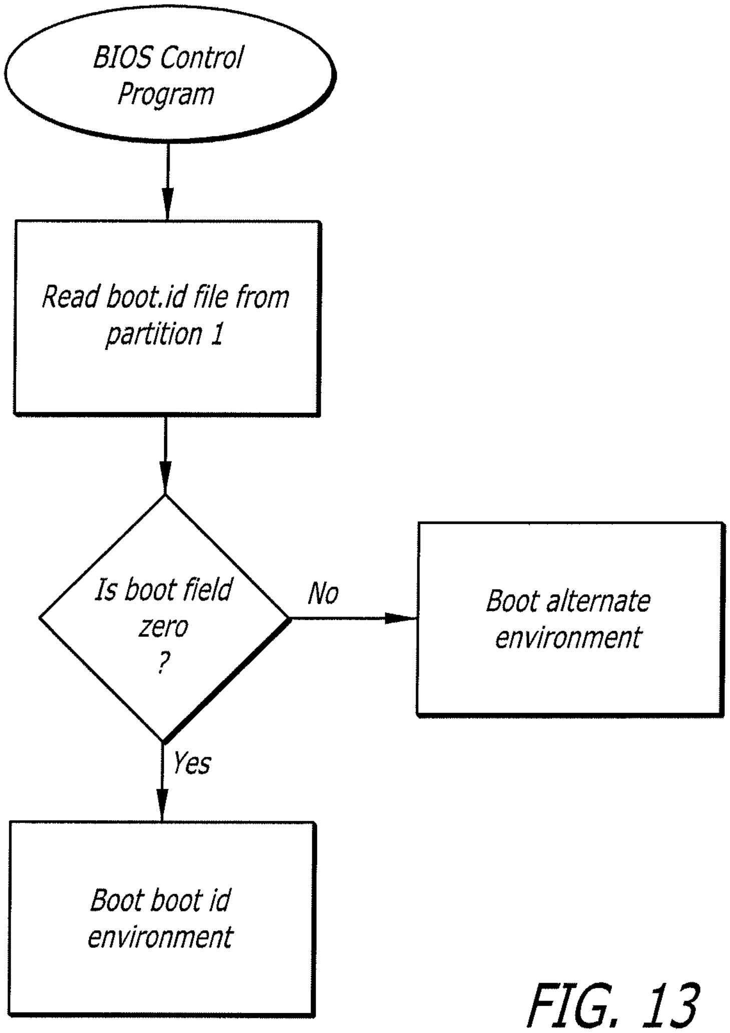
FIG. 13 is a logic flow diagram of a BIOS initialization.

Referring to FIG. 13, an example flow diagram of a gaming machine BIOS startup is shown. With the introduction of the new package download support and file validation support on the EGM, the BIOS preferably determines which EGM operating environment needs to be started on the EGM. An EGM operating environment may contain a Linux kernel, programs and libraries, and the Game OS programs and libraries. Different EGM operating environments may contain a different OS kernel, the same Linux OS components but different Game OS components, or different Linux OS components but the same Game OS components.

With the addition of the package download and file validation support, the EGM may have the capability to boot from one or more operating environments. Also, when a modification is made to the EGM's operating system code, game OS or game, the last working environment is retained at least temporarily in the event that new updates do not allow the EGM to work properly.

In one embodiment, the EGM is able to support multiple bootable operating environments. In an example embodiment, the EGM system is able to switch between 2 Linux OS and Games OS combinations. In another embodiment, the EGM system may select a Linux OS, Game OS and Game separately. In an example embodiment, EGMs with one or more compact flashes or hard disks installed are supported.

In one embodiment of an EGM System Design, one partition on any bootable media on an EGM often contains a number of directories. One of these directories is the "configuration" directory that will contain a file called boot.id. The boot.id file may be used by the BIOS to determine which EGM operating environment to start up. The boot.id file may contain the following fields that BIOS can use to determine which EGM operating environment to boot: (1) Boot: The id of the environment that BIOS will use to boot the EGM under normal conditions. (2) Booted: BIOS will store the id of the EGM operating environment that it is booting in this field. When the EGM is successfully started and running, this field will be zeroed out by the Game environment. If there is an error while starting the EGM or the EGM is unable to start, this field will remain non zero. When the BIOS code gains control, it checks this field to see if it not zero or null. If it is zero or Null, BIOS boots the environment specified in the boot field. If it is not zero, BIOS will boot the environment specified in the alternate field. (3) Alternate: The alternate field contains the id of the alternate EGM operating environment to start when the operating environment specified in the boot does not work properly or is unable to start the EGM.

An example logic flow overview of the BIOS boot decision process is shown in FIG. 13. An example of Data Design is provided.

boot.id File Format

| Field | Description |
|---|---|
| Boot | Environment BIOS should boot |
| Booted | Environment BIOS just booted |
| Alternate | Alternate environment BIOS may boot |

Figure 14:
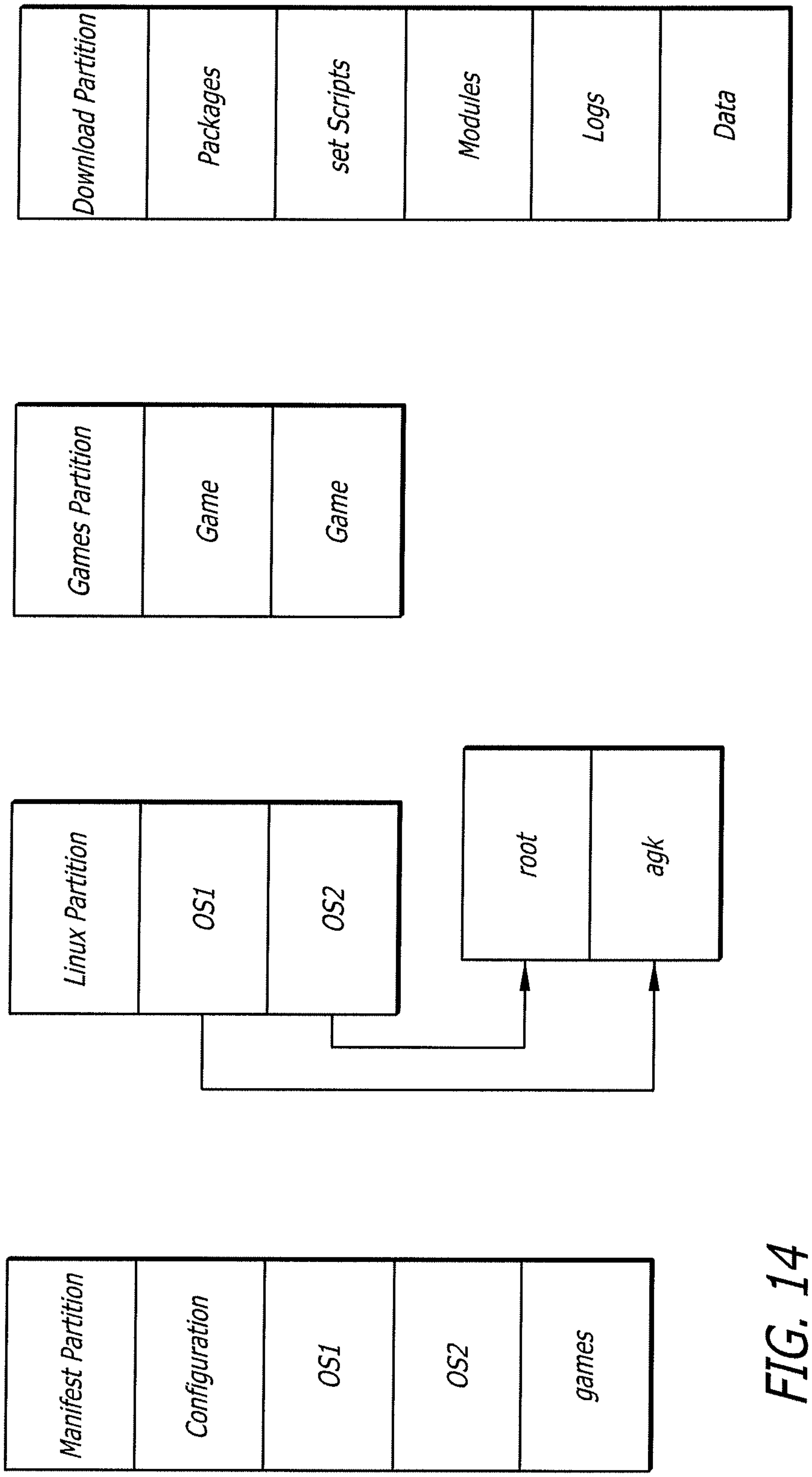
FIG. 14 is a block diagram of storage device partitions.

Referring to FIG. 14, an example block diagram of an EGM OS partitioning is shown. Shown in FIG. 14 is the payout of the partitions associated with a gaming device. These partitions may be present for both a hard drive and a compact flash. The manifest partition may be the first partition on the compact flash or the hard drive/disk. When a compact flash is used, the manifest partition may reside on both the OS and the Game compact flash. The games partition on the OS compact flash may be logically linked to the manifest game flash partition as can be seen in FIG. 15.

Figure 15:
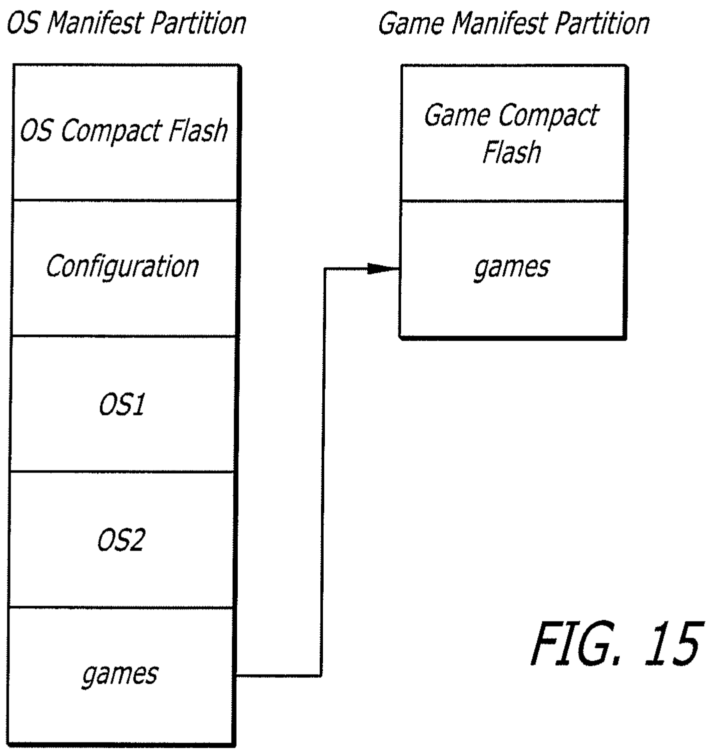
FIG. 15 is a block diagram of an operating system partition and a games partition.

Referring to FIG. 15, a block diagram of an EGM OS manifest partition together with a game manifest partition is shown. The configuration directory within the manifest partition contains 2 files. The boot.id file contains the information as to which partition was used to start the system, OS1 or OS2, and which partition is the backup partition used for recovery purposes. The second file is the public key file which is used when the public key information is not available on the BIOS. The OS1 and OS2 partitions contain all the manifest files and the Linux kernel and the initial ram disk partition image. One of the partitions will be the currently active game environment, and the other will be a backup in case the active partition becomes corrupted and can not be run. The boot.id file mentioned above tells which partition is active and which is the backup.

Figure 16:
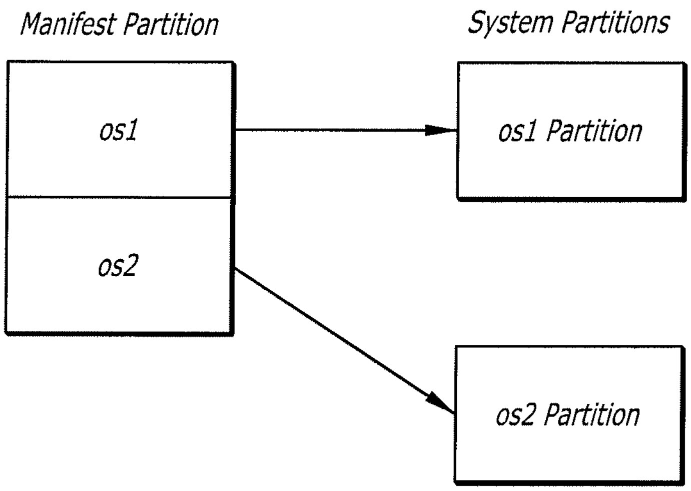
FIG. 16 is a block diagram of a manifest partition and operating systems' partitions.

Referring to FIG. 16, a block diagram of OS manifest partitioning and system partitioning are shown. When a download is performed, all the information is place in the packages subdirectory of the download partition. The package installer process will read the package information from the download package and place the information in the data directory of the download partition.

Figure 17:
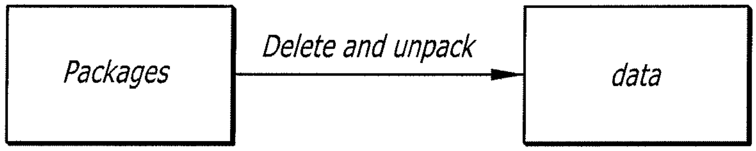
FIG. 17 is a block diagram of operating system packages communicated with a storage device.

Referring to FIG. 17, a block diagram of OS packages communicated with data storage is shown. This information is then inspected to determine what files need to be zeroed and deleted, if the currently active OS needs to be backed-up or not, and what manifest files need to be deleted.

An example method for installing a package may include the following steps: (1) Turn off all file and memory validation. (2) If an OS partition is to be updated, backup the currently running active partition into the backup partition. (3) Update the boot.id file to indicate which partition is to be started when the system is powered on. (4) Zero and delete the old manifest file(s). (5) Copy in the new manifest file(s). (6) If the file to be installed is an image, then copy the new image onto the partition or device. (7) If the files to be installed are individual files, zero and delete the existing ones and then install the new one. (8) Install all other files. (9) Synchronize the disk and access the free block table for the partitions affected. (10) Loop through each free block and insure that it contains zeroes. (11) Return control to the DLInstaller code to send back status and reboot the EGM.

For files other than images, all unused blocks on the various partitions are preferably zeroed for compliance with regulatory requirements. In an example embodiment, the EGM system uses a free block table to determine which blocks to zero, because a package may contain a tar file which only has a sub-set of the total files defined within the manifest file. The system is rebooted and BIOS validates all of the manifests and starts the new system environment. If this fails, the OS faults, and an operator must reboot the system. Upon reboot, BIOS will switch back to the backup copy and restart the system. The BIOS determines which copy to boot from by analyzing the contents of the boot.id file. If both the new installation and the backup fail, a new system will need to be installed either with a new compact flash or by rebooting the disk with to the recovery run environment. The recovery run environment is a small operating environment that allows for downloading new contents to the EGM. It does not support game play, it only allows installation of packages onto the EGM.

Figure 18:
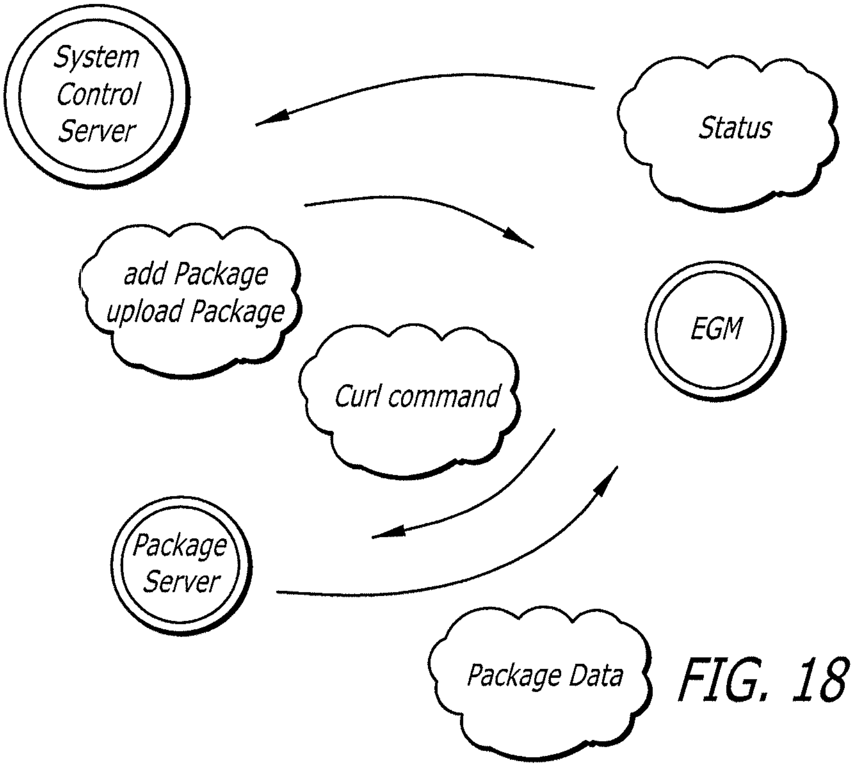
FIG. 18 is a logic flow diagram of uploading and downloading packages between a gaming machine and a gaming server.

Referring to FIG. 18, a functional block diagram of a system uploading and downloading packages is shown. The SMS (System Management or Control Server) is the point where requests and operations originate from by use of the add Package and upLoadPackage G2S commands. These commands contain enough information to allow the EGM to construct cURL commands to allow it to communicate with the PDS (Package Download or Package Server). cURL is an example product that supports various communication protocols for the uploading and downloading of files. A package is a file in the eyes of the cURL product. Refer to http://curl.haxx.se/docs/manual.html for detail information on the cURL support and capabilities which is hereby incorporated by reference.

In an example embodiment, G2S (Game-to-System) communications between the System Management Server and the EGM. The SMS provides an addPackage or upLoadPackage G2S request to the EGM. The request contains the following information:

| Parameter | Description |
|---|---|
| Location ID | The URL or IP address of the Package Download Server |
| Parameters | This field will contain any additional information needed to communicate with the Package Download Server. Things that can be defined here are the user ID and password, unique transfer parameters such as speed, packet size, and the like, and any other unique cURL parameters. |
| Package ID | The package ID is the name of the file as it exists on the Package Download Server. This is also the name of the package as it is stored on the EGM. |

When the download support receives this command information, it will generate a cURL command line command string and execute it. The cURL support will then handle all communications with the PDS. When the transfer has completed, either successfully or with an error, control is returned to the download support on the EGM which logs the result and sends stats back to the SMS.

In an example embodiment, communications pacing, error recovery and control is handled by the System Control Server. The addPackage and upLoadPackage G2S request contains the necessary parameter information, such as when using cURL. The protocol used to transfer packages between the EGM and the Package Download server is sufficiently robust and compatible for use with other languages that may be used to support the download operation, such as cURL. Each package is a single file that may contain one or more files. Encryption and decryption may be handled by the transfer protocol.

FIG. 18 illustrates by example the communications flow between the three major components involved in uploading and downloading packages. The DLInstallMgr module within the EGM receives the addPackage and upLoadPackage requests from the System Management Server. The request is validated to insure that the package does not already exist. It is then passed through the download driver to the Dlreceiver module. The Dlreceiver module then performs the following tasks:

(1) updates the status of the SMS request; (2) sends request received status back to the SMS; (3) creates the cURL command; (4) sends request in process status back to SMS; (5) uses system call to execute cURL support and waits for completion; (6) when return received from cURL, send either error or package received status to SMS; (7) if package received successfully, validate that the package's content SHA-1 value matches the SHA-1 value in the package header; (8) update packages status with either package validated or package not validated and send to SMS; and (9) if a package error occurs, delete the package from storage.

In an example embodiment, the EGM Download Package Distribution Serve Support uses the cURL (curl) support to handle all communication transfers between the download server and the EGM. It is capable of supporting HTTPS, HTTP, FTPS, FTP and a number of other protocols. The information that the curl utility requires to communicate with the download server may be contained within the addPackage and upLoadPackage commands from the System Management Point (SMP). The SMP may provide the EGM curl support with any required certificates in the format required by the curl support.

In an example embodiment, the addPackage and upLoadPackage commands contain the transferLocation, transferParameters and transferType attributes.

transferLocation: The transferLocation attribute is used to define the fully qualified path where the package to be downloaded is retrieved from and the package to be uploaded is saved to. It consists of the host name/address and the directory and file name. This information will be passed into the curl support to retrieve or transmit the package.

transferParameters: The transferParameters attribute will be used for any additional information required by curl to perform the transfer. Currently, the parameters defined as being supported are:

userid: The user id is used to define a unique user id to log into the server.

password: The password parameter is used to define the password for the user id.

certificate: A unique certificate needed to communicate with the download server. It is expected that the certificate will be in the format expected by curl.

In an example embodiment, parameters may be separated by a space. For example, to specify a userid and password, the following string would be passed in the transferParameters attribute: userid:duser password:dpassword transferType: The transfer type attribute specifies who is the initiator of the transfer. This will be used to generate the curl command to insure the proper transfer takes place. Refer to the G2S Download Specific v0.8 (hereby incorporated by reference) for details on the values that can be specified for this attribute.

Figure 19:
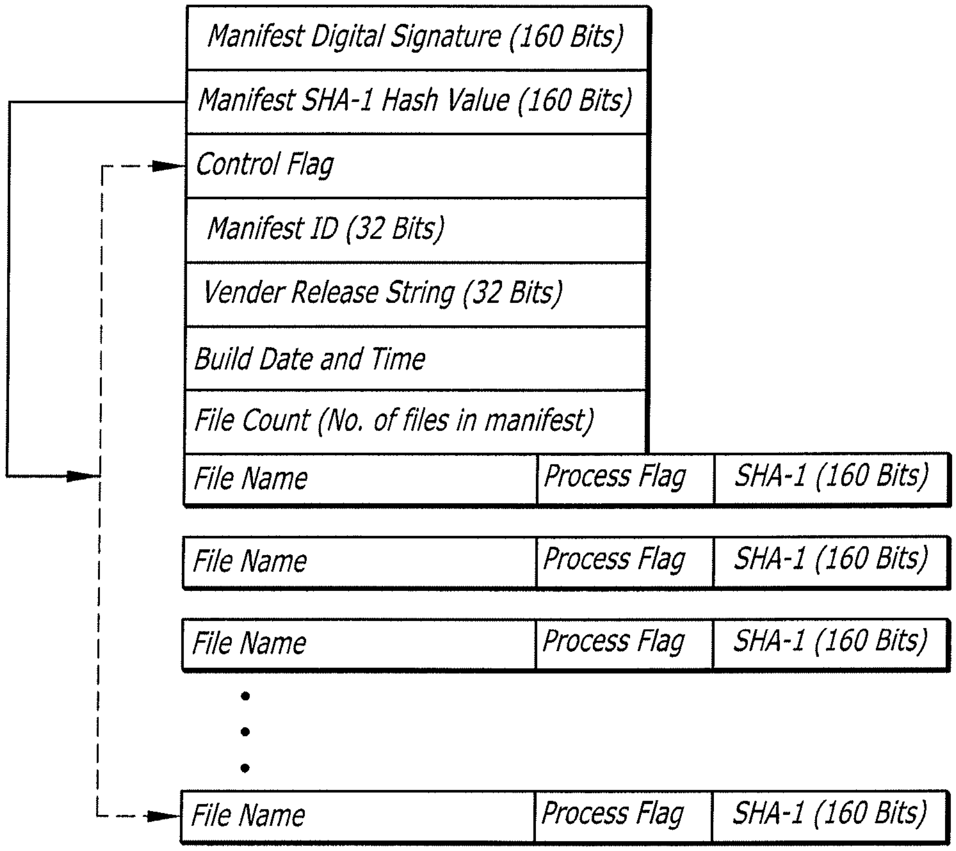
FIG. 19 is a block diagram of a validation manifest file.

Referring to FIG. 19, a block diagram of a gaming machine OS example validation manifest file is shown. It shows a methodology for validating files stored in an Electronic Gaming Machine's (EGM) storage device. The methodology provides reliable and early detection of any corruption that may exist in files stored on the EGM. In addition, the methodology makes it easier to transition to new technologies that enable the updating of individual files on the EGM's storage media instead of replacing the complete storage media with all new files. Within this description, the words authentication and verification are used as follows:

Authentication of a file uses a digital signature (or some comparable identifier) created from a public and private key pair. Verification of a file uses a SHA-1 hash value (or some comparable identifier) created over the entire contents of a file.

Reference is also made to an initial RAM Disk. This is an in memory logical disk used by the Linux kernel to load support code when it is initializing the system and creating the environment under which the Linux system will run. It is created using a compressed file that contains all the modules and programs supported. In the new file validation environment, this RAM Disk may contain the file validation module and the fault dog module, as well as some hardware support modules needed to start the Linux support. The words disk, CompactFlash® and flash are used interchangeably within the document. They all refer to the media where files are stored on a gaming machine.

An example embodiment including a file authentication implementation involves BIOS extension code calculating a SHA-1 hash value (or greater, e.g., SHA-256) over the entire contents of non-secure media, such as a CompactFlash®, and then using the hash value in conjunction with a digital signature and public key to verify the contents are authentic. Control is then passed from the BIOS extension to the Linux kernel to load the system code. During the Linux software initialization start up phase, a table of disk offsets, sizes, and digital signatures are read from the area preceding the first partition of the CompactFlash and placed in a RAM memory table. As files are opened during normal operation, the entry in the RAM memory table whose disk offset matches the start of the file is found, the SHA-1 of the contents of the file is calculated, and a signature is generated and authenticated.

In another embodiment, a File Validation Methodology uses Validation Manifest Files (VMFs). Each VMF contains a header portion describing the contents of the VMF. The VMD header is then followed by an entry for each file the VMF refers to. The file entry consists of the fully-qualified file name, a process flag, and a SHA-1 hash value computed over the entire contents of the file. This SHA-1 hash value is digitally signed and the SHA-1 HASH and Digital signature stored in the VMF's header. When the EGM is powered on, BIOS extension code will calculate the SHA-1 hash of each VMF's content, validate the SHA-1 Hash and authenticate the digital signature for the VMF. Additionally, the BIOS code calculates a running SHA-1 hash value for the contents of all VMFs processed. This cumulative VMF SHA-1 hash is saved at a predefined location in system RAM.

The BIOS code also validates the SHA-1 hash value of the Linux kernel binary code and the initial ram disk contents file. If an old style Game flash which does not support the new file manifest implementation is present, the BIOS will calculate the SHA-1 hash value, validate it, and authenticate its DSS signature. This SHA-1 hash value is stored in a pre-defined RAM location for use by the validation driver. When everything is authenticated and validated, the BIOS code extension then loads the Linux kernel and ram disk contents and passes control to the Linux code. During the processing of the Linux kernel start-up code and before enabling the system and game run environments, a script is run from the initial ram disk which loads the validation driver from the initial ram disk.

This validation driver reads the VMFs, computes the cumulative SHA-1 hash value for them, and validates that the SHA-1 hash value matches the one computed by the BIOS code. The driver also creates an IN RAM table containing the VMF file entry information. As each file is opened during normal operation, a SHA-1 hash value is computed for the contents of the file, and this is validated against the SHA-1 hash value contained in the VMF. The validation driver will also calculate the hash value of the contents of an old style game flash, if present, and verify that the hash value matches the one computed by the BIOS code and stored in RAM.

In another aspect, a background process started during the initial EGM startup procedure continuously loops calling the validation driver to validate each file that exists in the EGM's storage media. A kernel process is started and periodically validates the entire contents of an old style game flash if present. This kernel process also verifies the number of free blocks on the storage media has not changed.

In one example of File Validation Methodology Implementation, new File Validation information may be generated from a binary compatible image as it currently exists. All information is copied from the binary reproducible image into the new format that supports VMFs. No files from the binary compatible image are modified during this process.

Referring now to the Validation Manifest File Creation, initially the Validation Manifest Files may be created. They include: (1) kernel.mnfst—This manifest pertains only to the Linux kernel that will be used to run the EGM software. (2) initrd.mnfst—This manifest only pertains to the contents of the initial ram disk created by the BIOS code. (3) Linux_base.mnfst—The manifest that contains all the files associated with the Linux support. (4) games.mnfst—All the files associated with the specific game that will be run on the EGM.

Each VMF header contains the following information:

| Field | Description |
|---|---|
| DSS Signature | Digital signature of the VMF's SHA1 hash value generated with a public and private DSS key pair. |
| SHA-1 Hash | SHA1 Hash value of all the file entries within the VMF. |
| Control Flag | Identifies the kind of VMF (Linux Kernel, INITRD file, Normal). |
| Manifest ID | Unique string to identify the VMF. |
| Release Version | Version release identifier of the VMF. |
| Time stamp | Time stamp of when the VMF was released. |
| File count | No. of file entries in the Validation Manifest File. |

After the VMF header, the VMF contains entries for all the files the Validation Manifest File applies to. Each file entry contains the following information:

| Field | Description |
|---|---|
| File Name | Null terminated string containing the fully qualified file name. |
| Processing Flag | When the file should be validated. |
| SHA] Hash Value | The SHA-1 value of the file contents. |
| Entry End Marker | A carriage return character to signal the end of the entry. |

The VMFs are created by a utility which uses the binary reproducible image of the partition where the files are located. It extracts all of the file names contained in the binary image, opens each file and calculates a SHA-1 hash value for the contents of the file. The VMF file header is generated to reflect the contents of the manifest file. A detail entry for each file is created and stored in the VMF. After all the detail file entries are placed in the VMF, a SHA-1 Hash is calculated for all the information from the control flag to the last detailed file entry in the VMF. The SHA-1 Hash is then stored in the VMF header and is digitally signed with a private/public key pair. This digital signature is the saved in the VMF header.

After all the manifests are generated, a new image is created for the new validation methodology. The following represents how the OS compact flash image may look:

| Partition No. | Contents |
|---|---|
| 1 | Manifest Partition - Contains manifest files, public key, configuration files, Linux Kernel and Initial RAM disk image. |
| 2 | Linux and Game OS read only Partition, and all Linux files and Games OS files. |
| 3 | Alternate Linux and Game OS read only partition. Only present when the storage media is greater then or equal to 1 Gb in size. |
| 3 or 4 | Download Partition - A non-executable partition used to store downloaded changes to the system and various log files. |

Depending on the size of the media being used, there will either be 3 or 4 partitions. If the media size is greater then or equal to 1 Gigabyte, 2 partitions will be created to hold the Linux System and the Gaming OS files. One of the partitions will contain all the files for the active running game environment while the other contains a backup copy of the files used to successfully run the game environment. The backup exists for future use when dynamic updates will be made to the system. If the updates cause the gaming system not to run, then the gaming machine can be restarted from the back partition, which contains a copy of the last good running environment.

The last partition, Download Partition, is used to store the log files and in the future, and the software updates that are to be applied to the gaming system. It is a read/write partition that does not have executable permissions.

All log files contained within the Download partition may use a HMAC hash algorithm (or comparable algorithm) for the log entries to insure their security and validity. Various choices can be made for a hash seed, and an example is the Ethernet MAC address.

When a new game CompactFlash is produced, it may be generated in the same manner as the Operating System (OS) CompactFlash and may have the following format:

| Partition No. | Contents |
|---|---|
| 1 | Manifest Partition - Contains manifest associated with the game. If more than one game can be present, it will contain a manifest for each game. |
| 2 | Game partition - Contains all the files associated with the game or games if multiple games are supported. |

These new CompactFlash images are passed into the signing utility. The signing utility reads in each VMF and using a private and public key pair, generates digital signatures for the VMF. The digital signature is then stored in the header area of the VMF. The public key is copied to a file called dss_key.dat and saved in the configuration directory in the manifests partition of the image.

Figure 20:
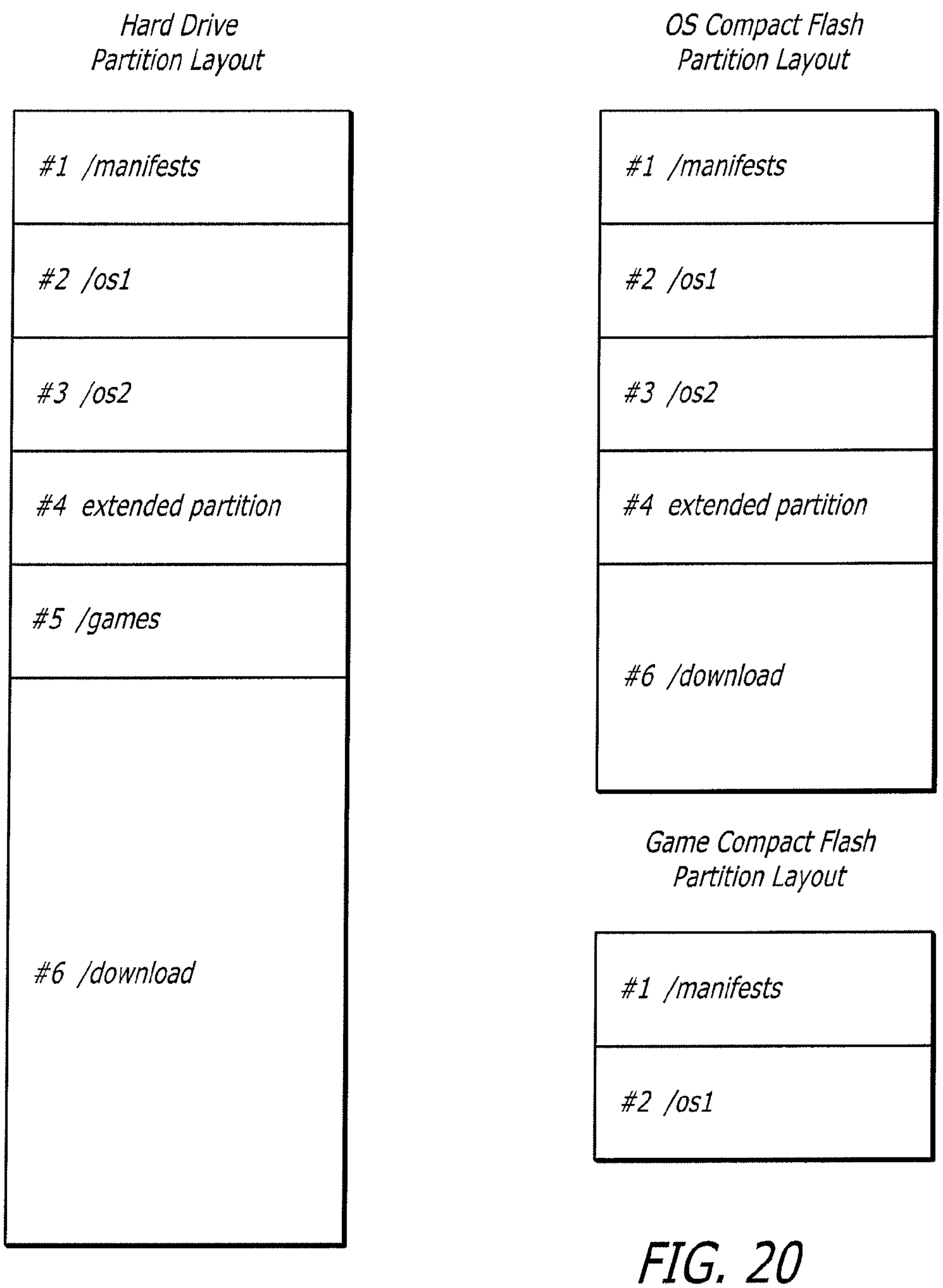
FIG. 20 is a block diagram of storage device partitions.

Referring to FIG. 20, an example block diagram of an EGM OS partition layout is shown. FIG. 20 illustrates how partitions may be laid out on a compact flash or hard disk. OS1 and OS2 are the active and backup copies of the operating system. Only the active partition is mounted for use while the game machine is enabled. It is marked as read only and executable. The download partition is used to store the log files as well as to store changes that are to be applied to the gaming machine. It is marked as read/write and non-executable. The manifests partition is marked as read only and non-executable. The extended partition in FIG. 20 refers to a logical partition definition that comprises the physical partitions (5 and or 6) that follow it.

Within the /manifests partition are directories that contain configuration information such as the boot.id file which tells which OS was booted and whether to activate partition os1 or OS2. The public key used to sign the manifests is also stored in the /config directory. The OS1 and OS2 sub-directories contain the manifests relative to the Linux kernel and initial ram load, the files contained in the Linux utilities and libraries, the game OS programs and libraries, the Linux kernel binary executable and the file containing the initial RAM disk contents. A game Compact Flash containing the new file validation manifest information has its manifests partition logically linked to the OS manifests partition game directory.

In one embodiment in which there is BIOS processing of Validation Manifest Files, when the gaming machine is powered on, the XYZ Technologies proprietary BIOS extension code stored in the BIOS secured BIOS EPROM performs the following tasks: (1) Authenticates the digital signature on the BIOS component; (2) Calculates the SHA-1 of the contents of the Jurisdiction EPROM and authenticates its digital signature; (3) Calculates the SHA-1 Hash of each VMF on all Compact Flashes and authenticates their digital signatures; (4) Calculate the SHA-1 hash value of the Linux kernel file and initial ram disk contents stored on the OS CompactFlash. These hash values are validated against the hash values stored in the authenticated Validation Manifest File for the Linux kernel and initial ram disk; (5) Calculates a cumulative SHA-1 hash value for all VMFs on all Compact Flashes; (6) If an old style game CompactFlash is used that does not support Validation Manifest Files, the SHA-1 hash of the Compact Flashes contents is calculated and its digital signature is validated; (7) Saves the calculated cumulative manifests SHA-1 hash values and the old style game SHA-1 hash value address 0x0900 in RAM memory of the gaming machine; and (8) Copies the authenticated and validated Linux kernel code and ram disk contents into the gaming machines RAM memory and passes control to the Linux kernel start up code.

If any of the digital signatures are not correct, or if the calculated SHA-1 hash value does match the SHA-1 hash value stored in the authenticated Validation Manifest File, an appropriate error message will be displayed on the gaming machines video screen, and the gaming machine will be halted. Manual intervention will be required to correct the problem and to restart machine.

Figure 21:
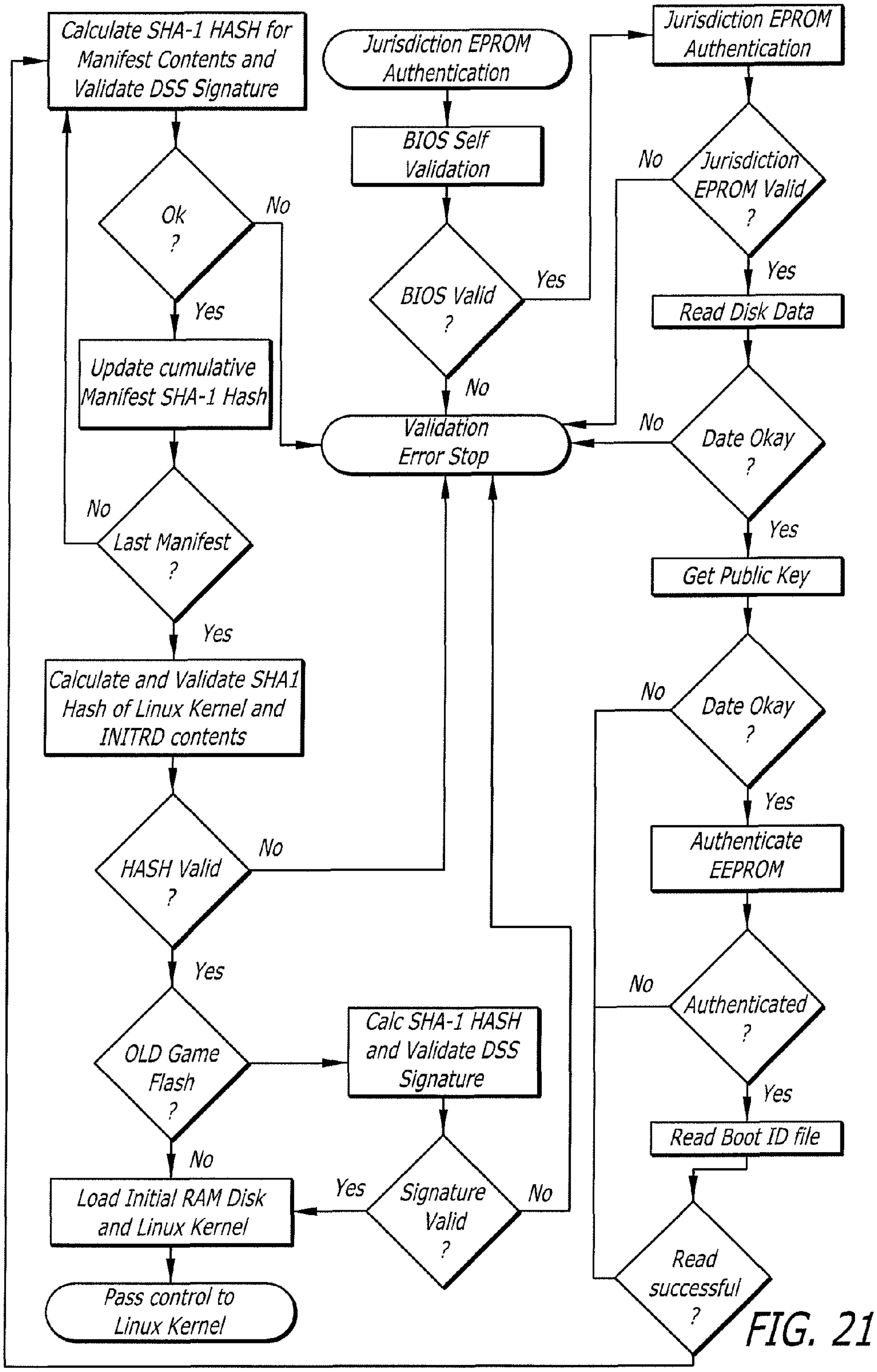
FIG. 21 is a logic flow diagram of a BIOS initialization and validation.
Figure 22:
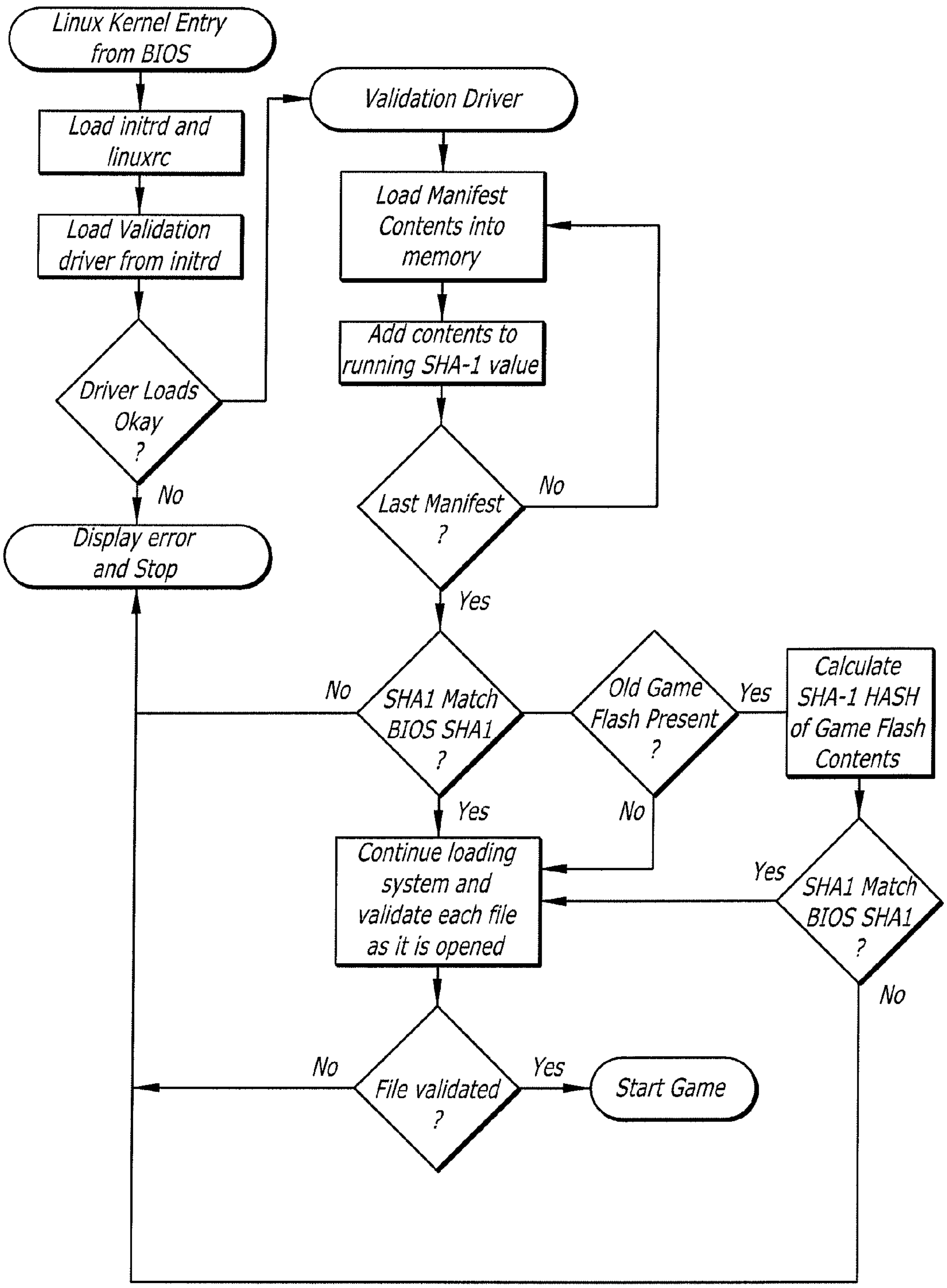
FIG. 22 is a logic flow diagram of a Linux initialization and validation.

Referring to FIGS. 21 and 22, an example flow chart of a BIOS Control boot up is shown. FIG. 21 shows the logical processing of the BIOS authentication and validation procedures and the initial start up logic of the Linux Kernel and File Validation Module.

Figure 23:
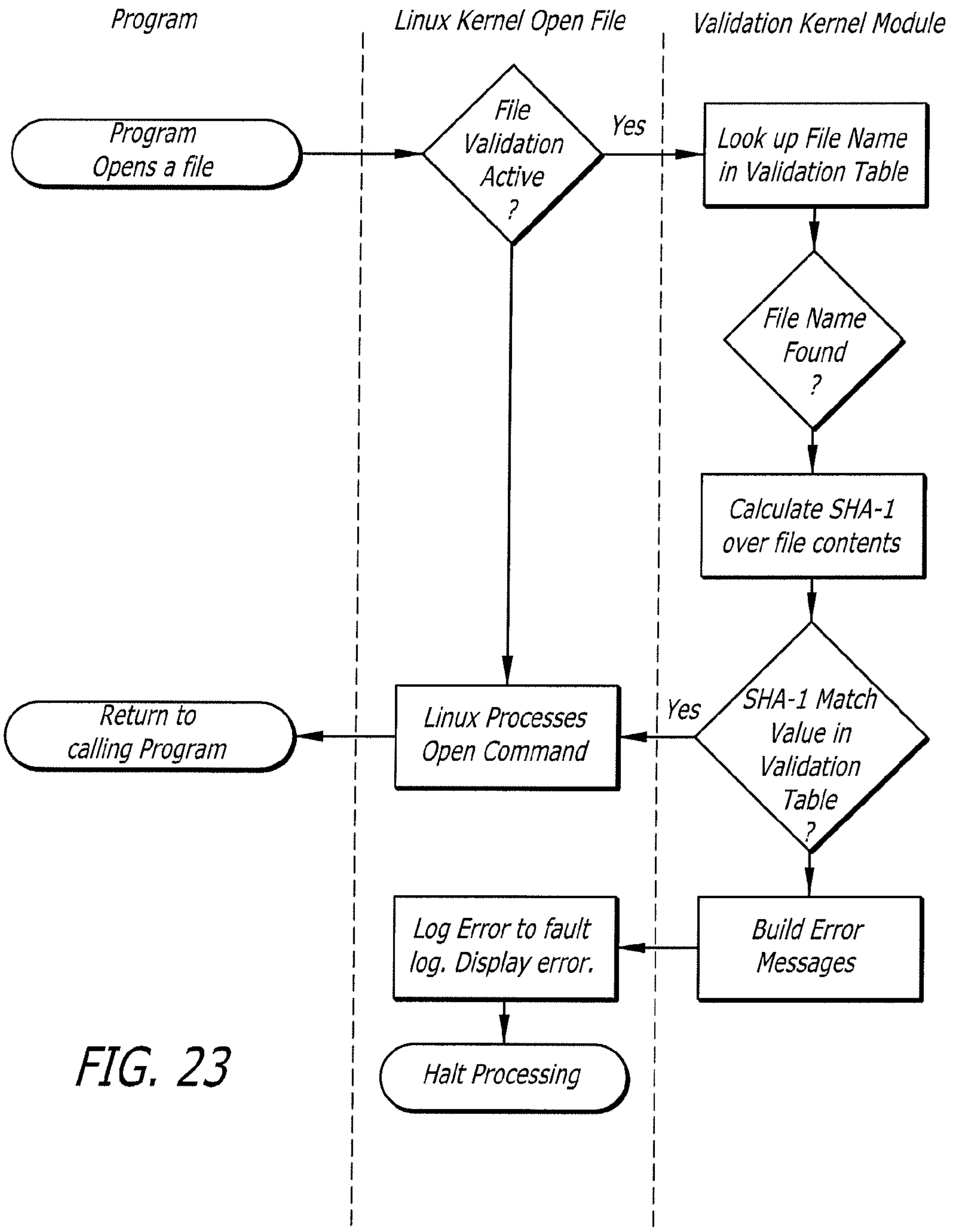
FIG. 23 is a logic flow diagram of a gaming machine file validation.

Referring to FIG. 23, an example flowchart of an EGM File Validation is shown. An example File Validation Processing in a running Gaming Machine may include File Validation Driver Processing.

When the Linux kernel receives control from the BIOS extension code, it will load the file validation driver code from the ram disk that was authenticated and loaded by the BIOS code described above. This file validation driver performs the following operations: (1) Reads all the VMF files from the Compact Flashes and builds an in-memory table that contains the information from the detail entries in the VMFs. (2) Calculates a cumulative SHA-1 hash value for all VMFs and validates that it matches the SHA-1 hash value calculated by the BIOS code and stored at address 0x0900 in RAM memory. (3) If the game CompactFlash is not in the new format, calculates a SHA-1 hash value aver the entire contents of the game CompactFlash and validates that it is the same as the one calculated by the BIOS code and stored at address 0x0900 in RAM memory. (4) Places a branch address in the file open code to call the File Validation Driver whenever a file is opened in the system.

If any of the validations fail, an error message will be displayed on the gaming machine's video screen and all processing will stop. A log entry will be placed in the /Download/fault.log containing the date and time of the failure as well as what type of error cause the machine to shut down. Manual intervention will be required by authorized personnel to correct the problem and restart the gaming machine.

Once the file validation driver initialization is complete, the rest of the gaming system code is loaded, and the game is started. Whenever a request is made to open a file that resides in a read-only partition, the system open code calls the file validation driver with the fully-qualified name of the file to be opened. The file validation driver performs the following operations before allowing the file open to proceed: (1) Looks up the file name in the in memory validation table built during the validation driver initialization. (2) Logs an error and halts the machine if the file name is not found. (3) Calculates the SHA™ hash value for the entire contents of the file to be opened. (4) Verifies that the SHA-1 hash value is the same as the one stored in the in-memory validation table.

If the SHA-1 hash values match, the file open is allowed to continue and processing proceeds as normal. If the file was not found in the validation table or the SHA-1 hash values do not match, all processing on the gaming machine is halted and an appropriate message is displayed on the gaming machine's video screen. A log entry will also be placed in the /Download/fault.log file. Manual intervention will be required by authorized personnel to correct the problem and restart the gaming machine.

The EXT2 file system is used to format the partitions on the gaming device's storage media. The file system is divided into physical blocks of storage all of the same size. A table is maintained by the file system that indicates which of these physical blocks are used and which are not used. Whenever data is written to the one of the file system's unused blocks, the file system's table is modified to indicate that the block is no longer free.

The file validation driver starts a kernel process that runs in the background and uses the free block information to validate the integrity of the storage media. When the kernel process is initially started, it reads the free block information from the file system and stores it in memory. It then performs a delay loop that reads the free block information and validates it has not changed from when the information was first read. If any free block has changed, then a fault will be triggered on the gaming machine and an appropriate error message will be displayed on the gaming machines video screen. All gaming machine processes will be stopped until the problem has been corrected by authorized personnel.

A second function of this process will validate the contents of a game flash that does not contain the new file validation manifest information. It calculates a SHA-1 hash value over the entire contents of the game flash and validates that it matches the SHA-1 hash value that was calculated by the BIOS when the gaming device was initially powered on. If the hash values do not match, the gaming device is halted with the appropriate error indicators and messages, and it requires authorized personnel to restart the gaming device once the problem has been resolved.

Background Validation Processing

After the file validation driver and kernel free block validation process have been started, additional background processes are started. The first thread is used to insure that no existing files have been modified and no new files have been added. The second one is used to insure that unused areas of the storage media are zero filled and to zero fill unused areas of the modified disk partitions after an authorized change has been made.

File Verification Process

This background process is used to validate that all the files residing on mounted read-only partitions have not been modified and are present in the validation manifests. The process searches all of the directories and files that are known to the system. For each file that is on a read-only partition, a call is made to the file validation driver passing it the name of the file. The file validation driver verifies that the file is in the file validation manifest table, and that the SHA-1 hash value of the file contents matches the SHA-1 hash value stored in the file validation table. This insures that the calculated hash value for the files contents matches the BIOS authenticated hash value determined at system start up. If either of these fails, the gaming device will be halted with the appropriate error indicators and messages. As with all other failures, an authorized attendant will be required to correct the problem and restart the gaming device.

Free Storage Validation and Initialization

This background process is optionally available to verify that all of the free blocks on a storage device are zero filled, or to initialize free storage blocks to zero.

A processing loop can be created that calls this process periodically to insure that all the blocks that are marked free within a read-only partition are in fact zero filled. The process reads each free block and verifies that each byte within the block is zero. If a block is found not to be zero, an error condition is raised and the gaming device is stopped. Authorized personnel must then correct the problem and restart the gaming device.

Gaming Device Storage Media Modifications

Another function provided by the free storage validation and initialization process is when an authorized modification is made to the gaming device's storage media. The modification procedure may include the following: (1) Any files that are to be deleted from the storage media are first rewritten with all zeroes and then deleted. (2) All updates to existing files are made. (3) Any new files are added. (4) The File Validation Manifest file is replaced. (5) The background task is called with the partition name to zero fill all unused blocks on the storage media's partition. (6) The Gaming Device is restarted using a power off/on cycle.

Any modification that is made to the gaming device requires that an existing file validation manifest file be replaced with a new file validation manifest file that reflects the changes to the files stored on the gaming device's storage media. Since the file validation manifest is being changed, the gaming device must be stopped and restarted. This is required to allow the secure BIOS to authenticate and validate the new operating environment and File Validation Manifests, and to allow the validation driver to rebuild the in-memory file validation table. A power off and on of the gaming machines insures that the chain of trust and authentication is in tact after a change to the gaming machine's storage media.

System Fault Manger and Hardware Watchdog Support

The EGM contains a hardware watchdog register which is used by the fault management support to insure that all required processes and threads in the gaming software are active and functioning.

Hardware Watchdog Support

The Faultdog support interfaces with the watchdog support to detect if a required thread no longer exists and to restart the EGM after a fault has been detected, reported and acknowledged. The faultdog manager may be the only process in the system that interacts with the watchdog support in order to increase the level of integrity and assurance.

If the watchdog circuit is enabled, its timeout counter must be regularly cleared before the timeout period. If a timeout does occur, it indicates that the CPU must be locked-up, and the CPU is hardware reset. An enable bit enables both the watchdog and the I/O Halt from the Protection Circuit. One or more bits may set the timeout period. For example a 7-bit field with a resolution of 0.1S and may provide a range of 0.1-12.8 seconds. The incrementing of the timer and writes to the timeout register are not synchronized, so the timeout period has 0.1S of tolerance which may be important for small timeout values.

In one embodiment, a Watchdog program is enabled and utilized by the system. First, the watchdog counter is free-running, so if the timeout value happens to match the counter when the watchdog is enabled, the CPU is reset possibly initiating an endless cycle of resets. To prevent this, the watchdog is enabled on power-up with the timeout initially set to the maximum, for example 12.8 seconds. Second, once the Protection Circuit times out, it can only be reset with a hardware reset. This means that if the Protection circuit is to be used, servicing must start before its first timeout, for example, 15 minutes. These two limitations prevent enabling and disabling the watchdog with different applications, so the watchdog should be initialized at power-up or not at all.

Clearing the Watchdog Counter:

The watchdog counter may be automatically reset when a timeout value is written and a corresponding clear flag is set.

Manual CPU Reset:

Writing all zeros to the 'NW Watchdog Register' forces a manual hardware reset to the CPU. To prevent glitches inadvertently resetting the system when enabling the watchdog, the timeout value should already be a non-zero value, prior to clearing a reset flag.

Software Faultdog Support:

The Faultdog support may be used to increase the chance that all faults are caught, reported and not lost. The basic functions of the faultdog may include: (1) Monitor all registered processes to detect errors or unauthorized removal of them. (2) Manage the hardware watchdog register to avoid system hangs. (3) Display generic user message when a fatal error occurs and turns on top box lights. (4) Log detailed fault description message when fatal error occurs. (5) Display detail fault description message when the attendant key is turned. (6) Display a message when the door is opened after a fault has occurred. (7) Display a message when a Game or OS flash has been removed. (8) Automatically detects cabinet type and port configuration. (9) Automatically reboots the EGM when attendant key is turned for the 2nd time after a fatal error. (10) Independence from any specific video or I/O requirements. (11) Catch kernel panic errors, show detail information about panic and prevent the EGM from automatically rebooting after the panic occurs.

In an example embodiment, file, partition and memory validation threads register with the faultdog manger when they are first started. The faultdog monitoring support continuously runs in the background checking to see if the threads that were registered are still active in the system. If the registered thread is no longer active on the system, a fatal fault is raised. This fault is written to the fault log, and the appropriate message is displayed on the screen. Attendant intervention is required to clear this fault and restart the EGM via a power up cycle.

The faultdog manager also resets the hardware watchdog timer to signal that the system is still alive. If for any reason, the faultdog manager does not reset the hardware watchdog timer, it will expire and cause a system failure. The faultdog driver and process insure that all of the required processes are still active, and the hardware watchdog timer is used to verify that the faultdog code is still active.

Faultdog Error Logging Support

Errors that are detected by the faultdog management code may generate an error to be displayed on the video screen, turn on the candle lights at the machine, and cause an error to be written to a faultdog error log. The error displayed error message and logged error will contain the following: (1) A date and time stamp of when the error occurred. (2) The task ID of the task that was running at the time of the error. (3) A description of the type of error that was encountered. (4) If the error was caused by file validation, the name of the file being processed.

The faultdog error logging support is only available after the BIOS code has finished processing and the faultdog support installed. The faultdog support is installed as the first support during the Linux kernel initialization and setup process and prior to any other authentication and validation code in the system.

When the G2S Download support is introduced into the system, any authorized regulatory monitoring authority will be able to request a copy of the error logs to be transmitted to them along with any relevant validation data. The initial implementation will support logging of only the last fault that caused a system failure. This is because the first fault encountered will cause the machine to stop all processing. If the regulatory authorities define a need for keeping a history of fatal faults, then it will be added in the future.

Figure 24:
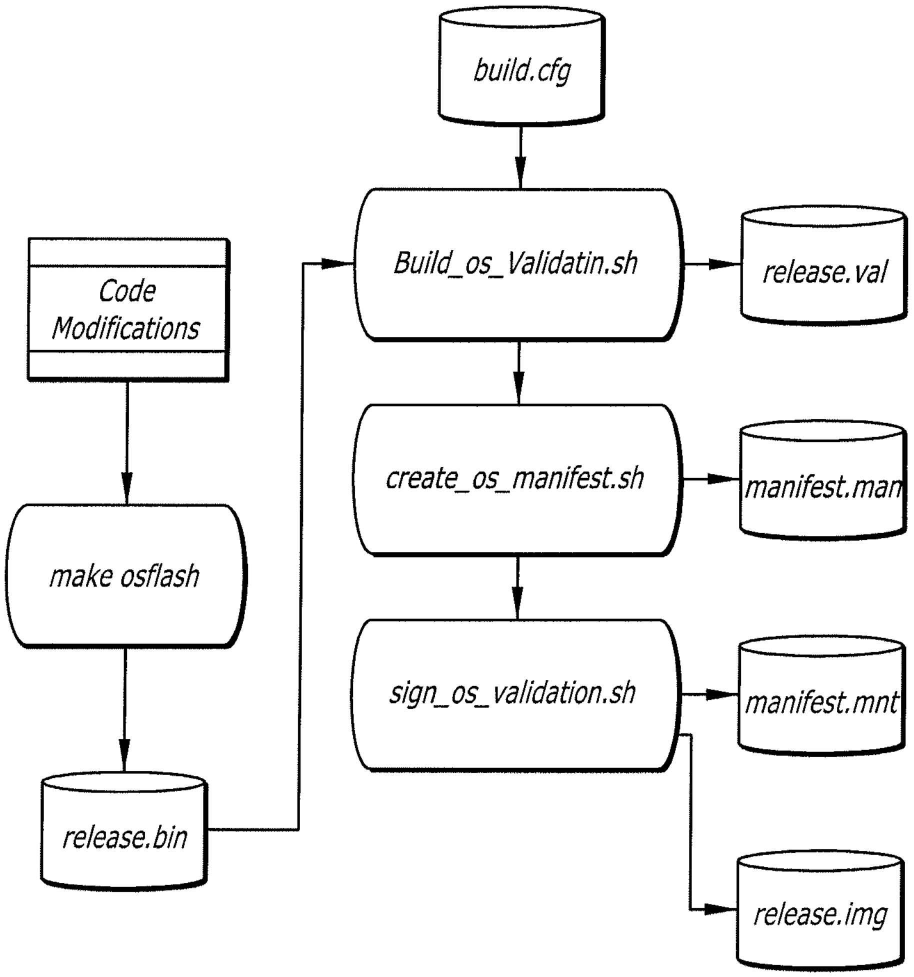
FIG. 24 is a logic flow diagram of an operating system image build.

Referring to FIG. 24, an example block diagram illustrates an OS image build procedure. As can be seen in the diagram, the developer would make code changes and build the osflash binary image as usual. This insures that binary compatibility regulatory requirements are met. After the binary file is created, it would be copied to the build_release directory. The first command file to run is the build_os_validation.sh procedure. This copies the files from the binary image and places them in a new image (release.val) that uses the Ext2 file system. The new image also modifies the partition layout as required by the file validation support. The release portion of the file name will be the actual release string as defined within the build configuration file (build.cfg). It also allows for the size of the image to be changed.

Figure 25:
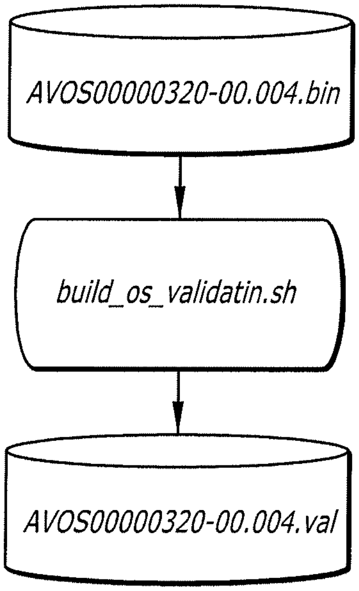
FIG. 25 is a logic flow diagram of an operating system validation file image build.

Referring to FIG. 25, an example block diagram illustrates a build gaming machine OS validation image. After creating the new validation image, AVOS0000320-00.004.val, the next step is to generate the Validation Manifest Files. The command procedure to perform this is called create_os_manifests.sh. The only parameter that this command takes is the name of the validation image built with the build_os_validation.sh command (AVOS00000320-00.004.val in our examples).

Figure 26:
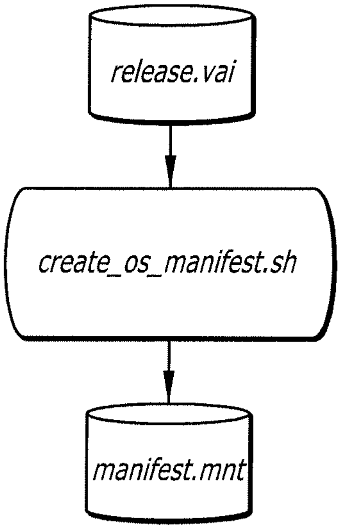
FIG. 26 is a logic flow diagram of a create manifest process.

Referring to FIG. 26, an example flowchart illustrates a gaming machine OS create manifest command procedure. Once all the manifest files are created, the next step is to create a signed image. This is accomplished by initiating the sign_os_validation.sh command.

The first parameter is the name of the validation image file without the file extension. Next is the key ring name to be used and optionally the name of the device compact flash is used to write the signed image to. In our examples, a signed image file called AVOS00000320-00.004.1 mg will be created in the build_release directory.

Figure 27:
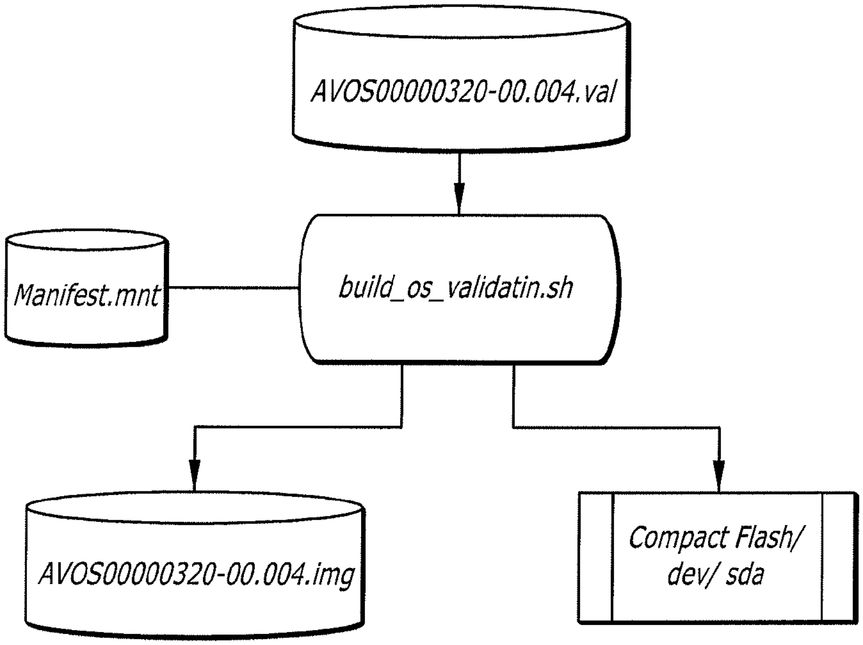
FIG. 27 is a logic flow diagram of a signed operating system image build.

Referring to FIG. 27, an example flowchart illustrates a build signed OS image for a gaming machine OS. Once the signed image is produced, it can be used to create as many download packages as desired.

Figure 28:
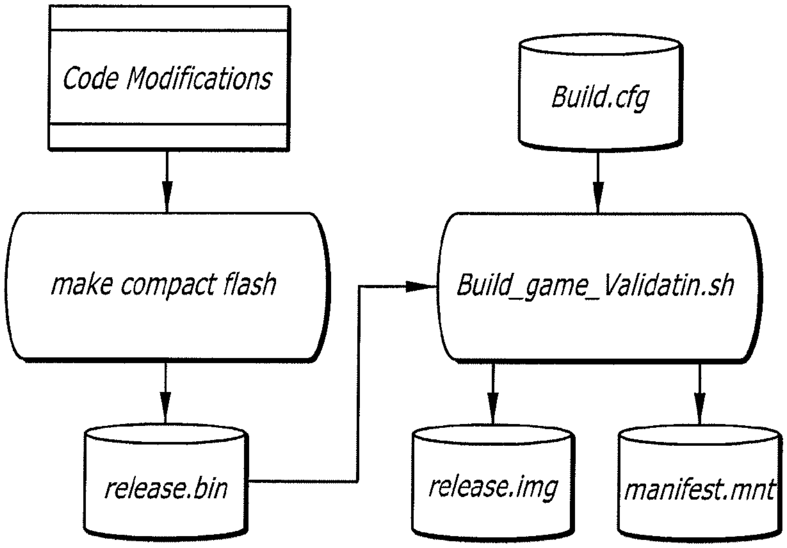
FIG. 28 is a logic flow diagram of a game file validation image build.

Referring to FIG. 28, an example flowchart illustrates a procedure for building (generating) a game file validation image. Building the signed game files is more straight forward than the OS. Again the developer builds the game binary image file as usual. The binary image file is then copied into the build_release directory and used as input into build_game_validation.sh procedure. The procedure will produce a signed file validation game image and file validation manifest files.

The first parameter is the name of game binary file, and the second parameter is the name of the key ring used to sign the file validation manifest files. The resulting output is a signed image file named AVGBLZ70001A-00.000.1 mg stored in the build_release directory.

Example Procedure for Making a New Clear Chip

To make a new clear chip that is compatible with the file validation procedures, a set of commands similar to the OS build commands may be utilized. The basic steps are the same, build_clear_validation.sh to build the new clear chip image. The difference from the build_os_validation.sh command is that this command takes only the on2 parameter, the clear chip binary file name. It will always produce a 64 Mb flash image for the clear chip. The create_clear_manifests.sh is used to create the manifest files associated with the Linux kernel and initrd file associated with the clear chip. Finally the sign_clear_vlaidation.sh is used to create the signed image of the clear chip.

Examples:

build_clear_validation.sh AVOCLEAR0314-00.001.bin create_clear_manifests.sh AVOCLEAR0314-00.001.val sign_clear_validation.sh AVOCLEAR0314-00.001 development Example OS Module Content Definitions This section contains the module definitions for the OS section of the EGM gaming system. Modules are used as the basis for defining what file validation manifest files will be produce. The modules supported and the files contained within them are:

| | | |
|---|---|---|
| kernel | Module Name: | kernel |
| | Manifest Name: | kernel.man |
| | No. of Files: | 1 |
| | Files: | Vmlinuz-2.4.18-3pt |
| initrd | Module Name: | initrd |
| | Manifest Name: | initrd.man |
| | No. of Files: | 1 |
| | Files: | initrd.gz |
| Linux Base | Module Name: | linux__base |
| | Manifest: | Nameln__base.man |

-continued

| | | |
|---|---|---|
| Linux USR Base | Module Name: | linux_usr_base |
| | Manifest Name: | In_usr_base.man |
| | No. of Files: | |
| | Files: | |
| AGK Base | Module Name: | agk_base |
| | Manifest Name: | agk_base.mnt |
| | No. of Files: | |
| | Files: | |
| AGK Bin | Module Name: | agk_bin |
| | Manifest Name: | agk_bin.mnt |
| | No. of Files: | |
| | Files: | |
| AGK CFG | Module Name: | agk_cfg |
| | Manifest Name: | agk_cfg.mnt |
| | No. of Files: | |
| | Files: | |
| AHK Lib | Module Name: | agk_lib |
| | Manifest Name: | agk_lib.mnt |
| | No. of Files: | |
| | Files: | |

Example Build.cfg File Contents

The build.cfg file contains specific information as to what information will be stored in the file validation manifest header information. It contains the following items:

DATE:—The date that the release image is being built or released on. Format: dd Month YYYY (Example: 29 May 2006)

TIME:—The time that the release image is being built or release on. Format: hh:mm:ss (Example: 12:00:00)

RELEASE:—The release identification for the release image. For example: AVOS00000320-00.004

SANDBOX:—The name of the sandbox.core directory with the sandbox/agp directory.

Example: sandbox.core.3.20.00.000

Figure 29:
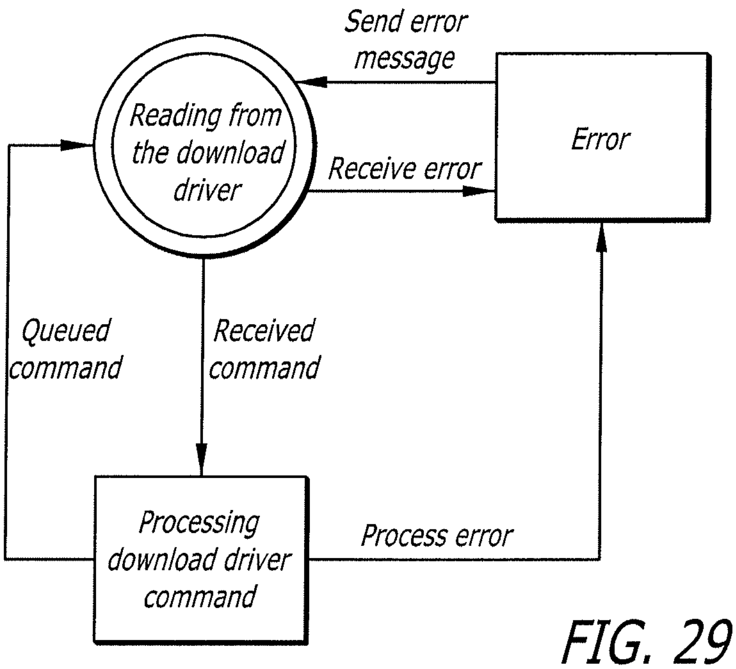
FIG. 29 is a logic flow diagram of a software download reading and processing.

Referring to FIG. 29, an example flowchart illustrates a software download reading and processing of a gaming machine OS. The download reading and processing software (DLInstaller) includes two threads. The first thread is shown in the FIG. 29, and it is responsible for listening for commands. The actions are performed by scripts, and this thread accepts the commands setScript, deleteScript and authorizeScript to place scripts in the processing queue, removes them from the processing queue and authorizes their execution respectively. Each script has a unique assigned ID # which identifies it for all operations.

Figure 30:
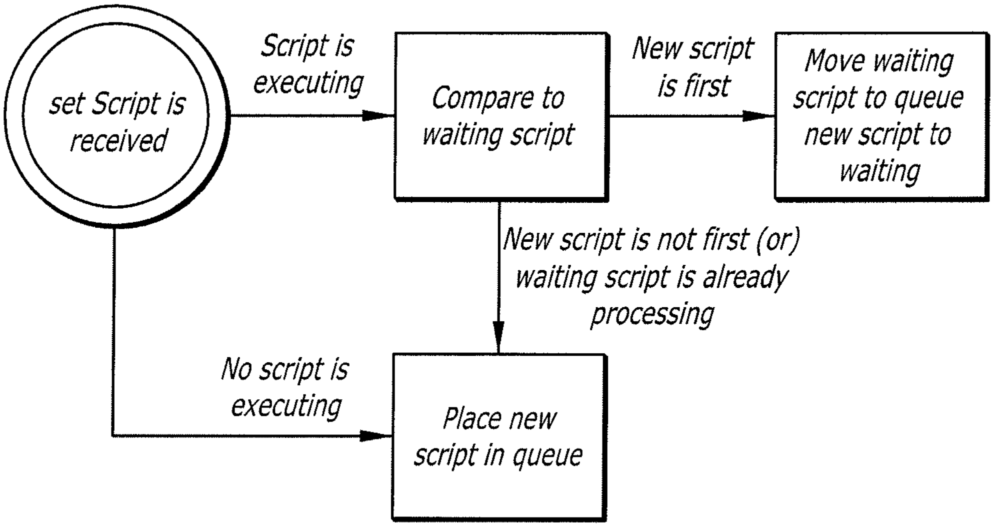
FIG. 30 is a logic flow diagram of a SetScript command processing by a gaming machine.

The second thread performs the actions of installing packages. It is shown in FIG. 30. It watches for the time window specified for each script to occur, and then it executes the script. If the package requires it, the EGM will be disabled prior to installing the package. Whenever files are added or deleted, this thread also forces the EGM to reboot.

The scripts can contain multiple packages. Each package may contain multiple modules. A maximum of 10 scripts can be in the processing queue at any time, and this is managed by the download driver which forwards the commands from G2S to this software, i.e., the DLInstaller. The scripts may also be used to perform simple tasks such as running a command. Each script also has a disableType flag which controls whether the EGM is disabled or not, prior to executing the script.

There is a User Interface called StatusDisplay. It is mostly informational and displays messages such as "Operator initiated reboot required" and "Installation Complete", and the like. Although this software installs packages, it does not download them. It merely obtains scripts from G2S commands and executes them at the required time. The packages should already be on the system when the scripts are executed.

Example DLInstaller System Design

The main input to the DLInstaller is a separate thread that reads from the download driver to receive setScript, deleteScript and authorizeScript commands. This loop is constantly reading and processing the commands as shown in the FIG. 29.

A different software, the Dlreceiver, processes the commands, specifying which packages are to be downloaded which are received from the SDSMP (or the Software Download System Management Point). The DLreceiver is also responsible for downloading the packages to the EGM.

This software (i.e., the DLInstaller) is only responsible for processing the G2S script commands received from the download driver and executing these scripts. The three G2S commands received from the download driver are: (1) setScript—This is to place a script in the queue in the order specified by its time window; (2) deleteScript—This is to remove a script from the queue, but it will not remove a script that is already executing; (3) authorizeScript—This is to authorize the execution of a script.

The authorizations which are received are stored along with the queue. These are checked prior to execution of the script. If a host is required to authorize a script and all the authorizations were not received prior to the starting time window of the script, then the script will be waiting for authorization state before it can execute as shown in the FIG. 32. If the authorization is not received by the ending of the time window, then the script does not execute.

Referring to FIG. 30, an example flowchart shows the state flow when a setScript command is received by a gaming machine OS. The first check is to see if any other scripts are in the queue and to compare the first script in the queue, which is waiting to the new script obtained. So unless the EGM has already been disabled and the waiting script is already being processed, the new script can be placed ahead of the waiting script based on its time window.

Figure 31:
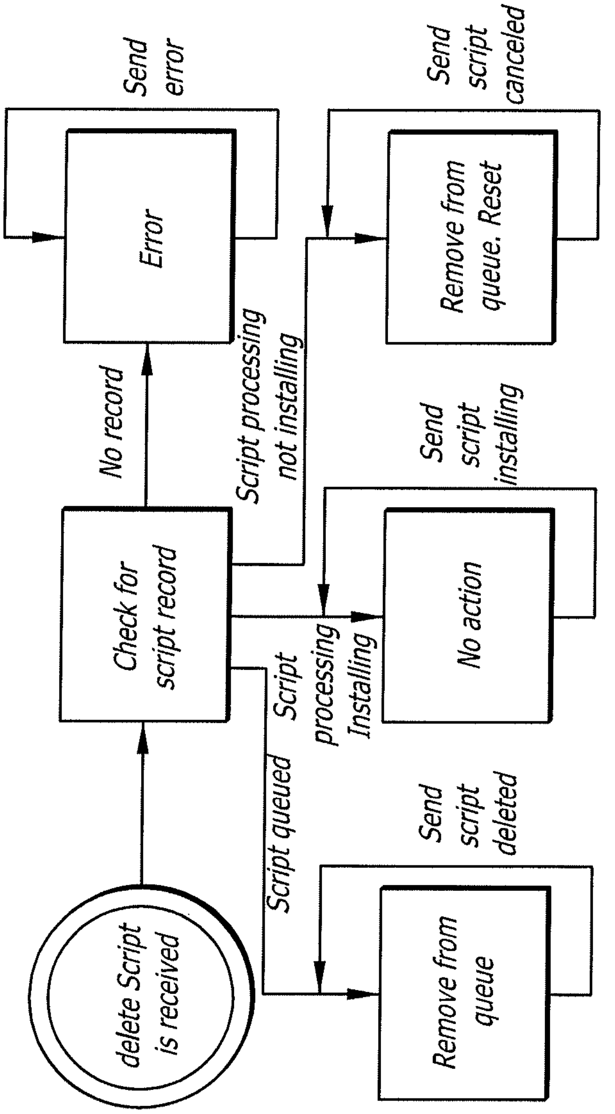
FIG. 31 is a logic flow diagram of a DeleteScript command processing by a gaming machine.

Referring to FIG. 31, an example flowchart shows the state flow when a deleteScript command is received. Even if the script is being processed as long as it is not actually installing, it can be deleted. However, if it is in the process of installing, then it is too late and "script installing" is returned. The other three possible return codes are "script deleted", "script canceled" and "error" as shown in the FIG. 31.

Figure 32:
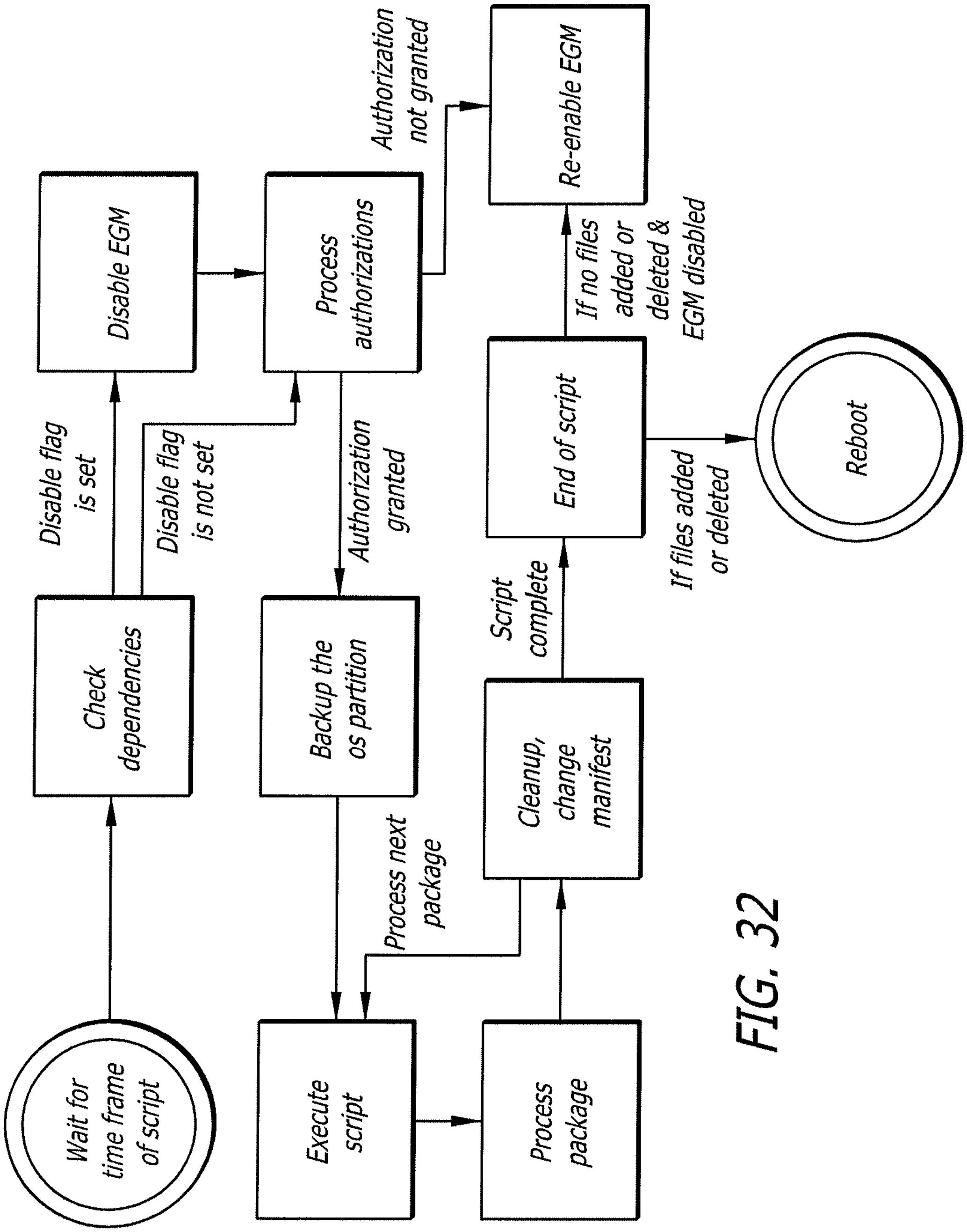
FIG. 32 is a logic flow diagram of a script command processing by a gaming machine.
Figure 33:
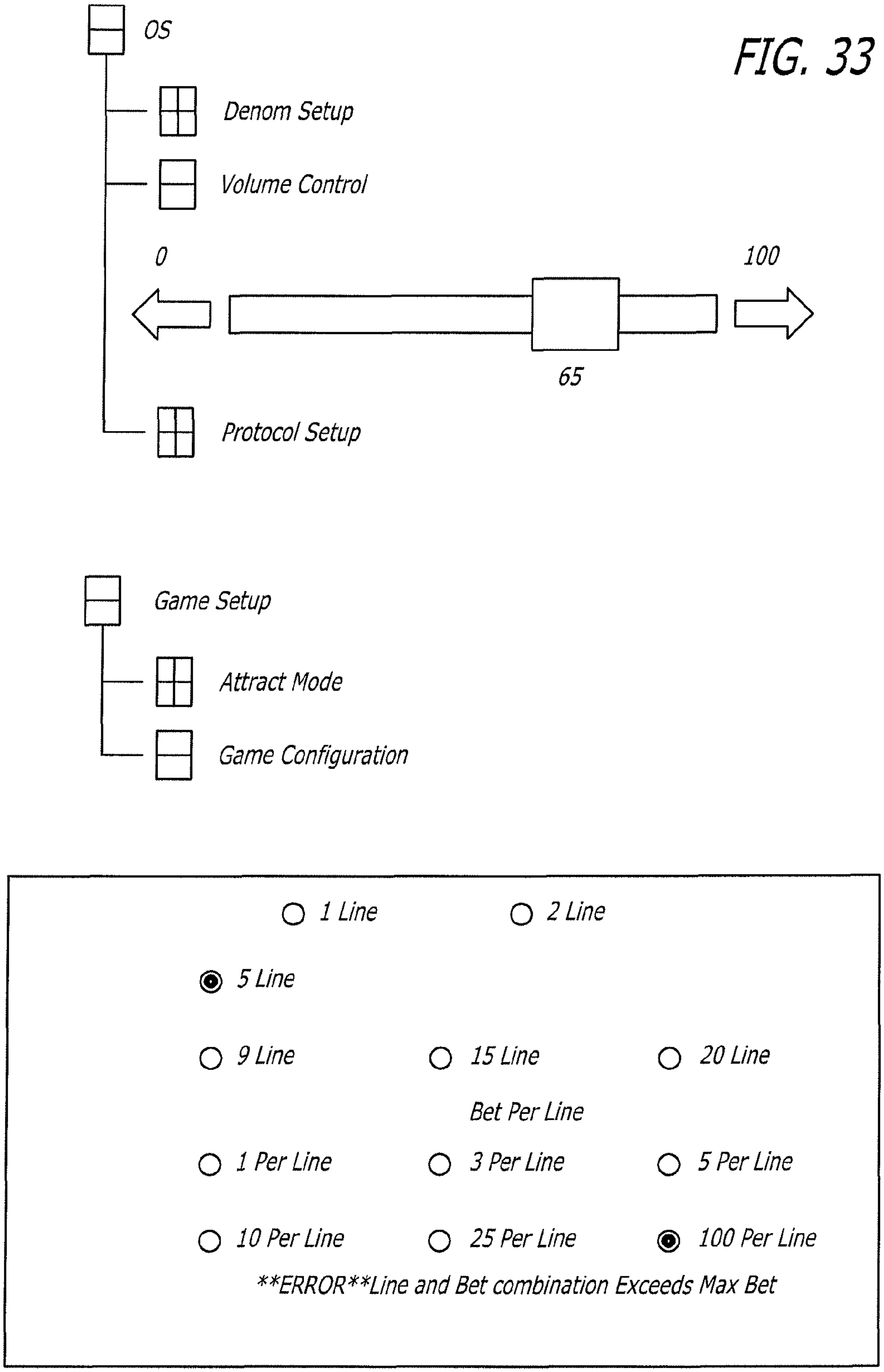
FIG. 33 is a user interface display on a gaming server.

Referring to FIG. 32, an example flowchart shows a script processing procedure of a gaming machine OS. A different thread processes these commands as shown in the FIG. 32. It is based on a micro sleep loop and tests for the first time window to occur. Then the script starts to execute. First the dependencies are checked and must be met for the script to continue. If the disableType requires it, then the EGM is disabled. At this point, a different software records all the information on the EGM. Then the authorizations required from different hosts are tested. If the authorization is not granted the EGM could be re-enabled.

Once authorization is granted the operating system partition is backed-up, and the script is executed. There can be many packages within a script, and after they are processed, the system is rebooted if any files were added or deleted, otherwise the EGM is simply re-enabled if it was disabled. An example design is described below.

The six classes defined in this software are: (1) DLInstallServer—the main class; (2) PackageParser—performs all the parsing and unpacking of the package; (3) ScriptQueue—manages the queue of the scripts; (4) ProxySry—this is used on the gamemgr side and the client is the DLInstaller; (5) ProxyClt—this is used on the DLInstaller side to talk to the gamemgr to determine when evens, such as cashout, machine disabled and the like occur; (6) StatusDisplay—this is the UI that displays mostly informational messages DLInstallServer.

The main class in this program is the DLInstallServer. It comprises the following storage elements and methods. The methods are: (1) Open Driver—connects to the download driver; (2) CloseDriver—disconnects from the download driver; (3) DisableMachine—turns off the gamemgr, performs cashout and the like; (4) EnableMachine—opposite of DisableMachine (i.e., restart the game); (5) RebootEGM—does a reboot on the EGM; (6) BackupOS—backs up the os partition to a different location of the Flash drive; (7) ForceCashout—changes the state of the system so that the credits are cashed out, in order that the EGM may be disabled; (8) WaitForAuthorization—waits for authorization to execute a script; (9) WaitForTimeWindow—loops on the Idle( ) call until the time window is reached; (10) WaitForIdle—waits for the credits to become zero so that the game can be disabled; (11) ExecuteScript—executes the script which has met all the conditions to execute; (12) InstallPackage—performs all the actions required to install a package; (13) DisableMemoryValidation—sends a message to FaultDog to disable validation of memory, system files, game files and OS files; and (14) ClcanupFiles—deletes unnecessary files as required.

The private storage elements may include: (1) ScriptQueue scriptQueue; (2) PackageParser packageParser; and (3) Proxy *proxy.

PackageParser

The package file is a binary file. It has to be parsed, its hash value needs to be authenticated, and then it has to be unpacked. Its methods are: (1) ParsePackage—opens the file and parses it, authenticates it and unpacks it; (2) GetNextinstallItem—returns the next item in the package; (3) UncompressFile—the package file can be in a tar or zipped format, and this method creates an uncompressed output file in a different location on the Flash drive.

The private storage elements are: (1) FILE *pfd Package; (2) FILE *pfdOutputFile; (3) char *pFullPkgHdr; and (4) list<PkgInstallInfo> packageInstallInfoList.

ScriptQueue

This class maintains a list of script elements each of which include all the information in the G2S setScript command. The methods include: (1) operator<(const script &rhs)—to support the sort operation; (2) active—returns the active script (i.e., the script waiting to be executed); (3) insert—inserts the script into the correct location, resetting the active designation if required; and (4) delete—deletes the script based on the search criterion which is the unique scriptID.

The private storage elements include:

list<script> data

ProxySry

This is used on the Game Mgr side and the client is the DLInstaller. The methods include:

Triggered—calls the function handler

The private storage elements include:

Proxy::Handler handler

ProxyClt

This is used on the DLInstaller side to talk to the gamemgr to determine when events such as cashout, machine disabled and the like occur. The methods are:

Trigger—calls the server which calls the handler

The private storage elements include:

IPC::Proxy*proxy

StatusDisplay

This is the UI which displays the informational messages. The methods include: (1) Show—displays the message; (2) Hide—hides the displayed message; (3) SetStatusDisplay—sets the message to be displayed, and whether a touch response is required; (4) RegisterButton PressNotification—sets the handler when a touch response is detected.

User Interface (UI) Design

There is a User Interface called StatusDisplay. It is mostly informational and displays messages such as "Operator initiated reboot required" and "Installation Complete", and the like.

Example Download Package Install Handling

In an example embodiment, the Download BOB interface will be modified to present the Download Installer code with G2S like commands. That is, the SetInstallRule commands will be changed into setScript commands for processing by the Download Installed. Also, the getScriptList and GetScriptStatus commands will map the getInstallRuleStatus and getInstallRuleList commands. In this embodiment, the commands dealing with download logs will be handled in the G2S support code and will not be a part of the Download support. The interface level to G2s will be based on the BOB Download Class Specification. CURL will be used to provide the support for downloading packages via HTTPS, SFTP, FTP, HTTP, and the like. For any multicast protocol, a locally developed protocol may be required.

Example Commands

An embodiment may include the following commands and rules:

(1) A separate thread will be used to issue reads to the download driver to receive setScript, deleteScript, authorizeScript commands.

(2) A table of scripts will be maintained. There will be a maximum of 10 scripts allowed on the system at any one time. Each entry in the script table will point to the next entry in the script table. A global pointer will be used to point to the first script in the table. The table will be arranged in a fifo queue, and the scripts will be processed in the order in which the setScript commands install time frames are specified. If an authorizeScript command is received before the setScript command, it will be rejected and an error event sent back to the server sending the authorization command. The script table will be maintained in both memory and on disk. The status of the script entry will be updated on disk before the in memory copy.

(3) When any of the script commands are received the following will happen: (A) setScript: (i) If no setScript record exists for this script, create and initialize script record with a state of waiting to process. (ii) If other script records exist, place this into the process queue according to its installation start time frame value. (iii) If no other scripts in the process queue, place it at the beginning of the process queue. (iv) If script waiting for start install time frame and has a start install time frame that is after the script just received, place the already active script back into the process queue and set the new script to waiting for the start time frame. (v) If the machine is in disable state and currently processing another script, just place the script into the script queue on disk. (B) deleteScript: (i) If no script record for the specified script, return error, no script present (ii) If script record in process queue, remove from process queue and send script deleted event. (iii) If script is processing, and process state is installing, send event script installing, not deleted. (iv) If script is processing and not in an installing state, send event script canceled, delete script record and reset states. If script waiting is in script queue, start processing next script. (C) authorizeScript.

Multiple hosts may be required to authorize a script to proceed with installation. It must maintain a list of authorizing hosts and set their authorization state when received.

Installation can not proceed until all hosts authorize it. If no script record exists for the specified script, reject authorize command and send back an error event. If processing script, sets script state to what is specified in the command for the particular host specified in the authorize command. If not processing script, sets authorization state to what is specified in command for the specified host.

An Example Processing setScript Command

When a setScript command enters the processing state, the following is a possible order in which things may occur: (1) Check dependencies: hardware and modules. Module dependencies can be satisfied by either already installed modules or modules that exist within the packages being installed by the setScript, and insure to take into consideration that the other package in the setScript could be removing a module that may be required. (2) Check the storage dependencies taking into account that a package within the setScript command could be removing a module and therefore freeing up storage. (3) Wait for the install time frame. (4) Disable the EGM according to disableType attribute. (5) Initiate the processing of packages according to the initiateType command. (6) Process authorizations. There can be multiple authorizations required. This includes a local operator authorization as well as multiple host authorizations. (7) Scripts may or may not contain command lists. If no command lists are included, then the package is installed based on the contents of the package. The Command lists will only exist for removing modules or executing specific commands on the EGM that is not related to installing or removing packages. (8) Whenever a package is removed, its related file validation manifest must also be removed from the system. (9) Whenever a module is installed or removed from the EGM that cause a manifest to be modified, deleted or added, the system must be rebooted after the installation completes. (10) Based on jurisdiction requirements and states specified in the setScript command, delete the downloaded package.

An Example Installing and Updating Module Requirements

Whenever a module is installed or updated on a system that has sufficient storage to maintain a backup copy of the operating environment, the following steps may be performed: (1) Reset the partition access permissions to allow writing to the partitions. (2) Copy the production environment into the backup environment. This may be done via a background task when an environment is activated and while the game is running. (3) Apply the changes to the production environment. (4) Insure that the boot.id file is set to boot the production environment and that a backup environment exists. (5) Reboot the system according to jurisdictional requirements.

When processing the package, the package will either contain a tar file for updates to the system or an image of a partition or entire storage media. If there is an image file, a check needs to be performed to insure that the image is the correct size for the media.

When installing new games, this will be performed via a tar file. A check must be made to insure that there is enough space to hold the new or updated game's files and manifest file. No backup will be made of an existing game on the system. If the game fails to run, we expect that it will have to be downloaded again from the server.

Installation Dependencies

Installation dependencies and pre-requisites are used interchangeably. Each may have a set of module, hardware and storage dependencies that must exist before the module can be installed. The dependency checking is performed as follows: (1) Module Dependency—A module dependency is defined by it Module ID and Release Information; (2) Hardware Dependency—The module dependency is defined by the Hardware ID and version number; and (3) Storage Dependency—Defined by the storage type and the amount of free space required.

For Release Information and the hardware version number, a test flag will define how to identify if a dependency is met. The dependency check flag will have the following values: (1) 0—No check is performed. (2) 1—The release number or version number must be equal to the one of the installed hardware or module. (3) 2—The release number version number must be greater than the installed one. (4) 3—The release or version must be greater than or equal to the installed one.

setScript Command Structure

The following describes an example setScript command structure that may be passed into the download install logic:

| Field Entry | Field Type | Description |
|---|---|---|
| setScript ID | string | Unique identifier for the setScript command. |
| startTime | time_t | Specifies the start time frame of when the attached command can start processing. |
| endTime | time_t | Specifies the end of the time window when the attached scripts can start processing. |
| disableType | integer | Indicates the conditions under which the EGM is to be disabled to start processing the attached scripts. |
| initiateType | integer | Indicates the events that need to happen in order to start processing the attached command list. |
| authorizeList | string array | A list of hosts that need to authorize the installation of the package. |
| packageList | string array | A list of package IDs to be processed by this script command. |

startTime/endTime

This is a date and time stamp that defines the start of the time and end of a time window within which a setScript command can start processing. None of the packages within the package list can start processing before this date and time are reached. The endTime is the date and time stamp after which the setScript command cannot start. The start of processing depends upon the initiateType being satisfied and all the authorizations being met. If these are not met, then the processing of the setScript command is suspended until the time window is entered again. Once the first package has started processing, all other packages will be processed regardless of the time window.

disableType

This specifies how the EGM should be disabled. The EGM cannot be disabled until the time processing time window is entered. As soon as the disable conditions are met, the EGM will be disabled and wait for the authorizations to occur. If the authorizations do not occur within the processing time window, the setScript command will be discontinued and the EGM re-enabled. The setScript command is then placed back into the waiting to process queue.

initiateType

Specifies what actions need to take place in order to start the installation. This includes host authorizations, local operator authorization, and the like. These events can occur before the EGM is disabled in the case of host authorizations. All initiation requirements must be satisfied during the process time window.

authorizeList

This is a list of host IDs who must authorize the setScript command to start processing. If the host specifies authorization is not granted, then the processing of the setScript command will be terminated.

PackageList

This is a list of packages to be processed. The packages will be processed in the order that they are specified within the setScript command. Module dependencies within one package may be satisfied by module in another package within the package list. When a package specifies that a module is to be deleted, then all the files within the Module manifest file will be deleted from the system along with the manifest file itself.

The Software Download Package (SDP) support is a collection of records and files that are download from a Software Download Distribution Point (SDDP) to one or more EGMs. The contents of the SDP are then used to update the software, configuration and firmware on the EGM base on the contents of the SDP. The following sections cover the definition, creation and installation of the SDP.

The SDP is configured into a header section and a data section. The header section contains information about the contents of the SDP, while the data section contains all of the detail software changes. The data section can be in a compressed format to reduce the size of the package and therefore lower the amount of time required to transmit it from the SDDP to the EGM.

A build package utility is used to generate the download packages, and a package installed utility is supplied on the EGM to install downloaded packages. Both of these perform the necessary compression and decompression as well as the data integrity checks of the contents of the package. The package builder utility calculates a SHA-1 hash value over the entire data contents of the package. This is then stored in the package header and is used by the package receiver and installed on the EGM to validate the contents of the package. The package will not be installed on the EGM unless it passes this SHA-1 validation.

The Software Download Configuration File (SDCF) contains a number of keyword records that are used to define the contents of the package, where to obtain the data to be included in the package, how the data should be organized and stored within the SDP, and where and under which conditions the data is written onto the EGM.

Some keywords are required while others are optional. The package: and module: keywords are special keywords used to define the major sections of the SDCF. The package: keyword must be the first entry in the SDCF. The detail configuration entries about the SDP are then specified. After the entire package definition entries come one or more module: definitions. All of the updates that can be made to the EGM are contained within the module: entries.

The following table contains all of the SDCF keyword entries that may be specified:

| Keyword | Description | Example |
|---|---|---|
| package: (required) | Specifies the name that will be given to the package that gets created. This is also used to name the package file. A .pkg extension will be appended to the value to create the name of the package file. | package: XYZ_OS This would create a Software Download Package called XYS_OS.pkg |
| time_stamp: (optional) | The time stamp can be used to identify when the package is created or when it was approved for use by Regulators. It must be in the format or: hh:mm:ss mm/dd/yy. | Time_stamp: 03:30:03 04/20/06 |
| release: (required) | This identifies a unique release value for this particular package. The release value is limited to 63 characters in length. Within the G2S environment, release info is defined as major.minor.release.verson | release: 3.20.002.000 |
| compression: (required) | The compression entry specifies what type of compression to use on the contents of the package. The valid compression options are: gzip, bzip2, and none for no compression. | compression: gzip |
| description: (optional) | This is a maximum 64-character string to provide a meaningful description of the package. If spaces are used in the description, then the whole description must be enclosed within quotations marks. | description: "gamemgr update" |
| module: (optional) | The module: entry is used to define the name of the module this package applies to. This name is the same as the module id in the G2S documentation. Each module must have a unique file validation manifest associated | module: agk.bin (The gamemgr executable is located within the agk_bin module definition.) |

-continued

| Keyword | Description | Example |
|---|---|---|
| | with it. Any number of modules may be included with a single package. | |
| release: (required) | This is the release information associated with the module. The format is the same as the release information associated with the package. It is used to uniquely identify the build where this module was produced. | release: 3.20.00.004 |
| time_stamp: (required) | The date and time that the module was built for release. The format is the same as the time_stamp: entry for the package. | time_stamp: 03:30:03 04/20/06 |
| description: (optional) | An option 64 character description of the module. If the description string contains spaces, it must be included within quotation marks. | Description: "gamemgr module" |
| action: (required) | This specifies the action that is to occur for this module. Valid actions are: add, replace, update, and delete. | action: update |
| manifest: (required) | This identifies the file validation manifest file for the module. The manifest contains the names of all the files that are associated with the module. A module can only be defined within one manifest. | manifest: os/agk_bin.mnt |
| file: (required for add and update) | The file: entry is used to identify the files from the module that are to be included in the package. When an update is being performed, the only files that need to be in the package are those that have changed. The file: entry is made up of 2 fields. The first identifies what type of files are being included, and the next field is the name of the file. When multiple files are to be included, they must be provided as a list in a file. See the File Definition Section for a complete description of specifying the fields to be included. For files that images of a partition or device, an extra field that defines the name of the device or partition must also be included. | File: list gamemgr_update.lst File: dimage devimage/dev/hda |
| hdependency: (optional) | Used to define a specific hardware dependency that this module has. Refer to the Module Dependency section for a detail explanation of the format and options for hardware dependencies. | hdependency "Seiko OSA-66T" none. |
| mdependency: (optional) | This entry is used to define any other modules that this module is dependant on. You specify the module name and optionally the release information for the module that this module requires in order to run. See the Dependency section for details. | mdependency: Linux - 2.4.18 2.4.18.003 equal |
| sdependency: (optional) | The sdependency: option is used to specify any storage requirements that the module | sdependency: "/Packages" 128000 |

-continued

| Keyword | Description | Example |
|---|---|---|
| | has. This can be RAM or ROM as well as storage media space. | |
| command: (optional) | Use this option to specify a command file to execute on the EGM. | command: clean__egm.sh |
| time__stamp: (required) | The date and time that the module was built for release. The format is the same as the time__stamp: entry for the package. | time__stamp: 03:30:03 04/20/06 |
| file: (required) | The name of the command file to include in the package. | file: command clean__egm.sh |

An example of a Software Download Configuration File is Module Action: Keyword Description.

The Module action: keyword

Module File Keyword Description. The file definitions in the configuration file is used to specify which files to include for a module. Specific file types are:

List: When list is specified, this means that the named file contains a list of files to include in the package. The file will be used as input into a tar command to create a tar file that contains all the files listed in the list file. Each file listed in the list file must be a fully qualified path file name. For example: agk/bin/gamemgr Pimg: The pimg states that the file is an image of a particular partition. When this type of file is specified, the configuration entry must include the name of the partition that will be overlaid with this image.

Dimg: The dimg specification states that the file is an image of a device such as a compact flash. When using this type of file, care must be used to insure that the image size is the same as the device size it is meant to be written to.

Flat: When flat is specified, this indicates that a single file is being specified and that is just replaces the existing file on the EGM. Multiple entries for this can be specified to accommodate multiple files.

Command: The command file type is used to identify a specific executable command file.

File definitions are placed in the configuration after the module that they are associated with. A module may have multiple file entries associated with it. File entry examples:

file: list gamemgr_file.lst. This specifies that the files to be included are in a file called gamemgr_files.lst. All the files specified in gamemgr_files.lst will be placed in a single tar file, and the file will be added to the package.

file: pimg hdbl.img/dev/hdbl. This entry specified that the file hdbl.img contains an image of the partition /dev/hdbl and will be placed in the package.

file: dimg hdb.img/dev/hdb. This entry specifies that file contains an image of the device /dev/hdb. The image file will be placed in the package.

file: flat agk/bin/gamemgr. A single file, agk/bin/gamemgr will be added to the package.

file: command clear_egm.sh. A command file called clear_egm.sh will be placed in the package. Since no directory path is specified, it is assumed that the file resides in the root Directory of the signed image copy.

Dependencies

Dependencies are modules, hardware or storage that must be installed on the EGM in order for the package to be installed. Dependencies are defined by module. Each module may have multiple dependencies defined for it, or it may have none. The dependency is used to specify what hardware and software must exist on the EGM in order for the package to be installed. If a certain piece of hardware or a certain module release level is required by a module and it does not exist on the EGM, then the module will not be installed on the EGM.

Example Module Dependencies

There are three pieces to a module dependency: the module ID, its release information, and the test indicator associated with the release information. The release information for the module is optional where as the Module ID and test indicator are always required. The test indicator can be one of the following: (1) none: This indicates that it does not matter what the release information for the module is. The dependency is satisfied as long as the module exits on the EGM. (2)=: The release information specified in the dependency must be equal to the release information of the module installed on the EGM. The release number on the EGM must be greater than the release number specified in the configuration. (3)>=: The release number of the module on the EGM must be greater than or equal to the release number specified in the configuration. (4)<: The release number on the EGM must be less than the release number in the configuration. (5)<=: The release number of the module on the EGM must be less than or equal to the release number specified in the configuration.

Examples:

mdependency: linux-2.4.18-3pt none mdependency: agk_base 3.1.16.003>= mdependency: agk_lib 3.2.20.003<=

Hardware Dependencies:

Hardware dependencies are similar to module dependencies. There is the hardware ID or name of the particular device and optionally a version number. As with the module definition, if there is no version information to check, the word, none, is used to indicate this. Otherwise, the same comparison values can be used as in the module definition.

Examples:

hdependency: MC-40 none hdependency: “Seiko OSA-661: 1.00.01=

Example Storage Dependencies:

The storage dependency specifies the type os storage and the amount of free space that is required. For example: sdependency: “/Packages” 128000 specifics that there must be 128000 bytes of free memory available in the /Package partition for this module to be installed. Storage can also define how mush memory the EGM has, or how much NVRAM is installed, etc.

Host Interpreter:

The functionality of a Host Interpreter, Connection to a Configuration Service, and the Configuration Service’s interface to the host user are described. The Host Interpreter here is not specific to any existing protocol. It is described as if it has total freedom of design and functionality. The Connection to the Host system describes the messaging to the host and back, but does not make intention of physical transport media, or message headers, checksums, or security. The Configuration Service GUI is described without knowledge of what GUI is currently available. The focus is on what information is presented and what functionality is available.

Configuration API:

The Configuration API is an interface supporting a configuration option, such as:

Member Strings Category, Name, Value, Minimum, Maximum, Allowed Values, Allowed Value Rules, Rules Member Enums Type Double, signed long, string, Boolean Control Type Category, Single Line Edit Box, Multi-Line Edit Box, Slider, Check Box, Check Box Array, List Box, Combo Box, Radio Button Member Booleans Read Only, One Time Settable, Is Set, Read Only With Credits, Visible, Restrict To Allowed Values, Unique Per Machine XML Definition Ideally, the Configuration option will be defined via XML. Not all member variables are required. Some, such as minimum and maximum, will only be present if they are applicable.

Example XML definition:

```
<struct>
    <field name = "Category" value = "" />
    <field name = "Name" value = "" />
    <field name = "Value" value = "" />
    <field name = "Type" value = "" /> <field name =
    "Minimum" value = "" />
    <field name = "Maximum" value = "" />
    <field name = "Allowed Value" value = "" />
    <field name = "Allowed Value Rule" value = "" />
    <field name = "Control Type" value = "" />
    <field name = "Rule" value = "" />
    <field name = "ReadOnly" value = "" />
    <field name = "OneTimeSettable" value = "" />
    <field name = "IsSet" value = "" />
    <field name = "ReadOnlyWithCredits" value = "" />
    <field name = "Visible" value = "" />
    <field name = "RestrictToAllowedValues" value = "" />
    <field name = "UniquePerMachine" value = "" />
    <field name = "CommaDelimitedList" value = "" />
</struct>
```

Each "Allowed Value Rule" applies to the Allowed Value most recently defined. Multiple Allowed Values, Allowed Value Rules, and Rules may be defined within the same structure.

Each "Rule" applies to the Value in the same structure. In this definition, Boolean values, (Case-Insensitive) "T", (Case-Insensitive) "True", and "1" are considered to be true, all other values are considered to be false.

Not all parameters will be present with every definition. Only the parameters that apply will be given to save on system and communication resources. All Booleans are assumed false if not present.

Example Rules

Rules are defined for both Option Values and for Allowed Values.

Multiple rules may apply in both cases. The rules allow for a host system to display to the user real time if the configuration they are creating is valid, lawful, and allowable. The rules also allow for the host to predict if a configuration change will work, and if not, what has configurations have to change, or wait for a more better configuration time.

Example Categories

Options are arranged in a tree format using Categories and sub-categories. These are used to both organize the configuration options, and to separate them.

Example Error Reporting

Error reporting is provided per option. The Configuration Management system does not log these events, but it does post them as they occur. Each error consists of a string, and is associated to an Option. More than one error may occur at a time, and multiple errors may reference the same option. Errors are a string of text and are not formatted or limited in length.

Example Configuration Template

Each configuration option is defined by more than just a string name value pair. Sufficient information is provided to give a GUI interpreter information on how and where each configuration option shall be displayed to a user.

Example Host Interpreter

A host interpreter is the implementation of host communication within the gaming machine. In final product, the host interpreter will most likely be a component into an implementation of a wider scoped protocol than just configuration. A host interpreter's job will be to interpret, or translate the configuration API within the gaming machine, to the protocol for which it is designed.

Example Configuration Service Communication

Whether the configuration service is provided as part of another protocol, or on its own, the Host interpreter will be transmitting and receiving communicating configuration information to and from its host. It will transmit configuration templates, configuration values, notify the host of configuration changes, configuration template changes, accept changes from the host, test changes from the host, and report errors to the host system.

Example Server Side GUI

The Server side GUI should display the options to a user for them to select and manage configuration. Each machine will be identified by the gaming machine. This identity can be recorded and remembered and will never change during the life cycle of the machine. In this case the life cycle of a machine is the time between NVRAM and EEPROM Clear. In most cases, even after EEPROM clear, the same identification will be used. For example, the Serial number usually matches the value on the serial number plate riveted to the side of the cabinet. The server can then display the machines to the user in several fashions: by floor layout, by bank, by database, or by search and select. Once a machine has been selected, the interface will then provide options. The user can load a pre-existing configuration from a file. The user can select a configuration previously configured to this machine previously, if available. Or the user can opt to manually modify the configuration. If the user chooses to manually modify the configuration, they will be presented with the graphical representation of the configuration template.

Example Displaying Categories

Categories are intended to be displayed in tree form. Similar to file view, the categories should collapse and expand, reducing the information displayed to what is relevant to the user's needs. Categories can contain both subcategories and options. Categories and options should be displayed in the order they are defined in the configuration template. For purposes to be described later, the categories also need to be selectable, and multi-selectable (selecting multiple non-concurrent categories)

Example Displaying Configuration Options

Each configuration option includes a definition of the option, including how it should be displayed:

Member Variables

Category,

The name of the category that this object is to be displayed under. This may not always be the last category defined. For example, a category can contain options, some subcategories, and then more options. The options following the subcategories would reference the parent category, not the last defined subcategory.

Name,

Name of the configuration option. The first character of all Names are for internal sorting purposes, and should NOT be displayed to the user.

Value,

The value of the configuration option.

Minimum, Maximum

Optional, not all options have a minimum or maximum. If present, this is the minimum value.

Allowed Values,

Multiple allowed values may be defined.

Allowed Value Rules, Rules

Type Double, signed long, string, Boolean

The value will be treated as a string in most cases, but the Type signifies how it will be used when the configuration option is applied. This also makes the GUI cleaner, because alphabet characters can be excluded from doubles and integers, and Booleans can be restricted similarly.

Read Only

Boolean signifying if this is a modifiable option. It is preferable if the ReadOnly flag be set once to prevent confusion or conflicts when copying one machines configuration to another.

One Time Settable

Boolean signifying if this option can only be set once per ram clear.

Is Set

Boolean signifying if this option has been set at least once since ram clear. If an option is One Time Settable and Is Set is true, than the option becomes read only.

Read Only With Credits

Read Only With Credits signifies that this Option can only be modified while there are no credits on the machine.

Visible

Boolean signifies if this option can/will be displayed to the operator.

Restrict To Allowed Values

Boolean signifies that the Value MUST be on the allowed value list. When this flag is not set, Allowed Values are used more as "suggested" values. Do not use this option in combination with Control Type Combo Box.

Unique Per Machine

Flag that signifies the option is part of the identity of a gaming machine and should not be copied to another machine. No two machines should have the same value.

CommaDelimitedList

Flag that signifies if this option is intended to be a list of values. Comma delimited lists are intended to have the format.

"(value)","(value2)","(value3)"

Control Type

The control type is an enum defining how the configuration option should be displayed. Each configuration object should be displayed in its requested type for clarity and consistency.

Category

New Category. This will use the Value as the name of the new category. The only other member variables that will effect this option on the GUI end is the Visible flag. Value and Allowed Values and Rules are still available when evaluating Rules, but are not displayed to the user.

Single Line Edit Box

Simplest of Control Type. This is a text box that will accept a single line of text.

Multi-Line Edit Box

This is a text box that will allow for multiple lines. Multiple lines can be delimited by the windows return and new line, or by Unix's new line character, as long as the delimiter is consistent.

Slider

This is a dragable slider bar. To use, provide a minimum and maximum. It also supports the allowed value list. The Value should be drag able from minimum value to maximum value. If an allowed list is supplied, the Value should "Snap-to" the nearest allowed value as it scrolls. If the type of the option is not compatible with a sliding bar concept, there is an error in the template. If the option does not specify a minimum and maximum value, use the smallest and largest allowed values. If the option does not specify minimum, maximum or allowed values, then this is a template error.

Check Box

Used for Boolean options. True=checked, False=unchecked.

Check Box Array

Used for comma delimited lists with allowed value sets. Each selected checkbox will add a comma delimited string to the Value. The checkbox names are from the Allowed Values list. The arrangement of the checkboxes is ultimately up to the GUI, but generally should be displayed row by row.

(The above selection would create the value

"Allowed Value 2","Allowed Value 3","Allowed Value 4")

Supported Parameters:

Must be True:

Comma Delimited List

List Box

Displays Allowed Values to be chosen from by Operator. If the option is a comma delimited list, the user should be able to select multiple allowed values. If more allowed values are present than will fit in a reasonably sized list box, the box should support scrolling.

If the configuration option is NOT a comma delimited list, the GUI may implement this as a drop down list box.

Combo Box

Similar to a List box, with the exception of the user is not confined to the allowed value list. They may enter their own value. The GUI may implement this either as a fixed list box, or as a drop down combo box.

Radio Button

Lists Allowed Values as Radio Buttons. The Operator will be allowed to select one, and only one. Comma delimited list is not supported with this control type.

Example Template Error Handling

For any error in the template, the presence of the error needs to be displayed to the user. When possible, the GUI should recover, and display the configuration option in a manner that still allows the user to make some context decisions and still configure the machine.

Example Unrecoverable Errors

Unrecoverable errors are errors that prevent the XML from being parsed, or configuration options that are not displayable, even in a generic form. The user should have the option in both cases to get the configuration template from the gaming terminal. The user should also have the option of seeing the raw XML for any portions that are in error.

Example Unrecognized Control Type

If a new control type is developed, and the host does not recognize the type, the option should still be displayed. The most generic display of a type is the combo box. The Combo Box should be able to obtain the configurable functionality of any other object, with sufficient context and understanding. The option should be highlighted in some way to signify the error, and the user should be able to choose a supported control type to redisplay the option, if they feel another control type would better suit the configuration options intention.

Example Option Parameters Incompatible with Control Type

If the option parameters are incompatible with the control type, the configuration object should still be displayed, and the error should be noted by highlighting the configuration option and displaying an error message explaining the problem. The user should have the option of overriding a parameter, or changing the control type. The risk with changing the control type or parameter is that the gaming terminal may reject the configuration option if the configuration option then violates a rule.

Example Inconsistent Subgroup

If the category of an option does not match the previously-defined hierarchy of categories defined, the option should automatically be displayed under a new subcategory, and the subcategory should be highlighted in a way to tell the operator that the subgroup was automatically generated, and not part of the template from the gaming machine.

Example Rule Violation

For each rule that is violated, there is an associated string. Rules that violate allowed values should gray out the allowed values in the control types that list allowed values, and should simply be disallowed in others. When an option rule is violated, the configuration option should be highlighted to signify the error, and the text of the error or errors should be displayed in context with the configuration option. For example, the error text could display to the right of an option, or just below.

Example Upgrade-Ability

Configuration Templates can and should be uploaded from each machine at least once. Once when the machine first connects to the configuration service, and every time the machine notifies the host of a configuration template change.

The rule evaluator should be implemented as a dynamically-linked, replaceable module. This will allow updates with minimum impact. The Host rule evaluator should be kept in sync with the gaming terminal rule evaluator. New game titles should never require new functionality in a rule evaluator, but new OS development may support more keywords or operators.

Compatibility Testing: Since the rules and templates can not be version controlled cleanly due to non-liner development and differences, compatibility testing needs to be done. There are several stages where this check can take place. When a new machine connects to the host, the host can request the Test Configuration template. The test configuration template will contain at least one instance of every control object, and at least one instance of every rule operator and special function. Every control object should be supported, and ever rule should be resolvable without error. Errors testing the test configuration are an indication that the host support needs to be upgraded. New control types and even new parameters should not prevent a machine or a configuration service from functioning. Every option will function as a combo box, and parameters can be ignored. This is because any errors can be caught by testing the configuration on the gaming machine.

Example GUI Options

Tabs: Instead of having every category as a tree format, the top level tree may be wish to be expressed as Tabs, and depending on the complexity of the configuration tree, the second level of categories may be displayed as sub-tabs. It is not recommended to display more than two levels as tabs, so using tabs is not a replacement of categories.

Condensed View: The condensed view idea would be to display only the name of each configuration option, and then pop up the control object when the configuration option is selected.

Reduce Error display: A complicated configuration option may have several rules. More than one rule may fail, and each rule will have an error string to be displayed with the configuration option. It may be tempting to display just the first error, but doing so causes a recursive problem-solving method of repairing a configuration, because as each error is fixed, another is exposed. It is better to display all of the error messages.

To reduce the screen real estate to be taken up by the error messages, the GUI could display an error count, and the first message, then when selected, expand to display the full list of configuration errors.

Example Configuration Service Protocol Messages

Gaming Machine to Host Asynchronous messages Connect: The connection message contains the Identity of the gaming machine, serial number, MAC address, IP Address, and the like. The Connect allows the host to index and remember a machine's configuration for verification or later use. If the host GUI is integrated with other services, this would be the time any associations are to be made.

The Configuration Change message is generated when the value of a configuration option has changed on the gaming machine. This event can be generated, for example, when an operator makes a configuration change on the gaming machine without using the remote configuration interface. The intent of this message is to keep the host up-to-date with the configuration of a gaming machine. The new name value pairs of the configuration changes will be contained in the message.

The Configuration Template Change message is generated when the template format has changed. This message does not contain the new template, and only notifies the host that the change has occurred. The host then can request a configuration template on its own time interval. One of the goals of the implementation of host configurability is to avoid the need for this message, but it is still present in case it is needed.

The Configuration Template Ready message is generated once per connection. This event tells the host that the configuration template can be requested, and it is believed to be complete. Configuration Template Changes will not be generated until after this event has been sent.

The Configuration Error message is generated when an error has occurred related to configuration. Each error is associated with a configuration option name.

Credits: Boolean event when the number of credits on the gaming machine becomes 0 or becomes non 0. This is used for determining if configuration options with the restriction of no credits on the machine can be set.

Playable: A Boolean event generated, once per power cycle, the first time the gaming machine enters a playable state. This is intended to tell the configuration host that the machine has been configured to the point of being playable.

Ram Cleared: There are two Boolean events signifying the clearing of non-volatile memory, that Ram has been cleared since the last connection. One signifies that General NVRAM has been cleared, and the other signifies that the one time settables has been cleared. Generally, the message will either contain that general NVRAM was cleared, or both. Rarely do one time settables get cleared without general NVRAM being cleared.

Request Response Messages: The host can query configuration information from the gaming machine at any time. The gaming machine will respond with a message dependant on what is being requested.

Configuration Values: Name value pairs of configuration values. Space is not wasted on the configuration parameters or categories.

Configuration Template: The current configuration template. The configuration template contains both the values of the configuration options, and the parameters. The Configuration Template is much larger than just the configuration values, thus should not be used if only the configuration values are needed.

Configuration Test Result: Results of a configuration test set. This message defines what the success of a configuration would be if it were to be set. If the configuration set attempt would have generated errors, those errors are reported. If the configuration contains no errors, no changes are actually made to the machines configuration.

Configuration Value Set Result: Results of a configuration set attempt. This is similar to the Configuration Test Result, except that an error free report means that the machines configuration has been modified. If there are any problems with the actually implementation of the changes, they will arrive separately and asynchronously as error messages. Errors from the implementation of configuration options should be rare, as the Rules are intended to avoid them.

Host to Gaming Machine—Requests

The Configuration Test is a request for values provided in the message to be tested. The test result is the same as the result would be with a set values call, with the exception that the configuration of the gaming machine is not affected if the test proves successful.

The Configuration Set is a request for values provided in the message to be put to use. The reply from the gaming machine proves a success or failure with errors. If the gaming machine provides a success in the reply, that only signifies that the configuration is in place, it does not mean that the configuration is comprehensive, or that the gaming machine is about to enter a playable state.

The Get Configuration Values gets the name value pairs of configuration. This call should be used instead of Get Configuration Template when possible to reduce unnecessary network load. If the host already has an idea of the configuration template, and the Get Configuration Values replies with every name in the known template, getting the template is probably not necessary. If the configuration template is modified the host will be notified via another message, and at that point can request the new template.

The Get Configuration Template gets the entire configuration template, with current values.

In the Get Test Template, the host can request the Test Template. The test template is a configuration template that attempts to test all of the control types, and heavily tests the rule evaluator. The host can then make a determination of the compatibility of the server side GUI support and rule evaluator. Every control type should be supported by the GUI with the given parameters and values, and every rule should resolve to be true, and without error.

If the Test Template fails, it does not mean that the remote host configuration feature will not work. Any unsupported configuration types can be displayed generically, and any unsupported rules will simply reduce accuracy of configuration option rules. Configurations can still be tested by sending it to the gaming machine for test.

Messages

The Set configuration message sends configuration name value pairs to the gaming machine to be implemented.

The Test configuration message sends configuration name value pairs to verify if the configuration is valid.

Example Exporting and Importing Configurations

Usage: The operator needs to be able to manage specific sections of the configuration separately.

In one embodiment, the Operator may wish to frequently change the number of lines and bet per line configuration on a bank of machines. The operator could export several acceptable configurations of just the game settings, then later import the configuration desired. Changes would not affect the rest of the machine and not require recreating the configuration each time.

In another embodiment, the Operator may have many configuration standards between machines. By configuration one machine and than exporting the machines device setup and accounting protocol setup, the operator would have a starting template for every machine on the casino floor. By importing this template by default to each new machine as it arrives, the operator could greatly reduce configuration time without losing the ability to customize each machine's configuration.

In still another embodiment, the operator may have a few, full machine configurations he likes. By having these configurations ready, new machine installations could go quickly in comparison to recreating configurations.

In yet another embodiment, when duplicating configuration from one machine to another, configuration may include unique identifiers, such as serial numbers. The User should be able to copy a configuration from one machine to another without duplicating unique identifiers.

Exporting

Configurations can be exported to the file. Exported configurations, (with the exception of "Raw Template") only save option name and value pairs. This both conserves space, and removes conflict ambiguity when they are later used.

Regarding choosing what to export, the GUI needs to allow the operator to select what configurations to save. This can be done in many ways. When categories are selected, all configuration options within that configuration category are assumed to be selected.

Direct Selection of GUI.

Similar to how MS WORD allows line selections by mouse clicks in the left margin, the operator could "highlight" the configurations they wish to save. The operator should be able to select options and categories, and neither are required to be consecutive.

Selection By Category

The GUI pay wish to provide selection options to the operator only after they have selected to export. The GUI would display a category tree, with no option definitions to simply and reduce the display. This option is not as powerful as a direct selection, but it does provide the majority of the functionality with a simpler interface.

Export Options

When the operator chooses to export a file, they will be offered options. Each option relates to a parameter Boolean flag of the options being possibly saved. These options include: Read Only, One Time Settable, Read Only With Credits, Invisible, Unique Per Machine, Other, Raw Template, and Quick List. By default, Other and Read Only With Credits may be selected.

When exporting configurations to be used in other machines, unique information would not be appropriate. When exporting starting templates, the operator may wish to save One Time Settable options. When exporting configuration sets for future reuse on the same machine(s), One Time Settable options would not be desired, because one time settable would only cause errors if later used to attempt a change of configuration. When generating reports for configuration counting or comparison, the Read Only and invisible options may be useful.

When exporting for the purpose of bug reporting, the Raw Template option should be used. The Raw Template option will export the entire configuration template to file for diagnostic purposes. If the raw template option is selected, all other options are irrelevant.

The Quick List option overrides other options would save the selected opions, with their template definitions. A Quick list save would NOT save categories, One Time Settable, Read Only with Credits, Invisible, Unique options or options Restricted to when the machine has no credits.

When Quick List or Raw Template is selected, the GUI should gray out all other options to signify to the operator what is going to happen. Quick List and Raw Template are also mutually exclusive of each other.

Importing

Importing, at initial glance, is the opposite of exporting. Instead of saving a configuration to file, you are loading a configuration from a file. The import will have similar options as the export option did, including: Read Only, One Time Settable, Read Only With Credits, Invisible, Unique Per Machine, and Others. By default, all of the above will be selected. Selecting Unique per machine, and Invisible configuration options is harmless if the imported file does not contain any. Generally, these choices are made at export time.

Creating New Configurations

When creating a new configuration, the user opens multiple configuration files. Since configuration files may often contain only partial configurations, this can usually be done without conflict.

One example of a process is as follows: (1) User opens multiple sub-configurations files previously exported. GUI combines the opened configurations into a single list. (2) User is presented with any conflicts, and is given options to resolve them. Configuration is compared to a configuration template. (3) User is given a category by category list of what configurations are not covered. User completes any remaining configuration. (4) User saves configuration to the gaming machine.

In one example, a new machine arrives and needs new configuration. The operator loads and combines the following configuration files: (1) a configuration file that contains the device setup; (2) a configuration file that contains the accounting protocol for that area of the casino floor; (3) a configuration file that has the bet configuration he likes; and (4) a configuration file for the denominations.

The user is presented with a conflict is that both the denominations file and the bet configuration file specify different default denominations. The operator makes a choice between the two files, and sets a note for himself to go fix one of the configuration files later. The GUI then tells the operator that the only configuration not covered by this selection is the progressive configuration. Since the gaming machine is not going to have a progressive, the operator moves on. The operator then selects the gaming machine that he is going to configure first. The GUI loads the template from the machine, and merges the configuration with the name value pair that the operator has generated. The GUI finds no errors in the new configuration, so the operator saves the configuration to the gaming machine. The gaming machine is now operational.

Example Resolving Conflicts:

There are two possible areas of conflict. The most likely area of conflict is merging configuration files. If more than one file contains a name value pair, and those values are in conflict, the operator will need to choose by either file by file, or option by option, which configuration to use.

The second area is errors when merging with the configuration template. If the new gaming machine has a different template, there may be missing, or extra name value pairs. It is normal for the newly-created configuration not to cover all of the configuration options, but extra name value pairs will have to be resolved by the operator on a case-by-case basis.

Example Modifying Existing Configurations

When a change in configuration is desired on an existing, already configured cabinet, the user most likely wishes to import the new configuration rather than hand-configure the machine.

One example of a process is as follows: (1) User selects the gaming machine; (2) The current configuration template is loaded; (3) The user selects a previously exported configuration file that contains the desired modifications; (4) The GUI merges the name value pairs from the saved file into the loaded template; (5) The User is presented with any conflicts; and(6) The user resolves any conflicts, and saves the configuration to the gaming machine.

In one example, the casino operator wishes to change the denomination and line/bet of the machines near the door for weekend visitors. The operator has done this several times before, and has several configurations on hand.

The operator selects the gaming machines(s). The operator selects a configuration file. The GUI merges the configuration file with the current configuration. The operator reviews the denomination and bet lines configuration to ensure they have selected the configuration they intended. The operator then saves the configuration to the whole bank of machines.

Quick Configuration GUI

The quick list feature is for configurations that change often. The Quick GUI would be targeted toward a pocket PC or a Table PC. The floor operator could carry the device around, and change configurations and see the results real time. The Quick Configuration GUI would not display the full option or configurability GUI. Its prime purpose is to make changes that are already setup in advance. There will be support for displaying all control types except category. Categories are ignored.

Quick List

A quick list of options would be a very vary small subset, and the options would be restricted to options with no rules defined, and not restricted to when the machines have no credits. The GUI would start with a graphical representation of the casino floor. The operator can select single or multiple machines and a quick list is opened. Quick lists are generated by the central system as a function of exporting. For example, a quick list may be as short as only containing volume control, or game speed.

The advantage to this feature is that the adjustments can be made without opening cabinets, without any downtime, and without making players uncomfortable.

Quick Configure from File

The Second function of the Quick configuration would be to select a bank of machines, and a previously exported configuration file, and then implement the changes. A list of files could be kept for different denomination sets the casino likes, or different payback percentages.

In one example, the operator walks the casino floor and adjusts the volumes of the machines as he walks the floor. In another example, the operator could see a line of players waiting to play a hot title, and could accelerate game play on that bank of machines, without leaving the casino floor.

The operator could change the denomination and payback percentages from the casino floor. For example, the casino operator needs to change a bank of machines from a nickel to a quarter, to prepare for weekend traffic. The operator could select the bank of machines, impose the changes, and see the results real time, right in front of him.

Figure 34:
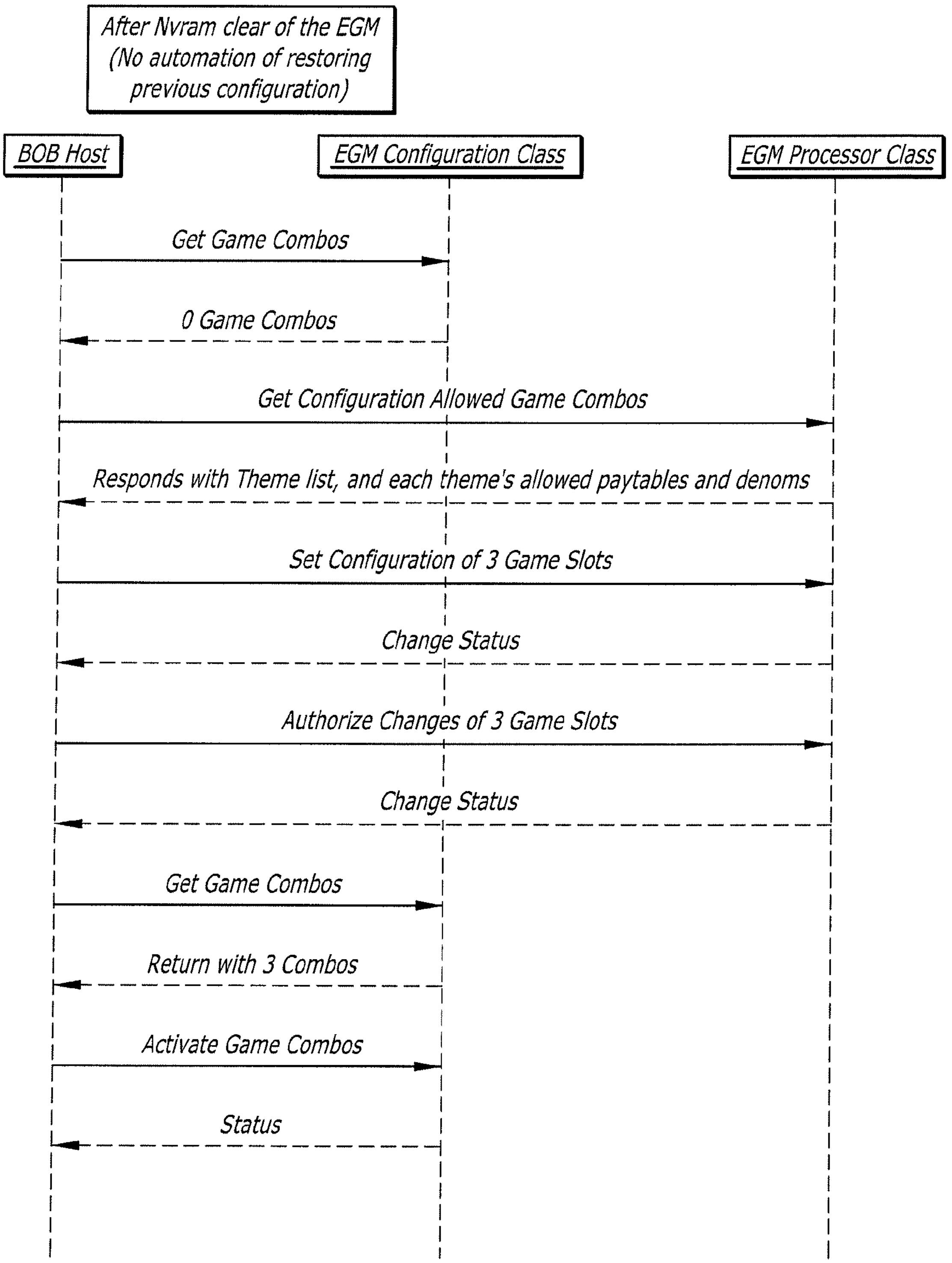
FIG. 34 is a logic flow diagram of a configuration change sequence.

Referring to FIG. 34, an example sequence diagram is shown. G2E Paytable Configuration Design Definitions are listed below:

Allowed Games Combos: This is largest list of combos. The Allowed Game Combos are combinations that may be configured and made available.

Available Games Combos: Combinations that have been configured to be available to the host. This is the list that the BoB host can choose from to activate.

Active Games Combos: Combinations that have been activated. Activated games are games that the player has an opportunity to play. They can usually be chosen through either a menu system presented to the player, or though a denomination graphic toggle.

Sequence Diagram Description:

Get Game Combos: This message asks the EGM for all Available game combinations.

0 Game Combos: This message is the response to a Get Game Combos message. After NVRAM clear, the EGM will report 0 game combos. (It will also report 0 themes, pay tables, and denominations btw.) The EGM requires at partial configuration before there are any combinations available.

Get Configuration AllowedGameCombos: The message is called "getOptionList". The parameters of this message allow the host to request a specific group of configuration options.

deviceClass="processor"

deviceID="0"

optionGroupId="balAllowedGameCombos"

optionId="all"

This message responds with the Theme list, and each themes-allowed paytables and denominations. The EGM will respond with all of the options within the balAllowedGameCombos group. Within this group there is always an option with the optionId of "ThemeList". This lists all of the game themes allowed by the EGM. For each theme in the list, there will also be a like named optionId containing the themes list of paytables, and the denominations for those paytables.

The format for the value may be defined as follows:

BALallowedGameCombos Syntax

Note that the syntax does not allow for white space.

allowedGameCombos::=allowedGroup{;allowedGroup}

Note: allowed groups are separated by semicolons.

allowedGroup::=paytable{,paytable}:denomination{,denomination} paytable::=allowedPaytableCharacter{allowedPaytableCharacter} allowedPaytableCharacter::=letter I digit I. % letter::=upper_case_letter I lower_case_letter denomination::=denomChoice{,denomChoice} denomChoice::=denomRange I denomValue denomRange::=denomValue-denomValue denomValue::=digit{digit}

Example:

90.05% A,95% A:1-500;94% A,97% A:1-5,10,25,50,100==allowedGroup;allowedGroup

First Allowed Group:

90.05% A,95% A:1-500==paytable,paytable:denomination

First Paytable in Group:

90.05% A==allowedPaytableCharacter{allowedPaytableCharacter}$_6$ (allowed char followed by 6 allowed chars)

Second Paytable in Group (after Comma):

95% A==allowedPaytableCharacter{allowedPaytableCharacter}$_3$ (allowed char followed by 3 allowed chars)

Denomination (after colon): 1-500==denomRange

Second Allowed Group:

94% A,97% A:1-5,10,25,50,100==paytable,paytable:denomination

First Paytable in Group:

94% A==allowedPaytableCharacter{allowedPaytableCharacter}$_3$ (allowed char followed by 3 allowed chars)

Second Paytable in Group (after Comma):

97% A==allowedPaytableCharacter {allowedPaytableCharacter}$_3$ (allowed char followed by 3 allowed chars)

Denomination (after Colon):

1-5,10,25,50,100==denomRange{,denomValue}$_4$ (one denomRange followed by 4 denomValue)

A real world example from the gaming show would have a name of <bob:optionitem

```
bob:currentValue="PokerDoubleBonus1 00a,
PokerDoubleBonus92a,
PokerDoubleBonus94a,
PokerDoubleBonus96a,
PokerDoubleBonus97a:
1-3,5,10,15,20,25,50,
100,200,500,1000,2500,
5000,10000"
bob:optionName="PokerDoubleBonus"
bob:optionId="PokerDoubleBonus" bob:minLength="0"
bob:defaultValue=""
bob:canModRemote="true" bob:canModLocal="true"
bob:maxLength="25"
bob:optionType="string"
>
```

(Actual xml will have no line breaks in the currentValue field.)

Also in the balAllowedGameCombos group id are the game slots. The number of game slots is under the control of the EGM and is set at compile time. If the host wishes to reduce the size of messages, the EGM could specifically request the theme list option id, and then specifically request the optionids for each theme, this would avoid receiving the information for the game slots.

Example Set Configuration of 3 Game Slots

In this example 3 game slots are being configured. More or less could be configured at once. The message here is defined in section 1.17 of version 0.12 of the Bob configuration class document. The host would configure 3 game slots with a theme, pay table and denomination. The host could optionally set the active flag at this point, but that functionality is duplicated within the processor class. The time when this feature is most useful is if the host is recovering a configuration from a previous execution of the game, in which case the active game list would be recoverable via configuration.

Change Status

In response to a Set configuration change, the EGM will reply with a status, and report any errors as applicable. In 2005 G2E show code, this response was hard-coded and ignored.

Authorize Changes of 3 Game Slots

If not used in the 2005 G2E show code, this message described in section 1.19 of version 0.12 of the Bob configuration class document would cause the changes to take effect.

Change Status

Again, in response to the authorize changes message, a status message would be sent back to the host, describing any errors as applicable. This was not exercised in the 2005 G2E show.

Get Game Combos

Now that the EGM has been configured with (in this case 3) game slots, the Get Game Combo message will be able to retrieve a list of combos that can then be activated.

Return with 3 Combos

The EGM will respond with the three game combinations that have been configured.

Activate Game Combos

Section 5.19 of version 1.1.13 of the Bob Protocol document.

The host can now choose to activate one or more of the game combinations. At the moment at attempt to activate 0 game combinations will be ignored. If a currently active combo is not in the list requested to be activated, the EGM will disable the combination.

Status

As a status message the GameCombos reply is sent to the host. The host can tell from this message if the activation of the requested game combos was a success.

Example Option XML definitions (part of Get Options response message)

```
<bob:optionGroup
bob:optionGroupId="balAllowedGameCombos"
bob:optionGroupName="Allowed Game Combos"
>
<bob:optionitem
bob:currentValue="'PokerDoubleBonus'"
bob:optionName="Theme List"
bob:optionId="ThemeList"
bob:minLength="0"
bob:defaultValue=""
bob:canModRemote="true"
bob:canMod Local ="true"
bob:maxLength="25"
bob:optionType="string"/ >
<bob:optionitem
bob:currentValue="PokerDoubleBonus100a,
        PokerDoubleBonus92a,
        PokerDoubleBonus94a,
        PokerDoubleBonus96a,
        PokerDoubleBonus97a:
        1-3,5,10,15,20,25,50,
        100,200,500,1000,2500,
        5000,10000"
bob:optionName="PokerDoubleBonus"
bob:optionId="PokerDoubleBonus"
bob:minLength="0"
bob:defaultValue=""
bob:can Mod Remote="true"
bob:can Mod Local ="true"
bob:maxLength="25"
bob:optionType="string"
>
</bob:optionGroup>
<bob:optionGroup
```

-continued

```
bob:optionGroupId="balGameCombo1"
bob:optionGroupName="Game Combo 1 >
<bob:optionitem
bob:optionHelp="Combination Theme"
bob:currentValue="PokerDoubleBonus"
bob:optionName="Game Theme"
bob:optionId="GameTheme"
bob:minLength="0"
bob:defaultValue=""
bob:canModRemote="true"
bob:canModLocal="true"
bob:maxLength="25"
bob:optionType="string"
>
</bob:optionitem>
<bob:optionitem
bob:optionHelp="Combination Paytable"
bob:currentValue="PokerDoubleBonus96a"
bob:optionName="Paytable"
bob:optionId="Paytable"
bob:minLength="0"
bob:defaultValue=""
bob:can Mod Remote="true"
bob:canModLocal="true"
bob:maxLength="25"
bob:optionType="string"
>
</bob:optionitem>
<bob:optionitem
bob:optionHelp="Combination Denomination"
bob:currentValue="20"
bob:optionName="Denomination"
bob:optionId="Denomination"
bob:defaultValue=""
bob:can Mod Remote="true"
bob:canModLocal="true"
bob:optionType="integer"
/>
<bob:optionitem
bob:optionHelp="Game combination is/is not
        available for play flag"
bob:currentValue="1"
bob:optionName="Active"
bob:optionId="Active"
bob:defaultValue=""
bob:canModRemote="true"
bob:canModLocal="true"
bob:optionType="boolean"
/>
</bob:optionGroup>
```

Example Super Config Game API Software Design

The game applications need to have a clean method of accessing SuperConfig options in an organized fashion. The game needs to be able to statically define configuration options in a form that the OS can manage with game combos and multi-theme situations. Options should be definable at the EGM level, the game theme level, and per combination instance. The game also needs to be restricting from intentionally or unintentionally accessing OS configuration options. This is both for the purpose of avoiding naming conflicts and avoiding backward compatibility issues due to undocumented option APIs.

The new API Methods allow for the game to map configuration options to game combinations. A new parameter will be added to Server's client handles. Each client handle will identify itself as a game or not. Additionally, game clients will not be given access to any configuration options without an Available to Game attribute set to true.

GameComboStatus is an object incorporated within SuperConFig. This module may be responsible for mapping category strings to combos and combos to category strings. Calls to the new GetCategoryFromCombo and GetComboFromCategory functions will then use this module to generate their results. GameComboStatus may also be responsible for maintaining each game client's registration of game-related configuration options. As options are created and destroyed, GameComboStatus will register and unregister game clients per the information they provide via 1AmGame calls.

Configuration Server may have functionality to allow configuration options to be removed. As game combos are created and destroyed, their configuration options also need to be created and destroyed.

Example API System Design

New API calls:

virtual std::string GetCategoryPrefixForSlot(int SlotID)

This method gets the string prefix for configuration options relating to a specific SlotID. This information is also provided in SlotCombo, but this method is smaller and faster. This is a blocking request to game manager.

virtual int GetActiveSlotIDforGameCombo(std::string Theme, std::string Paytable, money denomination)

Only one Theme/Paytable/Denom can be active at once. This returns the slot ID for the active combo. There may be inactive combos with a matching combination, but they will not be returned with this function. A negative one return value means that the combination was not found in any active slot.

typedef void (*SlotComboChangeHandler)(std::vector<int>

ConfiguredSlotIDs)

ComboChangeHandler is given a vector of slotiD's that have valid theme, paytable and denomination combinations. Information is not provided on which ones have changed, which ones no longer exist, or which ones are new. The caller must keep their own records for this.

virtual int32 RegisterForSlotComboChanges(SlotComboChangeHandler)

This call registers for a callback notifications of Slot Combination changes.

virtual std::vector<int> GetAllSlotIDsForPaytable(std::string Theme, std::string Paytable)

This method returns a vector of slot IDs. Each SlotiD contains a configuration matching the requested theme and paytable. This is a blocking call to GameMgr.

Class SlotCombo

Structure of information related to a SlotCombo. This class contains the following information:

Paytable of a given slot combo:

std::string paytable;

Theme of a given slot combo std::string theme;

Denominations within this slot that are active"

std::vector<money> activeDenoms;

Denominations within this slot that are inactive:

std::vector<money> inactiveDenoms;

The slot ID of this combination:

int slotID;

Super Config category prefix for combo options related to this slot:

std::string slotCategoryPrefix;

Super Config category prefix for options related to the theme of this slot combo:

std::string themeOptionsPrefix;

Super Config category prefix for options global to all games:

std::string gameOptionsPrefix;

virtual SlotCombo GetSlotComboBySlotID(int SlotID)

Requests a SlotCombo structure for the given SlotID.

Modified Existing API calls

Connect 0

The existing Connect call will remain. The OS will use a derived interface class that will append additional information identifying the client as an OS client.

FUNC-000 New Game API (Based on Existing SuperConfig Library)

A new API is created in libsuperconfig, it is called GameClient (.cpp and .h).

FUNC-001 Move Existing Game API to OS/LIBRARIES

The Config Client interface will move to the OS library, and the libsuperconfig in the game API will get a new interface called game client. The difference will be that the Config Client will pass extra information to the OS, identifying itself as an OS client, while the game client will not. This will allow the Super Config system to identify which clients have which privileges.

FUNC-002 SuperConfig Identifies Game Configuration Clients, separate from other clients.

The connect function of the Config Client interface will send information to the config server identifying it as an OS client. This will allow the config server to make later restrictions and/or distinctions.

FUNC-003 New API Function GetCategoryPrefixForSlot (int)

This new function will get the category prefix for a given slot ID. This prefix can then later be used to access Super Config options for the given slot.

FUNC-004 New API Function GetActiveSlotIDForGameCombo(string, string, money)

This new function gets the slot ID for a given combination of theme, paytable, and denomination. Since only one combination of all three can be active at any time, there will always only be one slot ID for it.

FUNC-005 New API Function RegisterForSlotComboChanges(handler) This function registers a handler to be called if the configuration of Slot IDs and their combos ever changes.

FUNC-006 New API Function GetAllSlotIDsForPaytable (std::string, std::string)

This function returns a vector of slot IDs. It returns one slot ID for every slot containing the provided theme and pay table.

FUNC-007 New API Function GetSlotComboBySlotID (int)

This function returns a structure of details for a given slot ID. This details include theme, paytable, denomination, vector of available denoms, vetor of active denoms, slot category prefix, theme category prefix, and slot category prefix.

FUNC-008 As Combos are created, options are automatically registered with game clients.

Game combo options will be defined in a game config file. As combinations are created and/or destroyed, the OS will be responsible for updating configuration server with new or removed options.

FUNC-009 Restrict Game Config Client Access to OS Options

When a configuration client has been identified as a game client, configuration access will be filtered by game access attributes. Options can have one or both of two attributes. One attribute will give the game read access to an option. The second will give the game write access to an option.

FUNC-010 Automatically register EGM level Game Configuration Options Clients that have identified themselves as interested in specific game themes will automatically be registered for any combination using that theme(s), and for theme level options of said themes.

FUNC-011 Automatically register Game Combo Options as Game

Combos are created.

When a new game combination is created, the OS will automatically create combo options from game configuration files, and then register all configuration clients that have identified themselves interested in the theme of the combo.

FUNC-012 Per-Combo Options Will be Defined and Selected Based on the Theme of the Combination Each pay table may identify per combo configuration options. When a combination is created, the OS will use the configuration file from the pay table of the combo to register configuration options.

FUNC-013 Combo Options and EGM options to be defined in Game Configuration files.

The game application will not need to generate options runtime, the OS will retrieve options from a configuration file residing on the game media, this will help automate the configuration option creation process.

FUNC-014 New Function QuickGetOption, to help automate the process of getting a configuration option.

QuickGetOption will allow the game to get an option value directly from its category and name, simplifying code.

FUNC-015 New Function GetOptionsReadableByGame 0

This Diagnostic and development function returns all options that are readable by the game client.

FUNC-016 New Function GetOptionsWritableByGame 0

This Diagnostic and development function returns all options that are writable by the game client.

Example Slotcombo Design

Structure of information related to a SlotCombo: class SlotCombo

```
{
public:
std::string paytable;        // Paytable of a given slot combo
std::string theme; // Theme of a given slot combo
std::vector<money> activeDenoms; // Denominations
within this slot // that are active.
std::vector<money> inactiveDenoms; // Denominations within
this slot // that are inactive
int slotiD; // The slot ID of this combination.
std::string slotCategoryPrefix;     // Super Config category prefix
for // options related to this slot combo
std::string themeOptionsPrefix;   // Super Config category
// prefix for options related to the theme of this slot combo
// std::string gameOptionsPrefix; Super Config category prefix
// for options global to all games
};
```

GlobalConfigurables.xml

The /games directory will optionally contain GlobalConfigurables.xml. Using the SuperConfig xml format, the file will define configuration options that are global to the EGM, and not tied to any specific game theme or game combination.

ThemeConfigurables.xml

Each game theme directory will optionally contain ThemeConfigurables.xml. Using the SuperConfig xml format, the file will define configuration options that are to be tied to the theme.

PaytableConfigurables.xml

Each game pay table directory will optionally contain PaytableConfigurables.xml. Using the SuperConfig xml format, the file will define configuration options that are associated to individual configuration combinations of the same pay table.

The game applications need to have a clean method of accessing SuperConfig options in an organized fashion. The game needs to be able to statically define configuration options in a form that the OS can manage with game combos and multi-theme situations. Options should be definable at the EGM level, the game theme level, and per combination instance. The game also needs to be restricting from intentionally or unintentionally accessing OS configuration options. This is both for the purpose of avoiding naming conflicts and avoiding backward compatibility issues due to undocumented option APIs.

Example Functional Requirements

Game configuration client will be given access to OS options only in a controlled, intentional, and per option method.

Read access and write access will be granted individually to the game application.

Game configuration options will automatically be registered by the OS as needed.

Game configuration client objects will be automatically registered for all game related configuration options.

Game configuration objects will be able to query connections between option categories and game combinations in both directions.

Game configuration objects will be able to identify themselves to one game theme, allowing the SuperConfig server to only register them for configuration options related to that theme.

Changes of options within a game slot will be directed automatically to configuration clients that have identified themselves with the matching theme.

Example Functional Requirements

| Requirement # | Capability or Description | Reference # | Test Case # |
|---|---|---|---|
| FUNC-000 | New Game API (Based on Existing Super Config Library) | | |
| FUNC-001 | Move Existing Game API to OS/LIBRARIES | | |
| FUNC-002 | Super Config Identifies Game Configuration Clients, separate from other clients. | | |
| FUNC-003 | New API Function GetCategoryPrefixForSlot(int) | | |
| FUNC-004 | New API Function GetActiveSlotlDForGameCombo(string, string, money) | | |
| FUNC-005 | New API Function RegisterForSlotComboChanges(handler) | | |
| FUNC-006 | New API Function GetAllSlotIDsForPaytable (std::string, std::string) | | |

-continued

| Requirement # | Capability or Description | Reference # | Test Case # |
|---|---|---|---|
| FUNC-007 | New API Function GetSlotComboBySlotID(int) | | |
| FUNC-008 | Automatically register Theme level game options. | | |
| FUNC-009 | Restrict Game Config client access to OS Options. | | |
| FUNC-010 | Automatically register EGM level Game Configuration Options. | | |
| FUNC-011 | Automatically register Game Combo Options as Game Combos are created. | | |
| FUNC-012 | PerCombo options will be defined, and selected based on the Theme of the combination. | | |
| FUNC-013 | Combo Options and EGM options to be defined in Game Configuration files. | | |
| FUNC-014 | New Function QuickGetOption, to help automate the process of getting a configuration option. | | |

Example SuperConfig Operator Menus

The purpose is to provide a complete configuration interface to a host configuration system. In one embodiment, the host configuration system will utilize the GSA BoB Protocol. Each configuration option and all version information may be available to the host system for reading. Where functionally possible, configuration options will also be settable by the host configuration protocol. The goal is to reduce operator activity at an EGM to a minimum. Installations and NVRAM clear processes should require minimum operator activity at the EGM, if any. A secondary goal is to provide one step setup of an EGM. Ideally, the host system should be able to send a single configuration set message to place the EGM into a playable state from initial connection to the host protocol.

An added benefit resulting from this implementation is remote inventory and analysis. Host systems will be able to query, survey, and monitor what software, firmware, and configurations are active and make yield studies, comparing these configurations to game play activity. With this information, a casino operator can effectively build a smart casino management system that can provide recommendations based on prior historical data and tracking.

An example of Functional Requirements are as follows: (1) All setup functionality available from the EGM shall be made available via Super Config, with the exception of Touch Screen setup. (2) Version information will be available as read only options via super configuration. (3) Jurisdiction settings will be available as read only options via Super Config. (4) The EGM will still be responsible for validating configuration changes. (5) The EGM will not allow remote configuration to bypass any restriction, rule, or check, currently enforced by operator menus or jurisdiction chip settings. (6) Operator menus at the EGM will appear and function exactly the same from the user's point-of-view. (7) No changes in Operator Menu documentation or instruction guides will be needed.

Example Functional Requirements

| Requirement # | Capability or Description | Reference # | Test Case # |
|---|---|---|---|
| MENU-000 | Add Diagnostics/Version Information (Read Only) to Super Config | | |
| MENU-001 | Add information contained in Diagnostics/Jurisdiction Limits (Read Only) to Super ConFig. (May not appear in the same format) | | |
| MENU-002 | Add information contained in Diagnostics/Jurisdiction Bit Codes (Read Only) to Super Config. (May not appear in the same format) | | |
| MENU-003 | Add Setup/Sound Setup to Super Config | | |
| MENU-004 | Add Setup/Machine Setup/Machine Info Setup to Super Config | | |
| MENU-005 | Add Setup/Machine Setup/Device Setup to Super Config | | |
| MENU-006 | Add Setup/Credit Setup to Super Config | | |
| MENU-007 | Add Setup/Credit Setup/Denom Setup to Super Config | | |
| MENU-008 | Add Setup/Credit Setup/Multi-Game Setup to Super Config | | |
| MENU-009 | Add Setup/Credit Setup - Submenus to Super Config | | |
| MENU-010 | Add Setup/Comm Setup/Serial Setup to Super Config | | |
| MENU-011 | Add Setup/Comm Setup/Serial Setup —Submenus to Super Config | | |

-continued

| Requirement # | Capability or Description | Reference # | Test Case # |
|---|---|---|---|
| MENU-012 | Add Setup/Comm Setup/IP Setup (Read Only) to Super Config | | |
| MENU-013 | Add Setup/Voucher Setup to Super Config | | |
| MENU-014 | Add SAS Config Menus to Super Config | | |
| MENU-015 | Add SDS Config Menus to Super Config | | |
| MENU-016 | Add SDG Config Menus to Super Config | | |
| MENU-017 | Add AFT Config Menus to Super Config | | |
| MENU-018 | Add Mikohn Config Menus to Super Config | | |
| MENU-019 | Add Internal Progressive Menus to Super Config | | |
| MENU-020 | Add Group Play Progressive Menus to Super Config | | |
| MENU-021 | Add MAPS Progressive Menus to Super Config | | |

Human Interface Requirements

The operator menus within the EGM should function and appear exactly as they did before any super config changes.

Performance Requirements

There shall be no visible performance hit when using the operator menus at the EGM.

Upgradeability Requirements

Changes to operator menus will not cause previously released game titles to malfunction or break, but configuration options driven by game applications will not be supported via Super Config without game modifications.

Documentation Requirements

Option Help fields for each configuration options will be filled out to provide runtime documentation to Host system interfaces.

Compliance Requirements

Supporting host driven configuration will not bypass any jurisdiction limit, EGM limit, or operator menu driven limit. Using Super Config to configure a gaming machine will not allow the casino operators to bypass any rules or laws currently enforced via the operator menu interface.

Example Configuration Technical Requirements—Functional Requirements

| Requirement # | Capability or Description | Reference # | Test Case # |
|---|---|---|---|
| CONF-001 | Minimize Operator intervention after Ram Clear | 4.1 | |
| CONF-002 | Save Serial Number, TCP/IP information to EEPROM | 4.1a | |
| CONF-003 | Save Protocol Selection and connection information to EEPROM | 4.1 b | |
| CONF-004 | Enable DCHP and I-Button stored serial number | 4.1 c | |
| CONF-005 | Activation of a Host Interpreter protocol shall not require any configuration not specifically needed for the Configuration connection. | 4.1.1 | |
| CONF-006 | Host Interpreter protocol shall connect before requiring configuration of devices, denominations, machine control, voucher configurations, and game configurations. | 4.1.1a | |
| CONF-007 | Auto-Reconnect after NVRAM clear | 4.1.1b | |
| CONF-008 | Serial Number Shall be saved to EEPROM | 4.1.2 | |
| CONF-009 | IP Address Shall be saved to EEPROM | 4.1.2a | |
| CONF-010 | Selection and activation of Host Configuration protocol will be saved to EEPROM | 4.1.2b | |
| CONF-011 | Protocol Specific Data Block will be saved to EEPROM | 4.1.2c | |
| CONF-012 | Allow duplication of configuration from one machine to another. | 4.1.2d | |
| CONF-013 | Host GUI will allow operator to save configurations to file(s). | 4.1.3 | |
| CONF-014 | Host GUI will allow operator to load and combine configurations from file(s) | 4.1.3a | |
| CONF-015 | OS Configuration option names will not change from instance to instance. | 4.1.3b | |
| CONF-016 | A configuration option shall be identifiable by its Name. | 4.1.3c | |
| CONF-017 | A configuration option shall be settable by its Name. | 4.1.3d | |
| CONF-018 | A set of configuration options shall be settable in whole as a single step or process. | 4.1.3e | |

-continued

| Requirement # | Capability or Description | Reference # | Test Case # |
|---|---|---|---|
| CONF-019 | Automated reconfiguration of Ram cleared machines | 4.1.3f | |
| CONF-020 | Gaming machine shall automatically report to the host that a ram clear has been preformed. | 4.1.3g | |
| CONF-021 | Host GUI shall provide option to automatically reconfigure a given gaming machine upon its report of ram clear. | 4.1.3h | |
| CONF-022 | The Host GUI will allow the operator to select a configuration to be automatically downloaded to the gaming machine after its next ram clear. | 4.1.4 | |
| CONF-023 | Starting with only the configuration saved in EEPROM, the gaming machine will accept and be able to successfully configure all configuration options in a single step. | 4.1.4a | |
| CONF-024 | Allow partial configuration | 4.1.4b | |
| CONF-025 | The Host GUI will allow the operator to configure a subset of configuration options. | 4.1.5 | |
| CONF-026 | The gaming machine will accept partial, yet valid, configurations. | 4.1.5a | |
| CONF-027 | Allow configuration to be read back to the host | 4.1.6 | |
| CONF-028 | Gaming machine shall report its current configuration pairs at the request of the Host interface. | 4.1.6a | |
| CONF-029 | Allow configuration template to be read from the gaming machine | 4.1.7 | |
| CONF-030 | Gaming machine shall report its current configuration template at the request of the Host interface | 4.1.7a | |
| CONF-031 | Allow modification of configuration run time. | 4.1.8 | |
| CONF-032 | Gaming machine can be configured more than once, with the exception of read only configuration options, and one time settable configuration options. | 4.1.8a | |
| CONF-033 | Allow custom game configuration. | 4.1.9 | |
| CONF-034 | Creation of configuration options can be done by the configuration client. | 4.1.9a | |
| CONF-035 | Game configuration options do not have to be predetermined at OS Compile time. | 4.1.9b | |
| CONF-036 | Game configuration option names not be restricted by the options the OS has created. | 4.1.9c | |
| CONF-037 | Changes during game play. | 4.1.10 | |
| CONF-038 | Rules will contain a flag signifying if they can or can not be configured when the gaming machine has credit. | 4.1.10a | |
| CONF-039 | Gaming machine will not accept a configuration that contains changes restricted to when the machine has no credits, while the machine has credits. | 4.1.10b | |

Verification

| Requirement # | Capability or Description | Reference # | Test Case # |
|---|---|---|---|
| VERF-001 | Feedback of configuration success | 4.2.1 | |
| VERF-002 | "Configuration Success" shall be equivalent to be a rule check pass of a configuration request. | 4.2.1a | |
| VERF-003 | Configuration Rules shall be sufficient to accurately predict the validity of a configuration change. | 4.2.1b | |
| VERF-004 | Configurations that pass Rule checks will always be accepted. | 4.2.2 | |
| VERF-005 | Validity pre-check | 4.2.2 | |
| VERF-006 | Modular Rule Evaluator (Dynamically Linked) | 4.2.2.a | |
| VERF-007 | Complete Rule evaluation before configuration changes | 4.2.2b | |
| VERF-008 | Test Rules created to exercise the rule evaluator. Test rules will exercise every key word and function. | 4.2.2c | |
| VERF-009 | Invalid Configurations | 4.2.3 | |
| VERF-010 | Invalid Configurations (Fail rule checker) denied in whole before any change occurs. | 4.2.3a | |
| VERF-011 | Reporting of Invalid configuration attempt reported to Host Interpreters | 4.2.3b | |

-continued

| Requirement # | Capability or Description | Reference # | Test Case # |
|---|---|---|---|
| VERF-012 | Avoid and prevent Configuration Failures | 4.2.4 | |
| VERF-013 | Rules written accurately enough that they can accurately be used to determine if a configuration is or will be valid. | 4.2.4a | |

Reporting

| Requirement # | Capability or Description | Reference # | Test Case # |
|---|---|---|---|
| REPT-001 | Development Recreation of Field configuration | 4.3.1 | |
| REPT-002 | Able to download an entire set of configuration options including invisible and read-only options for use in problem recreation. | 4.3.1a | |
| REPT-003 | Ability to upload in a debug development environment a complete set of options received from the field. | 4.3.1 b | |
| REPT-004 | Configuration Reporting and surveying | 4.3.2 | |
| REPT-005 | Ability to create subsets from configurations containing only specific items of interest | 4.3.2a | |
| REPT-006 | Internationalization and Localization Requirements | 4.4 | |
| REPT-007 | Human Interface Requirements | 4.5 | |
| REPT-008 | Performance Requirements | 4.6 | |
| REPT-009 | Upgradeability Requirements | 4.7 | |
| REPT-010 | Reliability Requirements | 4.8 | |
| REPT-011 | Documentation Requirements | 4.9 | |

Specific Phase I Configuration Options

| Requirement # | Capability or Description | Reference # | Test Case # |
|---|---|---|---|
| OPTN-001 | Configuration Category Game Sounds | | |
| OPTN-002 | User Feedback, Multiple choice, High, Med-High, Med, Low-Med, Low | | |
| OPTN-003 | Game Play, Multiple choice, High, Med-High, Med, Low-Med, Low | | |
| OPTN-004 | Attack Mode, High, Med-High, Med, Low-Med, Low, OFF | | |
| OPTN-005 | Configuration Category User Feedback Definitions | | |
| OPTN-006 | Play Buttons, checkbox group | | |
| OPTN-007 | Operator Buttons, checkbox group | | |
| OPTN-008 | Bill in Sounds, Boolean enabled/disabled | | |
| OPTN-009 | Bill in Sounds, Multiple choice sound names | | |
| OPTN-010 | Coin in sounds Boolean enabled/disabled | | |
| OPTN-011 | Coin in sounds, Multiple choice sound names | | |
| OPTN-012 | Jackpot Sounds, Boolean enabled/disabled | | |
| OPTN-013 | Jackpot Sounds, Multiple choice sound names | | |
| OPTN-014 | Instructional Vocals, Boolean enabled/disabled | | |
| OPTN-015 | Instruction Vocals, multiple choice sound names | | |
| OPTN-016 | Configuration Category Game Play Definitions | | |
| OPTN-017 | Real Spin duration, multiple choice 2.5 s, 2.8 s, 3.2 s, 3.5 s, 4.2 s. | | |
| OPTN-018 | Win Roll Up speed, multiple choice, slow, med, fast, scaled A, scaled B | | |
| OPTN-019 | Bonus Features, Read only Text Spring | | |
| OPTN-020 | Configuration Group Attract Definitions | | |
| OPTN-021 | Attract Music, Boolean, enabled/disabled | | |
| OPTN-022 | Attract Music, Multiple choice, names | | |
| OPTN-023 | Configuration Category Operator Menu | | |
| OPTN-024 | Configuration Category Limits | | |
| OPTN-025 | Credit Limit, number | | |
| OPTN-026 | IRS Limit, number | | |
| OPTN-027 | Jackpot Limit number | | |
| OPTN-028 | Bill Limit | | |
| OPTN-029 | Bill Reject Limit | | |
| OPTN-030 | Configuration Category Voucher Data | | |
| OPTN-031 | Voucher Location, string | | |
| OPTN-032 | Voucher Address, string | | |
| OPTN-033 | Configuration Category Identification | | |
| OPTN-034 | Asset Number, one time settable, number | | |

-continued

| Requirement # | Capability or Description | Reference # | Test Case # |
|---|---|---|---|
| OPTN-035 | Serial Number, read only, number | | |
| OPTN-036 | Configuration Category Denomination | | |
| OPTN-037 | Denomination, Multiple choice, allowed values | | |

Internationalization and Localization Requirements

| Requirement # | Capability or Description | Reference # | Test Case # |
|---|---|---|---|
| I18N-001 | Not a replacement for the Jurisdiction Chip | 4.4 | |
| I18N-002 | Does not override configuration options within the Jurisdiction Chip | 4.4b | |
| I18N-003 | Does not allow configuration options in violation of Jurisdiction Chip settings. | 4.4b | |

Human Interface Requirements

| Requirement # | Capability or Description | Reference # | Test Case # |
|---|---|---|---|
| HUMI-001 | Not a replacement for the Operator Menu | 4.5 | |
| HUMI-002 | Use of Host Configuration does not exclude or prevent Operator Menu configuration and usage. | 4.5a | |
| HUMI-003 | Configuration changes in Operator Menu will be visible in Host Configuration. | 4.5b | |
| HUMI-004 | Configuration changes via Host Interpreter will be visible in Operator Menu. | 4.5c | |

Performance Requirements

| Requirement # | Capability or Description | Reference # | Test Case # |
|---|---|---|---|
| PERF-001 | Configuration activity will not cause errors in the video display. (Errors would include reel spin slow down, glitch, or jumping graphics.) | 4.6 | |
| PERF-002 | Configuration activity will not cause loss in host communications unless required to perform a specific configuration change. | 4.6a | |

Upgradeability Requirements

| Requirement # | Capability or Description | Reference # | Test Case # |
|---|---|---|---|
| UPGR-001 | New configuration options (as they are developed) will automatically report and define their existence with the host interpreter, thus not requiring (or excluding) outside version control of configuration options. | 4.7 | |
| UPGR-002 | Rule checker will be dynamically linked for easy replacement on both hosts and gaming machines. | 4.7a | |

Reliability Requirements

| Requirement # | Capability or Description | Reference # | Test Case # |
|---|---|---|---|
| RELI-001 | Configuration changes should be enforced either witih all or nothing after a power hit mid-configuration. | 4.8 | |
| RELI-002 | In the event of a power cycle, configuration options will receive their new values on power up as the options are registered. | 4.8a | |
| RELI-003 | Configuration shall be saved in NVRAM. | 4.8b | |
| RELI-004 | NVRAM will be defragmented over time. | 4.8c | |
| RELI-005 | NVRAM modification will not require re streaming all configurations to NVRAM each cycle. | 4.8d | |
| RELI-006 | The size of NVRAM block claimed will be configurable. | 4.8e | |
| RELI-007 | The size of the NVRAM block claimed will support sizes greater than 64K, (greater than 16 bit offsets), yet be property optimized when running less than 64k (16 bit offsets) | 4.8f | |

Documentation Requirements

| Requirement # | Capability or Description | Reference # | Test Case # |
|---|---|---|---|
| DOCU-001 | Configuration options shall be self-descriptive and match terminology already present in the Operator Menu | 4.9 | |

Example Communications Interfaces

The Download and Configuration Subsystem will use the G2S, HTTP, HTTPS, TCP, and SOAP protocols to communicate with EGMs and other system components.

DEFINITIONS, ACRONYMS, AND ABBREVIATIONS

Glossary

| Term | Definition |
|---|---|
| Super Config | Super Config is a project implementation that provides new functionality to both internal implementation and host configuration communications. |

-continued

| | |
|---|---|
| Operator Menu | The menu interface on an EGM accessible through the Attendant key on the exterior of the cabinet, or the test button on the cabinet interior. |
| EGM | Electronic Gaming Machine |

| Definition, Acronym, Abbreviation | Description |
|---|---|
| XYZ Control Panel (BCP) | This smart client encapsulates all the functionality to support the command and control portions of the download and configuration features of the project. |
| XYZ Live Services | These are the windows services which are responsible for executing the Business Logic of the system. |
| EGM | Electronic Gaming Machine |
| Business Logic Layer Tier | The Business Logic Layer is comprised of the Download and Configuration Windows Services which are responsible for implementing the Business Logic of the system. |
| Database | SQL Server 2005 returns information based on the results of retrieving data from the following databases XYZ Core XYZ Configuration XYZ Download XYZ Activity XYZ Schedule. |
| Database Web Services | These are the web services that will be able to be re-used by other GUI and Service Applications in the XYZ Live System. |
| Data Access Layer Tier | The Data Access Layer is comprised of Web Services which expose methods for interacting with the Data Tier. |
| EGM Tier | The Data Tier is comprised of Electronic Game Machines (EGM) and other configurable components like iView and Game Controllers. |
| Electronic Gaming Machine (EGM) | The devices this project is targeted at. |
| G2S (Game to System) | The G2S (Game to System) protocol provides a messaging standard, using XML, for communications between gaming devices (such as game software, meters, and hoppers) and gaming management systems (such as progressives, cashless, and accounting). |
| G2S Engine | This service will receive G2S messages directly from the EGM and dispatch them to the XYZ Live Service based on the message component type. |
| G2S Download Protocol | The G2S download protocol will provide a standardized protocol to manage the downloaded content on all G2S compliant EGM from all G2S compliant host systems. |
| G2S Message | Command messages sent to an EGM, to update or configure the EGM. |
| G2S optionConfig Protocol | The G2S optionConfig protocol will download options available from within and EGM. The SDDP server will maintain all download software packages in a secure library with a required number of secure backups as defined by the jurisdiction |
| G2S Engine Tier | The G2S Engine Tier is comprised of the G2S engine components. Its job is to send and receive G2S protocol messages to and from EGM and other configurable devices. It is also responsible for the packaging and unpackaging of the internal system messages and G2S protocal messages |
| iView | XYZ proprietary device for player touch point services. It is used to display marketing and player tracking information. While not currently capable of "gaming", it likely will be downstream, so it is treated herein as an EGM. |
| module | A manufacturer-defined element that is a uniquely identifiable unit within the EGM. For example: A module can be an operating system, or a game theme, firmware for a printer; or, a module may be a single WAV sound file that is shared by other modules. |
| Presentation Tier | The Presentation Tier is comprised of the XYZ Control Panel application. The XYZ Control Panel application is the Graphical Interface through which the Download and Configuration portion of the XYZ Live system is managed. |
| SDDP Server | Will maintain all download software packages in a secure library with a required number of secure backups as defined by the jurisdiction |
| package | A manufacturer-defined element that can be thought of as a single file, which contains: •an optional download header that contains information about the package payload and •The package payload, with the payload being a ZIP file, TAR file, an XML configuration file, a single BIN file, or any file format that makes sense. The point is that specific format of the payload is of no interest to the command and control of the transfer. |
| Software download | The ability to send packages between a Software Download Distribution Point and one or more EGMs. |

What is claimed is:

1. A method for downloading and configuring an operating system of a gaming machine, the method comprising:

downloading a package;

extracting a module from the package;

verifying the module;

validating a legal configuration of the gaming machine with the module, wherein the gaming machine includes a storage media;

installing the module in the gaming machine responsive to validating the legal configuration;

rebooting the gaming system;

initializing a BIOS of the gaming machine;

authenticating the BIOS;

authenticating the operating system, wherein the operating system is stored on the storage media of the gaming machine;

initializing a kernel of the operating system responsive to the authenticating of the operating system;

as part of an initial start-up of the gaming machine and authenticating files on the storage media of the gaming machine, determining a number of free blocks on the storage media of the gaming machine;

recording the number of free blocks in an NVRAM of the gaming system as part of authenticating files on the storage media of the gaming machine; and verifying that the number of free blocks has not changed as part of authenticating files on the storage media of the gaming machine, wherein verifying that the number of free blocks has not changed is a background kernel process conducted to authenticate files on the storage media of the gaming machine.

2. A method for downloading and configuring gaming data of a gaming machine, the method comprising:

initializing a kernel;

downloading a package;

extracting a module from the package;

verifying the module;

validating a legal configuration of the gaming machine with the module, wherein the gaming machine includes a storage media;

installing the module in the gaming machine responsive to validating the legal configuration;

as part of an initial start-up of the gaming machine and authenticating files on the storage media of the gaming machine, determining a number of free block information on a media of the gaming machine, wherein the media is storing the gaming data;

dynamically rearranging an NVRAM of the gaming machine and storing the number of free blocks on the NVRAM as part of authenticating files on the storage media of the gaming machine; and verifying that the number of free blocks has not changed as part of authenticating files on the storage media of the gaming machine, wherein verifying that the number of free blocks has not changed is a background kernel process conducted to authenticate files on the storage media of the gaming machine.

3. A method for downloading and configuring a gaming data of a gaming system, the method comprising:

initializing a kernel;

downloading a package;

extracting a module from the package;

verifying the module with a manifest associated with the module;

validating a legal configuration of the gaming machine with the module prior to installing the module, wherein the gaming machine includes a storage media;

installing the module in the gaming machine responsive to validating the legal configuration;

as part of an initial start-up of the gaming machine and authenticating files on the storage media of the gaming machine, determining a number of free blocks on a memory of the gaming machine storing the gaming data;

redundantly storing the number via a message processor and a command router, wherein the number is communicated between the gaming machine and a gaming server via a BOB communication protocol; and verifying that the number of free blocks has not changed as part of authenticating files on the storage media of the gaming machine, wherein verifying that the number of free blocks has not changed is a background kernel process conducted to authenticate files on the storage media of the gaming machine.

4. A method for downloading and configuring an operating system of a gaming system, the method comprising:

initializing a kernel;

downloading a package;

extracting a module from the package;

verifying the module with a manifest associated with the module;

validating a legal configuration of the gaming machine with the module prior to installing the module, wherein the gaming machine includes a storage media;

installing the module in the gaming machine responsive to validating the legal configuration;

as part of an initial start-up of the gaming machine and authenticating files on the storage media of the gaming machine, determining a number of free blocks on a memory of the gaming machine storing the operating system;

redundantly storing the number via a message processor and a command router, wherein the number is communicated between a persistent memory of the gaming machine and a command memory of the gaming machine via a BOB communication protocol; and verifying that the number of free blocks has not changed as part of authenticating files on the storage media of the gaming machine, wherein verifying that the number of free blocks has not changed is a background kernel process that continuously loops and is conducted to authenticate files on the storage media of the gaming machine.

5. A method for downloading and configuring an operating system of a gaming machine, the method comprising:

initializing a kernel;

downloading a package;

extracting a module from the package;

verifying the module;

validating a legal configuration of the gaming machine with the module;

installing the module in the gaming machine responsive to validating the legal configuration, wherein the gaming machine includes a storage media;

as part of an initial start-up of the gaming machine and authenticating files on the storage media of the gaming machine, determining a number of free block information on a media of the gaming machine, wherein the media is storing the operating system;

dynamically rearranging an NVRAM of the gaming machine and storing the number of free blocks on the NVRAM as part of authenticating files on the storage media of the gaming machine;

defragmenting the NVRAM as a background process; and verifying that the number of free blocks has not changed as part of authenticating files on the storage media of the gaming machine, wherein verifying that the number of free blocks has not changed is a background kernel process that continuously loops and is conducted to authenticate files on the storage media of the gaming machine.

* * * * *

UNITED STATES PATENT AND TRADEMARK OFFICE

CERTIFICATE OF CORRECTION

PATENT NO. : 8,900,054 B2
APPLICATION NO. : 11/938249
DATED : December 2, 2014
INVENTOR(S) : Pravinkumar Patel It is certified that error appears in the above-identified patent and that said Letters Patent is hereby corrected as shown below:

In the specification

Column 4, In line 44, replace “manufacturer’s” with --manufacturers’--

Column 5, In line 53, replace “is” with --are--

Column 12, In line 46, replace “keep” with --Keep--

Column 14, In line 34, replace “AppendCahnges” with --AppendChanges--

Column 17, In line 8, replace “have” with --has--

Column 23, In line 41, replace “affect” with --effect--

Column 28, In line 44, replace “Blox” with --Box--

Column 30, In line 12, after “like” delete “..”

Column 37, In line 16, replace “os1” with --OS1--

Column 63, In line 20, replace “opions” with --options--

Column 70, In line 48, replace “vetor” with --vector--

Column 82, In line 16, replace “witih” with --with--

Signed and Sealed this
Fifth Day of May, 2015

Michelle K. Lee

Michelle K. Lee
*Director of the United States Patent and Trademark Office*